US012703348B2

(12) United States Patent
Bartz et al.

(10) Patent No.: US 12,703,348 B2
(45) Date of Patent: Aug. 11, 2026

(54) ELECTRIC OR HYBRID VEHICLE

(71) Applicant: Polaris Industries Inc., Medina, MN (US)

(72) Inventors: Austin R. Bartz, Wyoming, MN (US); Kevin P. Blair, Novi, MI (US); Bradley A. Bracht, Roseau, MN (US); Christopher Brown, Forest Lake, MN (US); Scott P. Dudley, Novi, MI (US); Jonathon P. Graus, Wyoming, MN (US); Christopher D. Harwood, Roseau, MN (US); Jacob Jaekook Jeong, Wyoming, MN (US); Forrest W. Johnson, Stacy, MN (US); Yassin M. Kelay, Burgdorf (CH); Jeremy M. Markstrom, Roseau, MN (US); Greg B. Miner, West Haven, UT (US); Jeffrey I. Peterman, Wyoming, MN (US); Stephen J. Roskens, Wyoming, MN (US); Rick Rue, Wyoming, MN (US); Tyler Alexander, Battle Ground, WA (US); David Buehler, Burgdorf (CH); Jonathan Little, Roseau, MN (US); Michael A. Thomas, Roseau, MN (US); Adam Lemay, Wyoming, MN (US); Christopher Edwards, Wyoming, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/834,391

(22) PCT Filed: Jan. 31, 2023

(86) PCT No.: PCT/US2023/061687
§ 371 (c)(1),
(2) Date: Jul. 30, 2024

(87) PCT Pub. No.: WO2023/147599
PCT Pub. Date: Aug. 3, 2023

(65) Prior Publication Data

US 2025/0136087 A1 May 1, 2025

Related U.S. Application Data

(60) Provisional application No. 63/304,884, filed on Jan. 31, 2022.

(51) Int. Cl.
*B60W 30/02* (2012.01)
*B60W 10/18* (2012.01)
(Continued)

(52) U.S. Cl.
CPC ............ *B60W 30/02* (2013.01); *B60W 10/18* (2013.01); *B60W 10/20* (2013.01); *B60W 10/26* (2013.01);
(Continued)

(58) Field of Classification Search
CPC ...... B60W 30/02; B60W 20/15; B60W 10/18; B60W 10/20; B60W 10/26; B60W 50/14;
(Continued)

(56) References Cited

U.S. PATENT DOCUMENTS

| | | | |
|---|---|---|---|
| 10,700,773 | B1 | 6/2020 | Hubbell |
| 2005/0033486 | A1 | 2/2005 | Schmitt |

(Continued)

FOREIGN PATENT DOCUMENTS

| | | | |
|---|---|---|---|
| AU | 2023214023 A1 | 8/2024 | |
| CA | 3251196 A1 | 8/2023 | |

(Continued)

OTHER PUBLICATIONS

CN-111231620-A machine translation (Year: 2020).*
(Continued)

*Primary Examiner* — Navid Z. Mehdizadeh
*Assistant Examiner* — Oliver Tan
(74) *Attorney, Agent, or Firm* — SCHWEGMAN LUNDBERG & WOESSNER, P.A.

(57) ABSTRACT

Aspects of the present disclosure relate to an electric or hybrid vehicle. Aspects of the vehicle may be used to provide a variety of functionality, including power exporting and aggregation, power take off functionality, thermal signature reduction, and improved vehicle longevity, vehicle turning, and vehicle control techniques.

29 Claims, 39 Drawing Sheets

(51) Int. Cl.

| | |
|---|---|
| ***B60W 10/20*** | (2006.01) |
| ***B60W 10/26*** | (2006.01) |
| ***B60W 20/15*** | (2016.01) |
| ***B60W 50/14*** | (2020.01) |
| ***F02D 1/00*** | (2006.01) |

(52) U.S. Cl.
CPC ............ *B60W 20/15* (2016.01); *B60W 50/14* (2013.01); *F02D 1/00* (2013.01); *B60W 2050/146* (2013.01); *B60W 2510/246* (2013.01)

(58) Field of Classification Search
CPC ....... B60W 2050/146; B60W 2510/246; F02D 1/00
See application file for complete search history.

(56) References Cited

U.S. PATENT DOCUMENTS

| | | | | |
|---|---|---|---|---|
| 2005/0206231 | A1 | 9/2005 | Lu | |
| 2012/0168140 | A1* | 7/2012 | Yokkoyama | B60L 3/003 165/200 |
| 2014/0097261 | A1* | 4/2014 | Blumenstock | B60H 1/22 165/41 |
| 2015/0375596 | A1* | 12/2015 | Blain | B60K 1/04 165/47 |
| 2016/0046287 | A1 | 2/2016 | Owen | |
| 2017/0234771 | A1* | 8/2017 | Watase | G01K 1/02 374/145 |
| 2017/0328682 | A1 | 11/2017 | Smith | |
| 2021/0399357 | A1* | 12/2021 | Choi | H01M 10/643 |
| 2022/0234412 | A1* | 7/2022 | Tonkovich | B60G 21/106 |
| 2023/0018536 | A1* | 1/2023 | Viitasalo | B60K 17/28 |
| 2023/0064027 | A1* | 3/2023 | Hallberg | B60L 50/64 |
| 2023/0393430 | A1* | 12/2023 | Pfeiffer | B60R 13/10 |

FOREIGN PATENT DOCUMENTS

| | | | | |
|---|---|---|---|---|
| CN | 111231620 A * | 6/2020 | B60H 1/04 |
| DE | 102013217656 | 3/2014 | |
| EP | 4472873 A2 | 12/2024 | |
| KR | 20160052134 A * | 5/2016 | H02J 7/0013 |
| WO | 2021055758 | 3/2021 | |
| WO | 2022/107126 | 5/2022 | |
| WO | WO-2023147599 A2 | 8/2023 | |
| WO | WO-2023147599 A3 | 9/2023 | |

OTHER PUBLICATIONS

KR-20160052134-A machine translation (Year: 2016).*
1999 Chevrolet Fuel Pump Wiring Diagram (Year: 1999).*
1999 Chevrolet Engine Compartment (Year: 1999).*
1998 Toyota Landcruiser Differential Lock (Year: 1998).*
International Search Report and Written Opinion issued by the International Searching Authority, dated Jul. 27, 2023, for International Patent Application No. PCT/US2023/061687; 11 pages.
International Preliminary Report on Patentability issued by The International Bureau of WIPO, dated Aug. 6, 2024, for International Patent Application No. PCT/US2023/061687; 8 pages.
"European Application Serial No. 23747978.7, Response to Communication pursuant to Rules 161(1) and 162 EPC filed Mar. 7, 2025", 12 pgs.
"European Application Serial No. 23747978.7, Extended European Search Report mailed Jan. 13, 2026", 8 pgs.

* cited by examiner

Terrain/Wheel Total Force
Conflict Force
Net Applied Rotation Force
Terrain Counter Force
Tires Rotating Backwards
Torque
Net Rotational Force
Tires Rotating Backwards
Torque
1604
1602
1600
1606
1608
Torque
Tires Rotating Forwards
Torque
Tires Rotating Forwards 1 Button Toggle and Turn-Direction Maintain Solution 2 Button State Toggle Solution Rotate LEFT Forward/ Reverse Rotate RIGHT Forward/ Reverse 4 Button Solution Rotate LEFT Forward Rotate LEFT Reverse

ELECTRIC OR HYBRID VEHICLE

CROSS-REFERENCE TO RELATED APPLICATIONS

The present application is a national stage entry of International (PCT) Patent Application Number PCT/US2023/061687, filed Jan. 31, 2023, which claims the benefit of U.S. Provisional Patent Application No. 63/304,884, filed Jan. 31, 2022, titled ELECTRONIC OR HYBRID VEHICLE, the entire disclosures of which are expressly incorporated by reference herein.

TECHNICAL FIELD

The present application relates to an electric or hybrid vehicle and, more particularly, to vehicle systems and associated control techniques.

BACKGROUND

Recreational vehicles, such as motorcycles or off-road vehicles such as all-terrain vehicles (ATVs), utility vehicles (UVs), side-by-side vehicles, and snowmobiles, may be used for a variety of purposes. These vehicles might be used on roads and/or trails and may be equipped with systems to control vehicle functionality.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods for controlling one or more systems of a vehicle based on a determined vehicle instability. As an example, a method may include obtaining, from a set of sensors of the vehicle, vehicle environment information; processing the vehicle environment information to generate terrain information; generating, based on a state of the vehicle and the generated terrain information, a projected vehicle stability metric; and in response to determining that the vehicle stability metric exceeds a predetermined threshold: generating a set of candidate locations based on the generated terrain information; and controlling at least one of a steering system of the vehicle or a braking system of the vehicle system based on a candidate location of the set of candidate locations.

In another example, a vehicle is provided. The vehicle may include a plurality of ground engaging members, a frame supported by the plurality of ground engaging members, a cooling system supported by the frame and configured to cool a heat source of the vehicle, the cooling system including a radiator coupled to a coolant flow controller, and a cooling controller to control the cooling system. The cooling controller may be configured to regulate the coolant flow controller to direct heat from the vehicle heat source to the radiator in a first operating mode; and configure the coolant flow controller to direct heat from the vehicle heat source to a battery of the vehicle in a second operating mode.

In a further example, a method for controlling a cooling system of a vehicle is provided. The method may include configuring the cooling system to dissipate heat at an increased rate as compared to a normal mode of operation of the cooling system; configuring the cooling system to direct heat of an electric motor of the vehicle to a battery pack of the vehicle, thereby reducing a thermal signature of the vehicle associated with a radiator of the cooling system; evaluating a temperature of the battery pack based on a first predetermined threshold; and based on determining the temperature of the battery pack exceeds the first predetermined threshold, configuring the cooling system to direct heat of the electric motor to a set of electronics of the vehicle.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. The following detailed description is therefore not to be taken in a limiting sense, and the scope of the present disclosure is defined by the appended claims and their equivalents.

Figure 1:
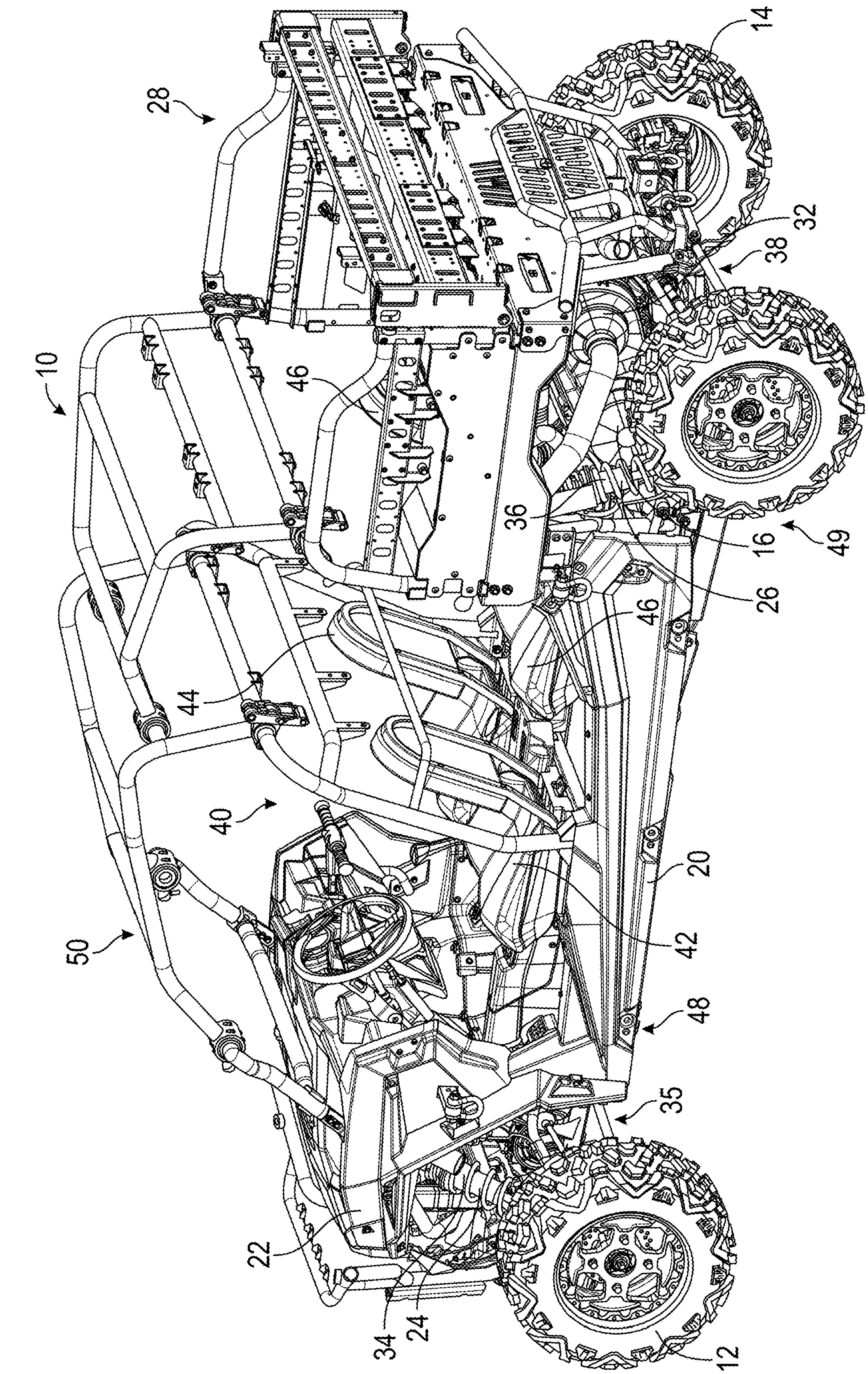
FIG. 1 is a rear left perspective view of an example hybrid utility vehicle of the present disclosure.

Referring to FIG. 1, an illustrative embodiment of a hybrid utility vehicle 10 is shown, and includes ground engaging members, including front ground engaging members 12 and rear ground engaging members 14, a powertrain assembly 16, a frame 20, a plurality of body panels 22 coupled to frame 20, a front suspension assembly 24, a rear suspension assembly 26, and a rear cargo area 28. In one embodiment, one or more ground engaging members 12, 14 may be replaced with tracks, such as the Prospector II tracks available from Polaris Industries, Inc. located at 2100 Highway 55 in Medina, Minnesota 55340, or non-pneumatic tires as disclosed in any of U.S. Pat. Nos. 8,109,308, filed on Mar. 26, 2008; U.S. Pat. No. 8,176,957, filed on Jul. 20, 2009; and 9,108,470, filed on Nov. 17, 2010; and U.S. Patent Application Publication No. 2013/0240272, filed on Mar. 13, 2013, the complete disclosures of which are expressly incorporated by reference herein. Vehicle 10 may be referred to as a utility vehicle ("UV"), an all-terrain vehicle ("ATV"), or a side-by-side vehicle ("SxS") and is configured for travel over various terrains or surfaces. More particularly, vehicle 10 may be configured for military, industrial, agricultural, or recreational applications.

Powertrain assembly 16 is operably supported on frame 20 and is drivingly connected to one or more of ground engaging members 12, 14. As shown in FIG. 1, powertrain assembly 16 may include an engine 30 (FIG. 2A) and a transmission, for example a continuously variable transmission ("CVT") 32 and/or a shiftable transmission (not shown, and may be operably coupled to or included within a driveline assembly including front and rear differentials (not shown) and a drive shaft (not shown). Engine 30 may be a fuel-burning internal combustion engine, however, any engine assembly may be contemplated, such as hybrid, fuel cell, or electric engines or units. In one embodiment, powertrain assembly 16 includes a turbocharger (not shown) and engine 30 is a diesel internal combustion engine. Additional details of CVT 32 may be disclosed in U.S. Pat. Nos. 3,861,229; 6,176,796; 6,120,399; 6,860,826; and 6,938,508, the complete disclosures of which are expressly incorporated by reference herein.

Front suspension assembly 24 may be coupled to frame 20 and front ground engaging members 12. As shown in FIG. 1, front suspension assembly 24 includes a shock 34 coupled to each front ground engaging member 12 and a front axle arrangement which may include a front control arm assembly 35. Similarly, rear suspension assembly 26 may be coupled to frame 20 and rear ground engaging members 14. Illustratively, rear suspension assembly 26 includes a shock 36 coupled to each rear ground engaging member 14 and a rear axle arrangement 38. Additional details of powertrain assembly 16, the driveline assembly, and front suspension assembly 24 may be described in U.S. Pat. No. 7,819,220, filed Jul. 28, 2006, titled "SIDE-BY-SIDE ATV" and U.S. Patent Application Publication No. 2008/0023240, filed Jul. 28, 2006, titled "SIDE-BY-SIDE ATV"; and additional details of rear suspension assembly 26 may be described in U.S. Patent Application Publication No. 2012/0031693, filed Aug. 3, 2010, titled "SIDE-BY-SIDE ATV, the complete disclosures of which are expressly incorporated by reference herein.

Referring still to FIG. 1, vehicle 10 includes an operator area 40 supported by frame 20, and which includes seating for at least an operator and a passenger. Illustratively, one embodiment of vehicle 10 includes four seats, including an operator seat 42, a front passenger seat 44, and two rear passenger seats 46. More particularly, operator seat 42 and front passenger seat 44 are in a side-by-side arrangement, and rear passengers seats 46 also are in a side-by-side arrangement. Rear passenger seats 46 are positioned behind operator seat 42 and front passenger seat 44 and may be elevated relative to seats 42, 44. Operator seat 42 includes a seat bottom, illustratively a bucket seat, and a seat back. Similarly, front passenger seat 44 includes a seat bottom, illustratively a bucket seat, and a seat back. Likewise, each rear passenger seat 46 includes a seat bottom, illustratively a bucket seat, and a seat back.

Vehicle 10 further includes frame 20 supported by ground engaging members 12, 14. In particular, frame 20 includes a front frame portion 48 and a rear frame portion 49. Illustratively, rear frame portion 49 supports powertrain assembly 16 and rear cargo area 28. Vehicle 10 also includes an overhead or upper frame portion 50. Upper frame portion 50 is coupled to frame 20 and cooperates with operator area 40 to define a cab of vehicle 10. Additional details of vehicle 10 may be disclosed in U.S. Pat. No. 8,998,253, filed Mar. 28, 2013, the complete disclosure of which is expressly incorporated by reference herein.

Figure 2A:
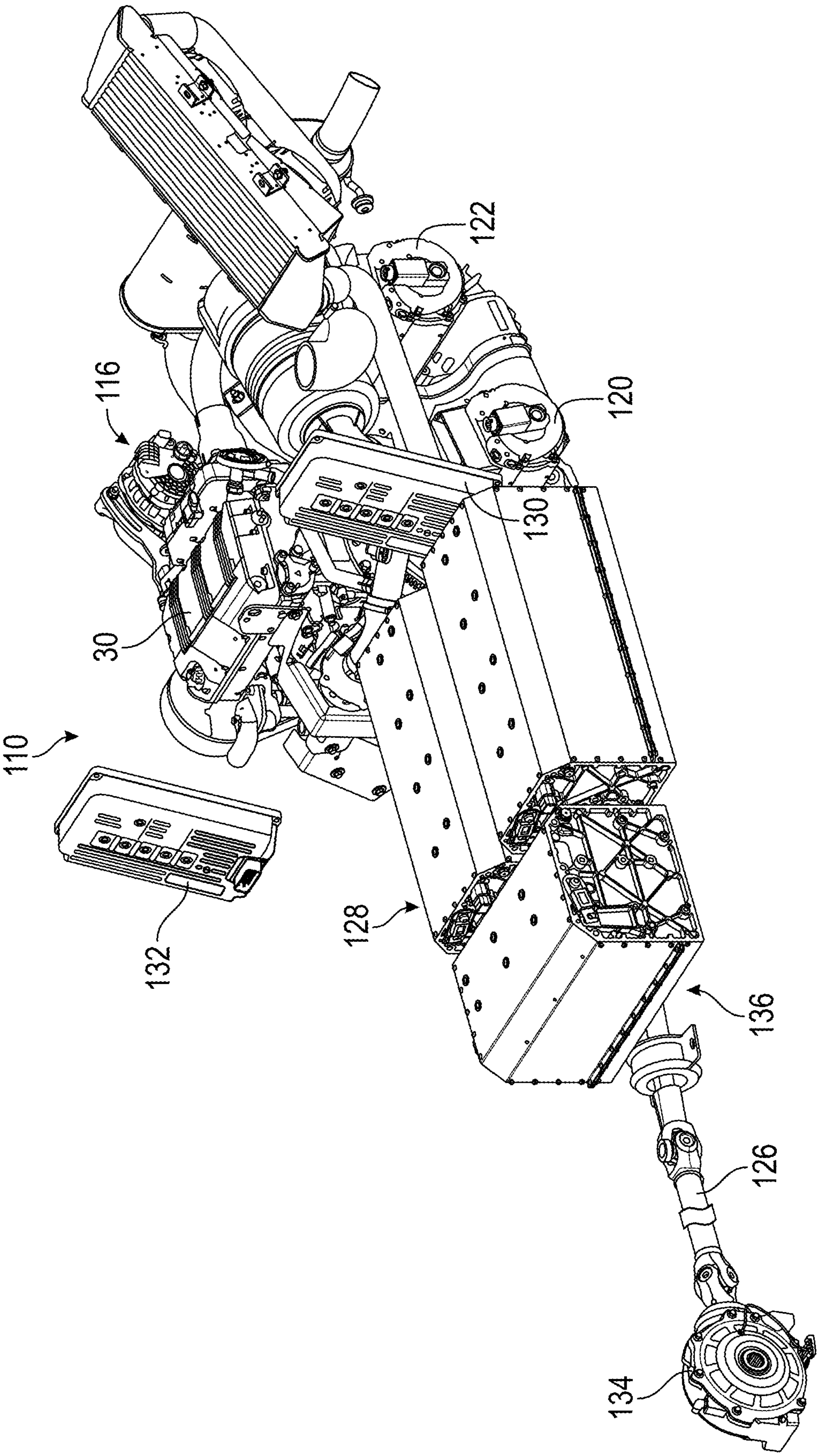
FIG. 2A is a front left perspective view of a driveline of a series hybrid utility vehicle of the present disclosure operably coupled to a first embodiment of a powertrain assembly.
Figure 2B:
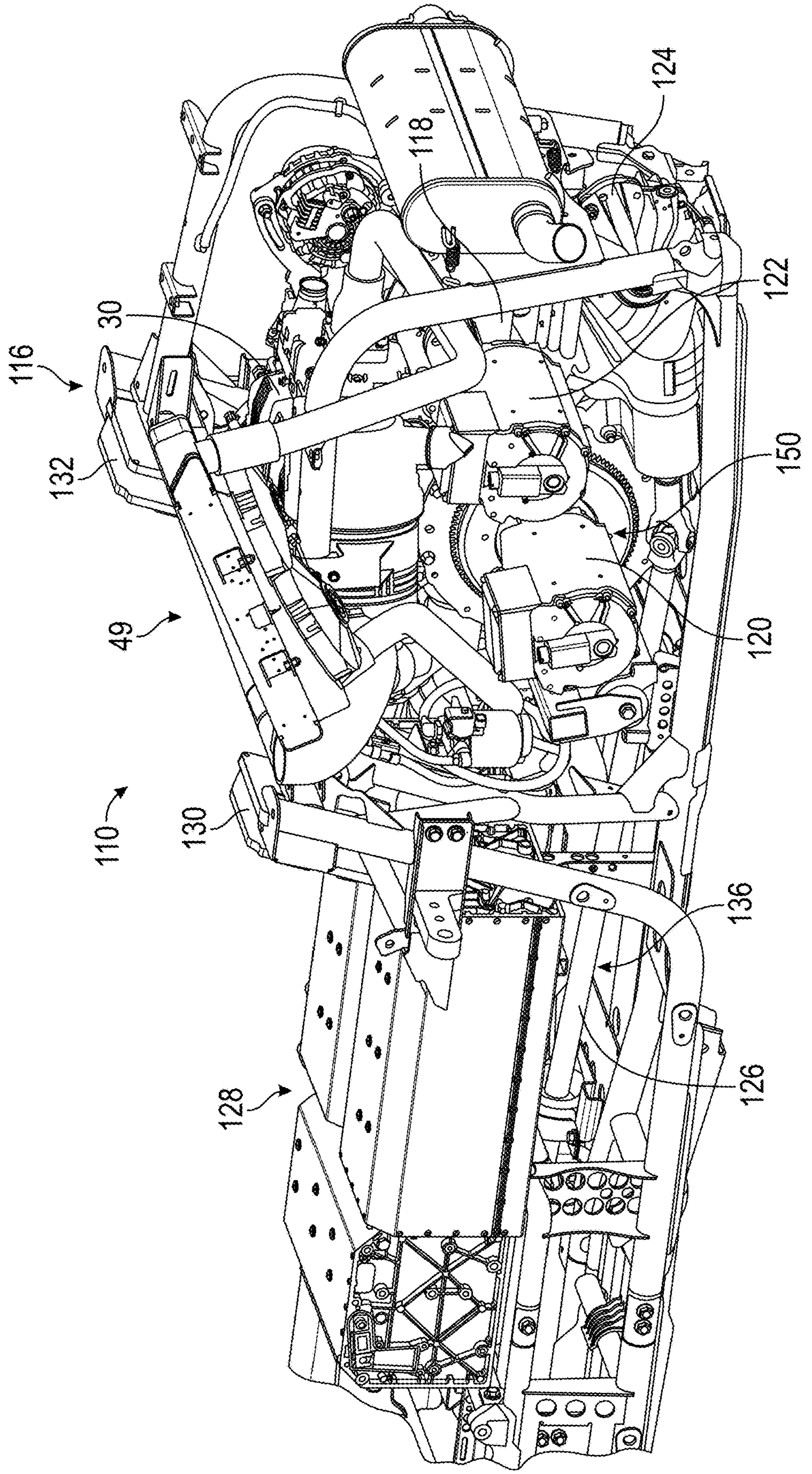
FIG. 2B is a rear left perspective view of the powertrain assembly of the series hybrid utility vehicle of FIG. 2A.

Referring to FIGS. 2A and 2B, in one embodiment, vehicle 10 is a series hybrid utility vehicle 110 configured for all-electrical operation. Vehicle 110 includes an alternative powertrain assembly 116 and an electrical system 150. Powertrain assembly 116 includes engine 30 but does not include CVT 32, although powertrain assembly 116 still includes a transmission 118, which may be a shiftable transmission or gearbox, operably coupled to engine 30. Instead of CVT 32, powertrain assembly 116 is operably coupled to electrical system 150 which includes a motor/generator 120 operably coupled to engine 30 and a traction motor 122 operably coupled to transmission 118 and motor/generator 120. Motor/generator 120 is configured to convert the rotary power supplied by engine 30 into electrical power to be used by traction motor 122, a plurality of battery packs 128, or any other component of vehicle 110. Illustrative vehicle 110 is always electrically driven and, therefore, no CVT or other mechanical drive system is needed between engine 30 and a driveline 136 of vehicle 110.

Referring still to FIGS. 2A and 2B, engine 30 acts an electric generator to provide rotary power to motor/generator 120 which is operably coupled to the crankshaft of engine 30 via a belt or is operably coupled to engine 30 through a gear box. For example, when engine 30 is operating, the crankshaft rotates to provide power to motor/generator 120 which then supplies power to traction motor 122 via a motor controller 130 (e.g., which may be, or includes, an inverter). Traction motor 122 also may be coupled to a second motor controller 132 (e.g., which may be, or includes, an inverter) to supply power to driveline 136. Traction motor 122 is then configured to supply power to front and rear ground engaging members 12, 14 by providing power either to transmission 118, a prop shaft gear box (not shown), a front gear box (not shown), or directly to each front and rear ground engaging member 12, 14. More particularly, traction motor 122 drives transmission 118 which drives rear ground engaging members 14 through a rear differential or gear box 124 and drives front ground engaging members 12 through a prop shaft 126 which is operably coupled to a front differential or gear box 134 (FIG. 2A).

Figure 2C:
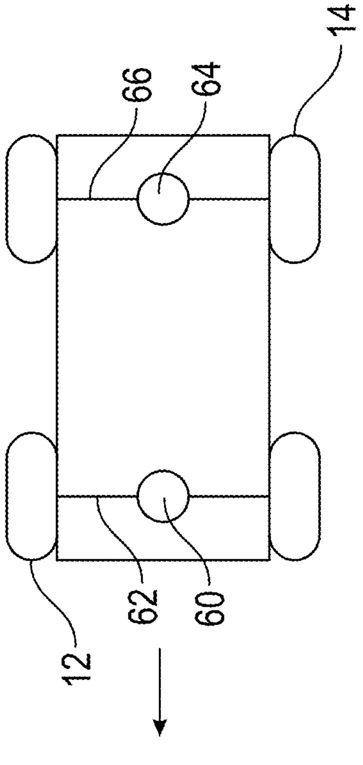
FIG. 2C is a schematic view of the vehicle of FIG. 2A in an ideal turn.
Figure 2D:
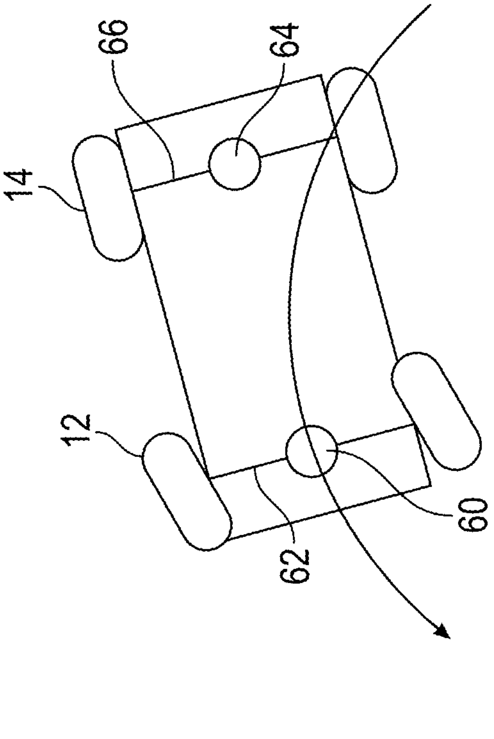
FIG. 2D is a schematic view of the vehicle of FIG. 2A in an oversteer situation.

Front and rear ground engaging members 12, 14 may each include individual motors to provide torque vectoring attributes. More particularly, and referring to FIG. 2C, a front accelerometer 60 (e.g., acceleration vector, $\vec{a}_{60}$) may be positioned at a front axle 62 and a rear accelerometer 64 (e.g., acceleration vector, $\vec{a}_{64}$) may be positioned at a rear axle 66 of vehicle 110. Using a standard or X-Y-Z coordinate system and $\vec{a}_{60}-\vec{a}_{64}=0$, the lateral acceleration of vehicle 110 may be measured along the Y-axis and the longitudinal acceleration of vehicle 110 may be measured along the X-axis. If vehicle 110 is an ideal turn, the lateral acceleration of both front and rear axles 62, 66 will be the same. However, if vehicle 110 tends to oversteer, as shown in FIG. 2D, the lateral acceleration on rear axle 66 is less than the lateral acceleration on front axle 62 because rear ground engaging members 14 are not able to maintain the same turning radius as front ground engaging members 12. In this oversteering situation, $\vec{a}_{60}-\vec{a}_{64}>0$. In order to correct the oversteering situation, the ECU moves the traction torque distribution from a rear motor to a front motor until $\vec{a}_{60}-\vec{a}_{64}=0$ is restored. In doing so, the torque vectoring adjusts the original torque distribution based on driver input(s) and the driving situation to maintain a stable driving behavior and vehicle safety.

Figure 2E:
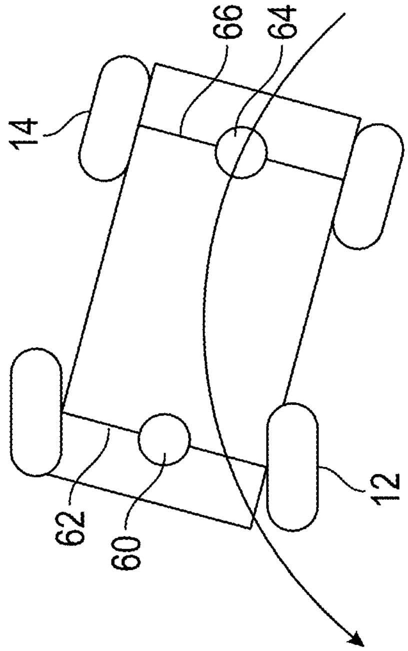
FIG. 2E is a schematic view of the vehicle of FIG. 2A in an understeer situation.

Conversely, as shown in FIG. 2E, if vehicle 110 tends to understeer, the lateral acceleration on rear axle 66 is greater than on front axle 62 because front ground engaging members 12 do not maintain the intended turning radius. In this understeering situation, $\vec{a}_{60}-\vec{a}_{64}<0$. In order to correct the understeering situation, the ECU moves the traction torque distribution from the front motor to the rear motor until $\vec{a}_{60}-\vec{a}_{64}=0$ is restored. In doing so, the torque vectoring adjusts the original torque distribution based on driver input(s) and the driving situation to maintain a stable driving behavior and vehicle safety.

Additionally, traction control is monitored, adjusted, and/or contemplated when using torque vectoring for both optimal acceleration of vehicle 110 and stability of vehicle 110 during operation. Traction control monitors the rotational speed of both front and rear axles 62, 66 and also calculates and/or stores derivatives of the signals generated based on the rotational speed of front and rear axles 62, 66. If either the rotational speed or its derivatives differs between front and rear axles 62, 66, the traction control limits the requested torque to one or both of the front and rear motors. In another example, left/right torque vectoring may be used additionally, or alternatively, to front/rear torque vectoring.

As shown in FIGS. 2A and 2B, vehicle 110 also includes battery packs 128. In one embodiment, battery packs 128 are supported by rear frame portion 49 and are positioned either below rear passenger seats 46 or, illustratively, one or more of rear passenger seats 46 are removed to provide available space for battery packs 128. Battery packs 128 are operably coupled to motor/generator 120 and traction motor 122. Because battery packs 128 are operably coupled to motor/generator 120, motor/generator 120 is able to charge battery packs 128 when vehicle 110 is at rest. Additionally, vehicle 110 may be up-idled to provide more electrical power to battery packs 128 than vehicle 110 is consuming during driving in order to charge battery packs 128. Additionally, vehicle 110 is configured for regenerative braking such that driveline 136 can act as a kinetic energy recovery system as vehicle 110 decelerates, coasts, or brakes in order to capture braking energy for charging battery packs 128.

In one embodiment, battery packs 128 also are operably coupled to traction motor 122 to provide power thereto. However, if battery packs 128 are removed from vehicle 110, engine 30 is configured to constantly supply power to traction motor 122 via motor/generator 120 and motor controllers 130, 132.

Figure 2F:
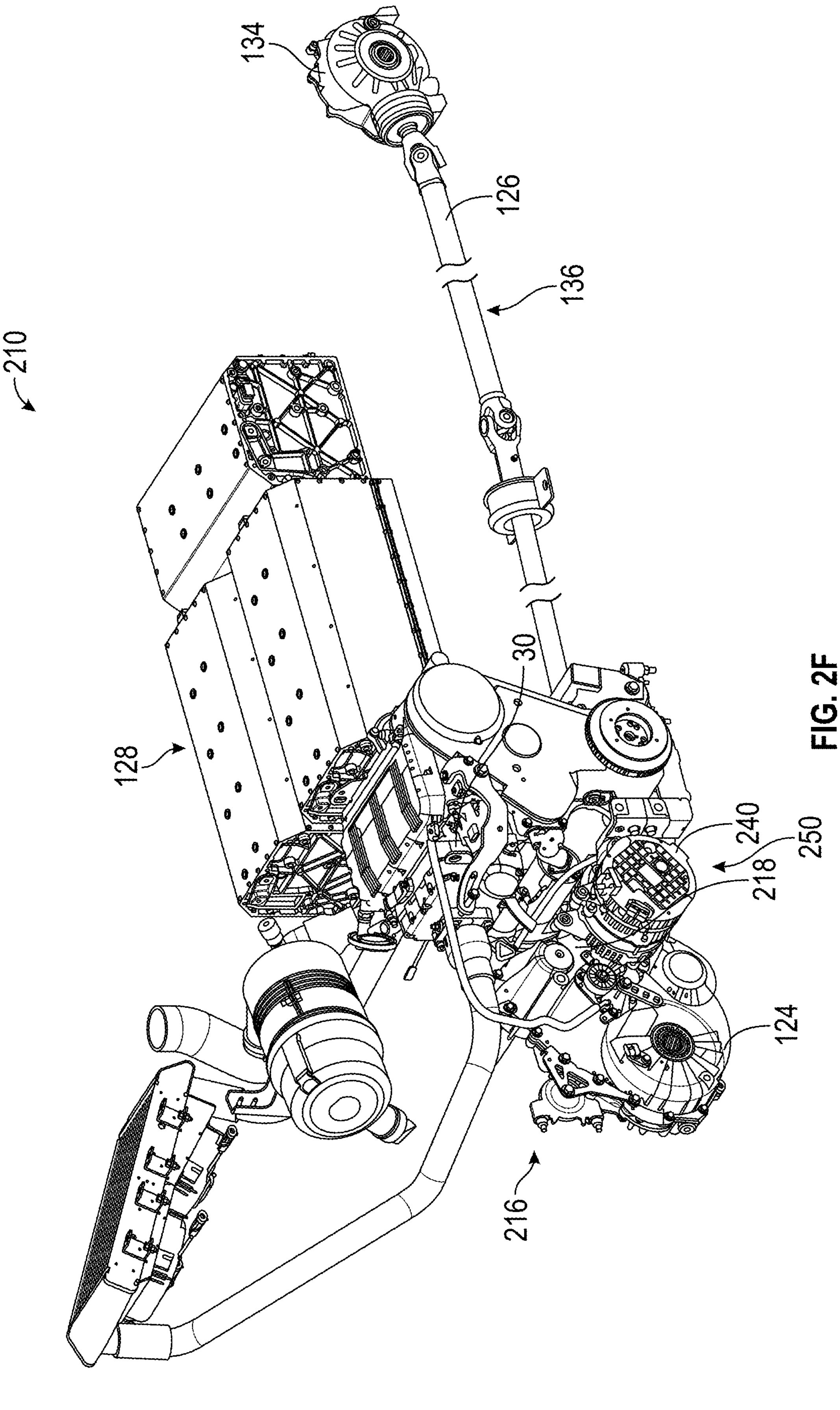
FIG. 2F is a rear right perspective view of a driveline of a first embodiment of a parallel hybrid utility vehicle of the present disclosure operably coupled to a second embodiment of a powertrain assembly.
Figure 2G:
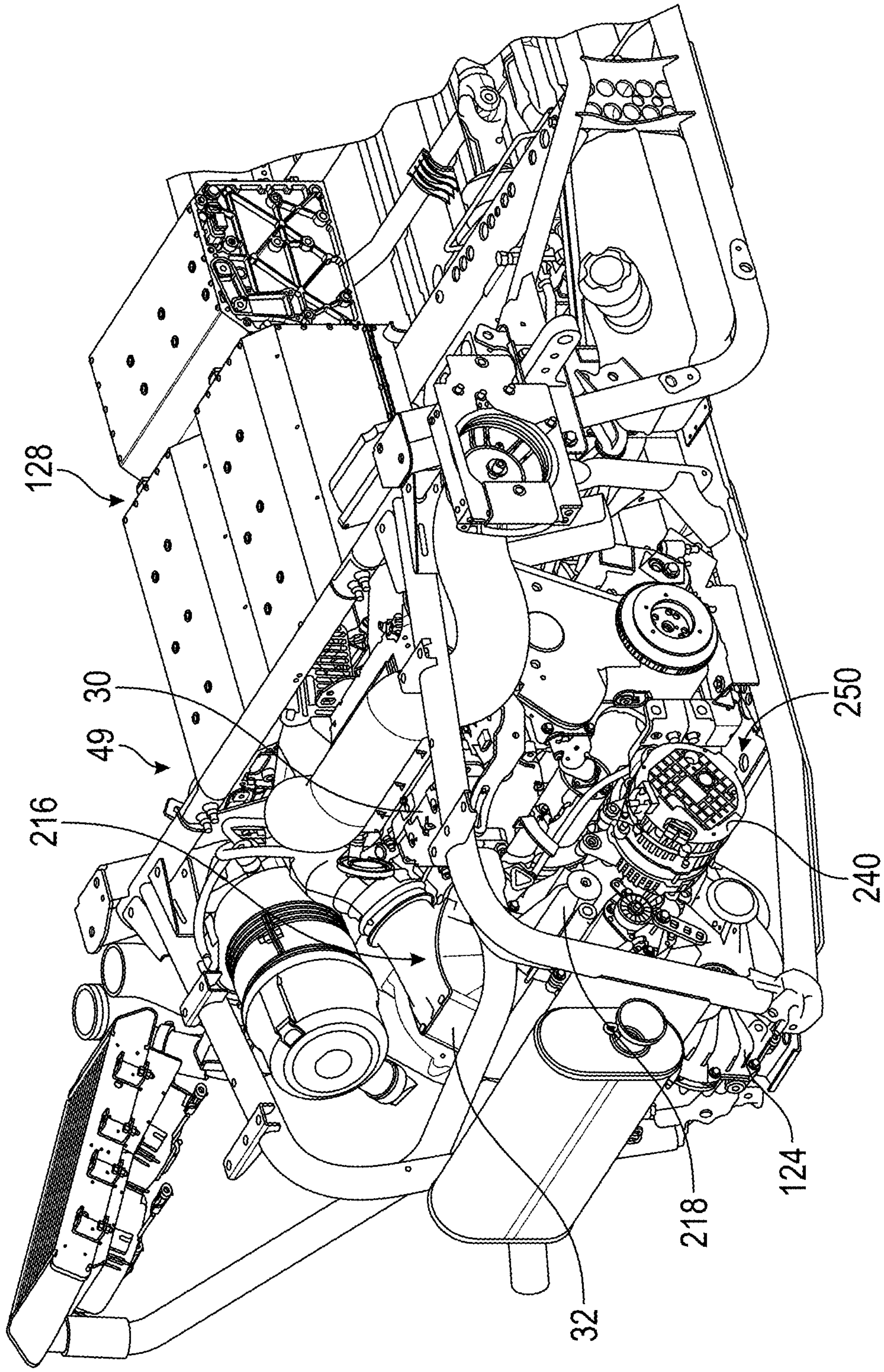
FIG. 2G is a rear right perspective view of the powertrain assembly of the first embodiment hybrid utility vehicle.

Referring now to FIGS. 2F and 2G, vehicle 10 is shown as a parallel hybrid utility vehicle 210 with an alternative powertrain assembly 216. More particularly, vehicle 210 is a non-charge at rest parallel hybrid utility vehicle. Unlike powertrain assembly 116 (FIGS. 2A and 2B), powertrain assembly 216 includes engine 30, CVT 32, and a transmission 218, which may be a shiftable transmission or gearbox. Additionally, unlike electrical system 150 of FIG. 2B, electrical system 250 of vehicle 210 does not include motor/generator 120 or traction motor 122 (FIG. 2B). Instead of motor/generator 120 and traction motor 122, electrical system 250 includes an electric motor 240 operably coupled to an input (not shown) on transmission 218. Because motor/generator 120 is not provided on vehicle 210, powertrain assembly 216 is not configured for the Charge at Rest drive mode or any battery charging from engine 30. Rather, vehicle 210 is always mechanically driven by engine 30, CVT 32, and transmission 218. However, when in particular drive modes or applications, vehicle 210 may be driven electrically for a limited period of time. In this way, vehicle 210 may be considered a low or mild hybrid vehicle which is primarily mechanically driven by engine 30, CVT 32, and transmission 218 but can be driven electrically by battery packs 128 and motor 240 for a short duration (e.g., approximately 10-20 miles in off-road use, likely at speeds of 25 miles per hour or less). In one embodiment, motor 240 may include or be operably coupled to an inverter.

Additional example aspects of vehicle 10 may be disclosed in U.S. Pat. No. 10,118,477, the complete disclosure of which is expressly incorporated by reference herein.

Figure 3:
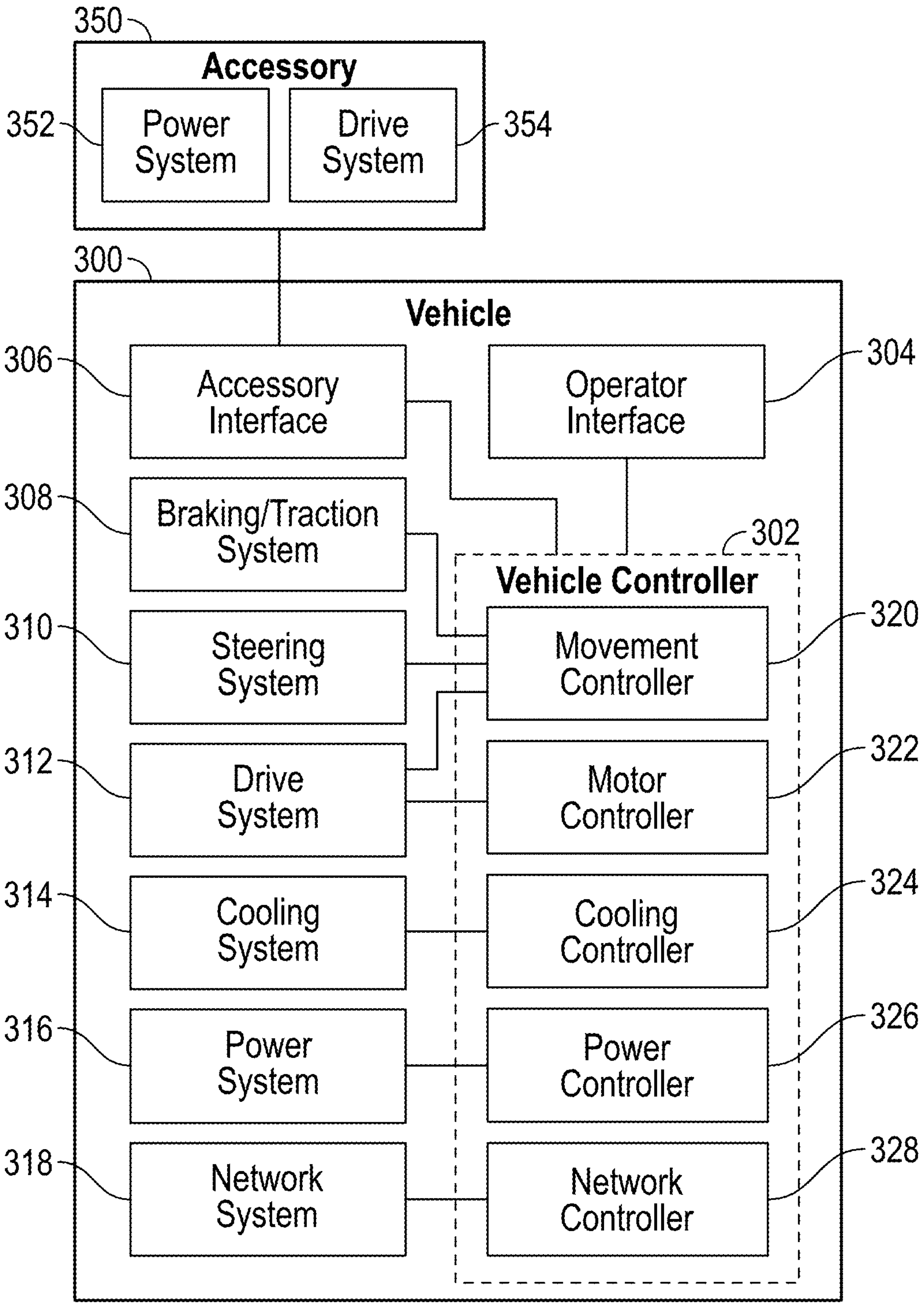
FIG. 3 is a representative view of an example vehicle according to aspects described herein.

FIG. 3 is a representative view of an example vehicle 300 according to aspects described herein. Aspects of vehicle 300 are similar to vehicle 10 discussed above with respect to FIGS. 1-2G and are therefore not necessarily re-described below in detail. For example, vehicle 300 may be a hybrid vehicle (e.g., having both an internal combustion engine 30 and a traction motor 122) or may be an electric vehicle. While aspects described herein are described in the context of a hybrid or electric vehicle, it will be appreciated that similar aspects may be applied to any of a variety of other vehicles, including internal combustion vehicles.

As illustrated, vehicle 300 includes vehicle controller 302 and operator interface 304. In examples, operator interface 304 which includes at least one input device (not pictured) and at least one output device (not pictured). Example input devices include levers, buttons, switches, touch screens, soft keys, and other suitable input devices. Example output devices include lights, displays, audio devices, tactile devices, and other suitable output devices. An operator may signal to vehicle controller 302 to alter the operation of one or more systems of vehicle 300 through the input devices.

Vehicle controller 302 has at least one processor and at least one associated memory. Vehicle controller 302 may be a single device or a distributed device, and the functions of the vehicle controller 302 may be performed by hardware and/or as computer instructions on a non-transitory computer readable storage medium, such as the associated memory.

As illustrated, vehicle controller 302 includes movement controller 320, motor controller 322, cooling controller 324, power controller 326, and network controller 328. In examples, vehicle controller 302 controls functionality of vehicle 300, including braking/traction system 308, steering system 310, drive system 312, cooling system 314, power system 316, and network system 318. Vehicle controller 302 may communicate with systems of vehicle 300 using any of a variety of protocols, including, but not limited to, a controller area network (CAN) bus, an Ethernet or BroadR-Reach connection, a fiber connection, a universal serial bus (USB) connection, and/or a wireless connection.

As illustrated, movement controller 320 communicates with braking/traction system 308, steering system 310, and drive system 312. For example, movement controller 320 may control the pressure and frequency of the actuation of one or more brake calipers of braking/traction system 308, a steering angle of one or more ground engaging members (e.g., ground engaging members 12, 14) of steering system 310, and/or a power output of one or more engines (e.g., engine 30) and/or electric motors (e.g., traction motor 122 and/or electric motor 240) of drive system 312, for example via a transmission. While example aspects are described herein with respect to braking/traction system 308 and/or steering system 310, it will be appreciated that similar techniques may be used in instances where drive system 312 includes an individual drive motor for each ground engaging member. For example, a set of drive motors may be used to provide vehicle stability aspects as an alternative to or in addition to control of braking/traction system 308 and/or steering system 310.

Drive system 312 may further include powertrain assembly 16. In examples, movement controller 320 may receive user input via external controls (e.g., of operator interface 304) and control system 308, 310, and/or 312 accordingly. In other examples, vehicle controller 302 may be an autonomous-ready system that automatically affects operation of vehicle 300 in response to detected conditions of the vehicle and/or the environment in which the vehicle is operating. Examples of such aspects are described in greater detail below.

In examples where movement controller 320 controls an electric motor, movement controller 320 may communicate with motor controller 322 to control the electric motor accordingly. For example, motor controller 322 may control power provided from power system 316 to control the power output of the electric motor. Power system 316 includes any of a variety of power sources, including, but not limited to, battery packs 128 and motor/generator 120. In examples, an electric motor of drive system 312 operates using multiple phases of alternating current (AC) power, such that motor controller 322 adapts power from power system 316 according to supply power to the electric motor accordingly. For example, motor controller 322 may provide three-phase AC power.

A phase failure condition may occur as a result of a damaged cable that supplies power to the electric motor or a broken connection terminal, among other examples. As an example, of the three phases of AC power, two phases may be available. Accordingly, motor controller 322 may identify the phase failure condition and may operate the electric motor in a reduced operating mode. In some instances, user input may be received (e.g., via operator interface 304) to manually enter or exit the reduced operating mode. In the reduced operating mode, motor power may be reduced and/or a different torque map may be used.

Drive system 312 may be configured to provide mechanical energy to a device that is external to vehicle 300 or is otherwise distinct from drive system 312. For example, as illustrated in FIG. 3, accessory 350 includes drive system 354 that may receive mechanical energy from vehicle 300 according to aspects described herein. Drive system 354 may be selectively coupled to drive system 312, for example by vehicle controller 302 in response to a received user indication or automatically as a result of an action performed by an operator of vehicle 300.

As an example, an operator may reconfigure an electric motor of drive system 312 such that it may be used to provide mechanical energy to drive system 354 of accessory 350 accordingly. As a result, the reconfigured electric motor may no longer be mechanically coupled to ground engaging members of vehicle 300. Motor controller 322 may automatically determine that the electric motor has been reconfigured or a user indication may be received (e.g., via operator interface 304). User input may be received via operator interface 304 to control the reconfigured electric motor and, as a result, accessory 350. In examples, another electric motor may remain mechanically coupled one or more ground engaging members of vehicle 300 and may therefore be used to power vehicle 300 accordingly. In some instances, the remaining electric motor may be reconfigured to compensate for the reconfigured electric motor. Additional examples of such aspects are described below with respect to FIGS. 11A-B.

In examples, drive system 312 includes a set of temperature sensors that may be monitored by motor controller 322. For example, motor controller 322 may monitor the temperature of each remaining phase of an electric motor with respect to a predetermined threshold to reduce the likelihood that remaining phases of the electric motor experience reduced operation or a failure, as may occur when a remaining phase overheats. Examples of such aspects are discussed in greater detail below with respect to FIGS. 9 and 10A-B.

It will be appreciated that similar techniques may be applied in instances where drive system 312 includes multiple electric motors. For example, a reduced operating mode may be entered with respect to an electric motor that has experienced a phase failure condition independent of other electric motors of vehicle 300. In another example, a phase failure condition in one electric motor and cause the behavior of one or more other electric motors to be adapted in response to the identified phase failure condition according to aspects described herein.

A component of vehicle 300 may have a range in which or a threshold above or below which operation is recommended, for example as compared to operation outside of the range or below or above the threshold, respectively. Accordingly, vehicle 300 includes cooling system 314 to maintain component temperatures. Cooling controller 324 may monitor the temperature of vehicle components and control cooling system 314 to maintain component temperatures according to associated thresholds and/or ranges. Example components include, but are not limited to, components of drive system 312, power system 316, and vehicle controller 302.

While cooling system 314 is described in examples where vehicle components are cooled, it will be appreciated that cooling system 314 may heat components in other examples. For example, battery pack 128 may have an optimal temperature range, such that cooling system 314 may reduce the temperature of battery pack 128 in some examples and raise the temperature of battery pack 128 in other examples.

In examples, cooling controller 324 may control cooling system 314 to reduce the external thermal signature of vehicle 300. For example, while cooling controller 324 may ordinarily direct heat from vehicle components to a radiator of cooling system 314, cooling controller 324 may instead direct heat from a first set of vehicle components to a second set of vehicle components, thereby reducing the heat output of vehicle 300. For example, heat from drive system 312 may be directed to power system 316. In such an example, heat generated by engines/motors of vehicle 300 may be stored in one or more battery packs. As a result, cooling controller 324 may cause the second set of vehicle components (and, in some examples, the first set of vehicle components) to operate outside of the operating range and/or thresholds discussed above. Additional examples of such aspects are described below with respect to FIGS. 4 and 5.

As noted above, power system 316 provides power to an electric motor of drive system 312. In examples, power system 316 provides power for other functionality of vehicle 300, such as operator interface 304, vehicle controller 302, braking/traction system 308, steering system 310, drive system 312, cooling system 314, and network system 318. In some instances, power system 316 includes a high-voltage power system associated with drive system 312 and other high-voltage vehicle functionality, as well as a low-voltage power system that is associated with vehicle controller 302 and other low-voltage vehicle functionality.

Power controller 326 may configure power system 316 to provide off-board power, for example from the high-voltage power system. As illustrated in FIG. 3, off-board power may be provided to accessory 350. Off-board power may include alternating current (AC) and/or direct current (DC) power. In some examples, a motor controller (motor controller 322) may be configured to provide off-board power instead of, or in addition to, powering an electric motor of drive system 312. Thus, in examples where vehicle 300 is stationary (e.g., a traction motor is not in use), power controller 326 may configure vehicle 300 to supply power from a battery bank and/or motor/generator, thereby providing off-board power accordingly.

As another example, power controller 326 may configure vehicle 300 to supply power to a power summing device (FIGS. 7A-7D), such that power of vehicle 300 may be used in conjunction with power of one or more other vehicles. As a result, the power summing device may be used to power accessories, charge vehicles, and/or for other applications that would otherwise not be possible or would be possible to a reduced degree (e.g., with longer charge times, reduced current and/or voltage, etc.). Additional examples of such aspects are discussed below with respect to FIGS. 7A-8B.

Vehicle 300 is further illustrated as including network system 318 and network controller 328. Network controller 328 may control communications between vehicle 300 and other vehicles and/or devices. For example, network system 318 may be used to communicate via a local area network, a peer-to-peer network, the Internet, or any of a variety of other networks. In one embodiment, network controller 328 communicates with paired devices utilizing a BLUETOOTH or WI-FI protocol. In this example, network system 318 may include a radio frequency antenna. Network controller 328 controls the pairing of devices to vehicle 300 and the communications between vehicle 300 and such remote devices.

As an example, a remote computing device (e.g., a mobile computing device or a tablet computing device) may be used to control aspects of vehicle 300. Control by the remote computing device may be similar to the control functionality provided by operator interface 304. For example, an operator may view image/video data from one or more cameras of the vehicle and may provide user input to control vehicle 300 accordingly. It will be appreciated that any number of networks, network types, and associated technologies may be used. For example, network system 318 may include a cellular antenna, a satellite antenna, and/or one or more components for wired communication.

As noted above, vehicle controller 302 may be an autonomous-ready system. For example, vehicle controller 302 may monitor systems and sensors of vehicle 300 and affect operation of vehicle 300 accordingly. Example sensors include a vehicle speed sensor, an engine RPM sensor, an inertial measurement unit (IMU), a global positioning system (GPS) sensor, a temperature sensor, a voltage sensor, a current sensor, a proximity sensor, an ultrasonic sensor, an image sensor, a light detection and ranging (LIDAR) sensor, and/or a radio detection and ranging (RADAR) sensor, among other examples. Vehicle controller 302 may affect operation of vehicle 300 by controlling one or more of systems 308, 310, and 312, among other examples. Example control aspects of vehicle controller 302 are discussed below with reference to FIGS. 12-18.

FIG. 3 also depicts accessory 350, which includes power system 352 and drive system 354. Example accessories include, but are not limited to, power tools, augers, and other vehicles, among other examples. As discussed above, accessory 350 may receive electrical power and/or mechanical energy from power system 316 and drive system 312, respectively, of vehicle 300. Additional example accessories are discussed below with respect to FIGS. 11A-B. In some instances, accessory 350 includes a controller that communicates with vehicle controller 302, for example to control or otherwise configure the electrical power and/or mechanical energy that is received from vehicle 300. In other examples, vehicle controller 302 may identify the presence of accessory 350 (e.g., automatically as a result of a change in the configuration of vehicle 300 or as a result of a user indication) and may control power system 352 and/or drive system 354 of accessory 350 accordingly. As an example, accessory 350 may provide electrical power and/or mechanical energy to vehicle 300. For instance, motor controller 322 may configure drive system 312 to generate electrical power using the mechanical energy from accessory 350. Accordingly, electrical power obtained from accessory 350 (e.g., as may be generated from the mechanical energy or received from power system 352 of accessory 350) may be used and/or stored by vehicle 300. Operation of accessory 350 may be controlled via one or more input controls of accessory 350, via operator interface 304 of vehicle 300, and/or via a remote computing device (e.g., as may communicate with a controller of accessory 350 and/or network controller 328 of vehicle 300).

Figure 4A:
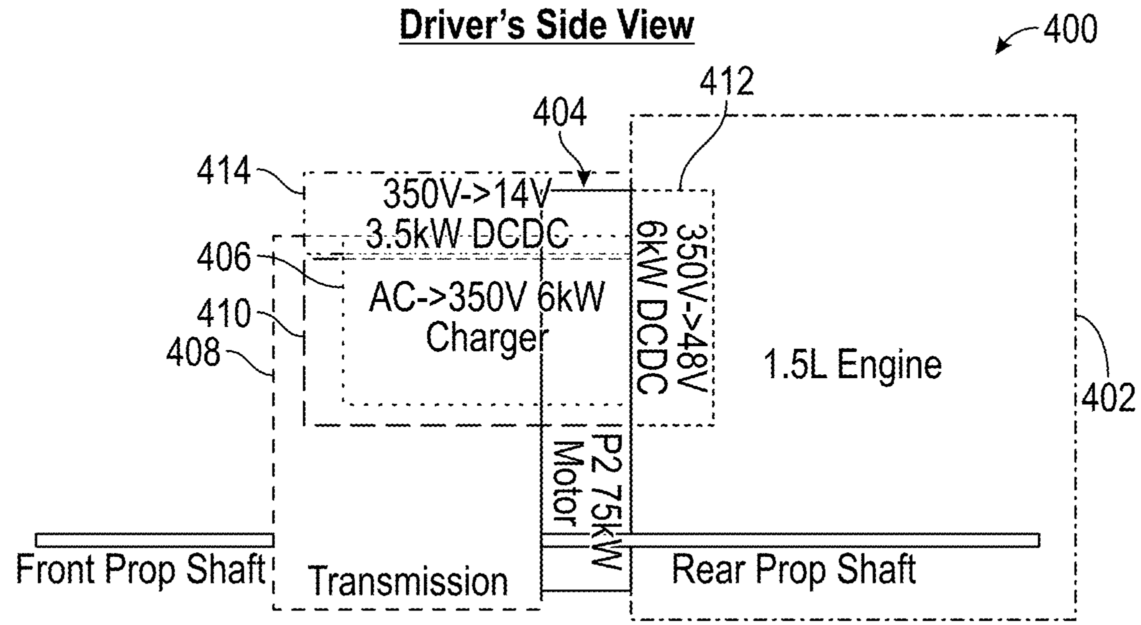
FIG. 4A illustrates a driver side view of an example vehicle configuration according to aspects described herein.
Figure 4B:
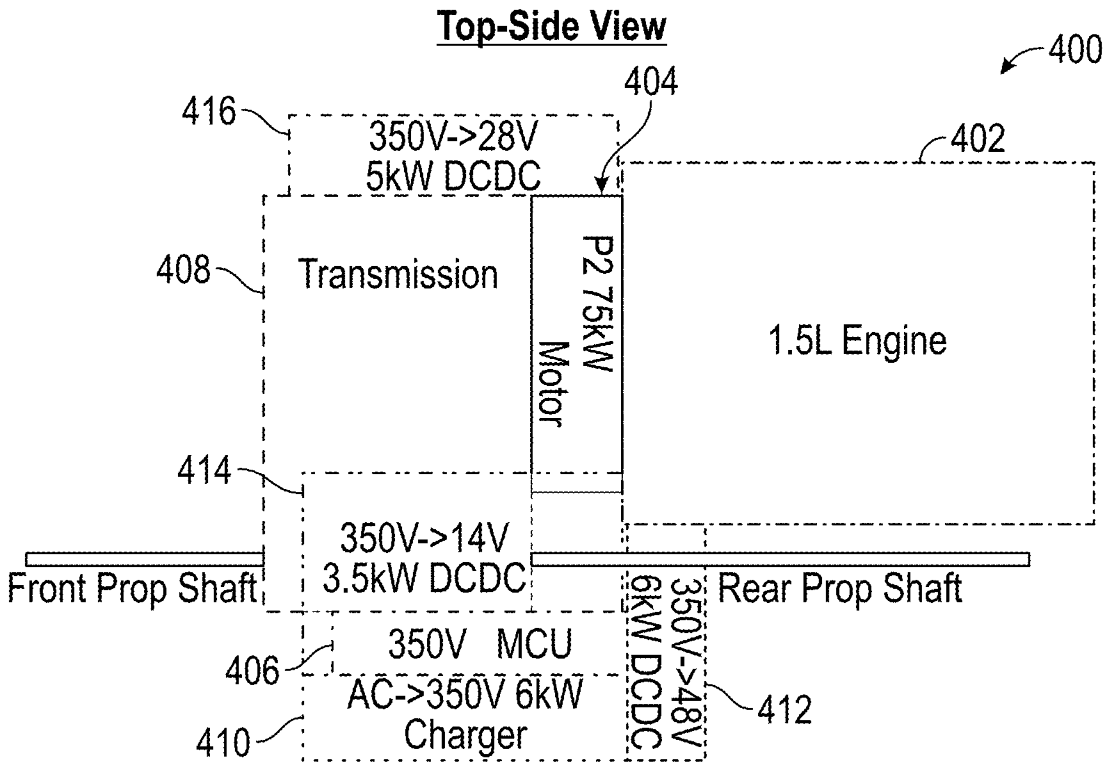
FIG. 4B illustrates a top view of an example vehicle configuration according to aspects described herein.

FIG. 4A illustrates a driver side view of an example vehicle configuration 400 and FIG. 4B illustrates a top view of the example vehicle configuration 400 according to aspects described herein. Vehicle configuration 400 may be a configuration used for components of vehicle 10 and vehicle 300 discussed above with respect to FIGS. 1-3.

As illustrated, vehicle configuration 400 includes engine 402 (e.g., engine 30 and/or motor/generator 120), electric motor 404 (e.g., traction motor 122 and/or electric motor 240), motor controller 406 (e.g., motor controller 130, 132, and/or 322), transmission 408 (e.g., CVT 32 and/or transmission 118), AC charger 410, and DC/DC converters 412, 414, and 416.

With reference to FIG. 3, engine 402, electric motor 404, and transmission 408 may be part of drive system 312, while AC charger 410 and DC/DC converters 412, 414, and 416 may be part of power system 316. In the instant example, motor controller 406 is illustrated as a discrete motor controller rather than being integrated with a vehicle controller (e.g., as was the case in the example discussed above with respect to vehicle controller 302 in FIG. 3).

In examples, components of a vehicle may be configured to improve longevity and mobility survivability of the vehicle in instances where the vehicle may be subject to damage (e.g., from its surroundings or as a result of unintentional or unexpected damage). For example, vehicle components that are comparatively more important for vehicle movement and control may be positioned toward the interior of the vehicle, while comparatively less important components may be in closer proximity to the exterior of the vehicle. Such an arrangement may form multiple layers, where an innermost layer includes components that are more sensitive to damage and/or more critical to vehicle mobility, while an intermediate layer and/or external layer includes components that increasingly less sensitive and/or less important.

Accordingly, given electric motors (e.g., electric motor 404) are compact and more energy dense with respect to output power and torque as compared to internal combustion engines (e.g., engine 402), electric motor 404 is located at an internal position so as to maintain vehicle mobility even if engine 402 is damaged. In example vehicle configuration 400, electric motor 404 is located between transmission 408 and engine 402, thereby protecting electric motor 404 from front and rear damage to the vehicle. Similarly, electric motor 404 is protected from driver-side damage by AC charger 410 and DC/DC converter 414, while passenger-side damage may be lessened by DC/DC converter 416. Motor controller 406 may be sensitive to damage and is therefore also at a location that is comparatively more internal to the vehicle.

Vehicle configuration 400 is illustrated in an example where one electric motor 404 is used. However, additional traction motors (and, in some examples, generators) with one or more associated motor controllers may be used, such that they may be positioned in an intermediate layer. By contrast, AC charger 410 and DC/DC converters 412, 414, and 416 are secondary function systems and may therefore be some of the first components to be damaged. Thus, such components may be positioned in the external layer. Additionally, such components may be included in the external layer as a result of the comparatively large footprint as compared to more internal components.

Thus, vehicle components may be organized according to criticality, sensitivity, and/or footprint, such that increasingly critical, sensitive, and/or compact components may be located more internal to a vehicle so as to improve vehicle longevity and mobility in instances where a vehicle incurs damage (e.g., to components associated with outer layers). It will be appreciated that alternative configurations may be used, for example including any number of intermediate layers and components located therein. As another example, a vehicle configuration may be determined based on an intended use or expected environmental conditions. For instance, if it is more likely that a vehicle will experience damage from the top or bottom rather than one or more sides, components may be oriented accordingly. Similarly, layers may be formed in three dimensions, thereby protecting innermost components from any of a variety of directions.

While FIGS. 4A and 4B are provided as an example where vehicle components are configured to provide increased protection for critical, sensitive, and/or compact components, it will be appreciated that similar techniques may alternatively, or additionally, be used to arrange vehicle components relative to an operator area of the vehicle, thereby shielding at least a part of the operator area from projectiles or the like. In examples, a DC/DC converter may have a similar width to a seat of the operator area. Thus, the DC/DC converter may be positioned behind the seat so as to shield the seat and a passenger associated therewith. In instances where there are two DC/DC converters, each DC/DC converter may be positioned behind a respective seat of the operator area. In such an example, the DC/DC converters may be easily accessible for service due to their relative proximity to wheel wells of the vehicle. Further, by distributing the DC/DC controllers (e.g., where each controller is behind a seat of the operator area) cable routing may be improved, as each DC/DC controller may have multiple potentially large cables routed thereto. As another example, an engine block may be located behind the operator area and between the two DC/DC converters, thereby offering additional shielding from the rear of the vehicle.

Figure 5:
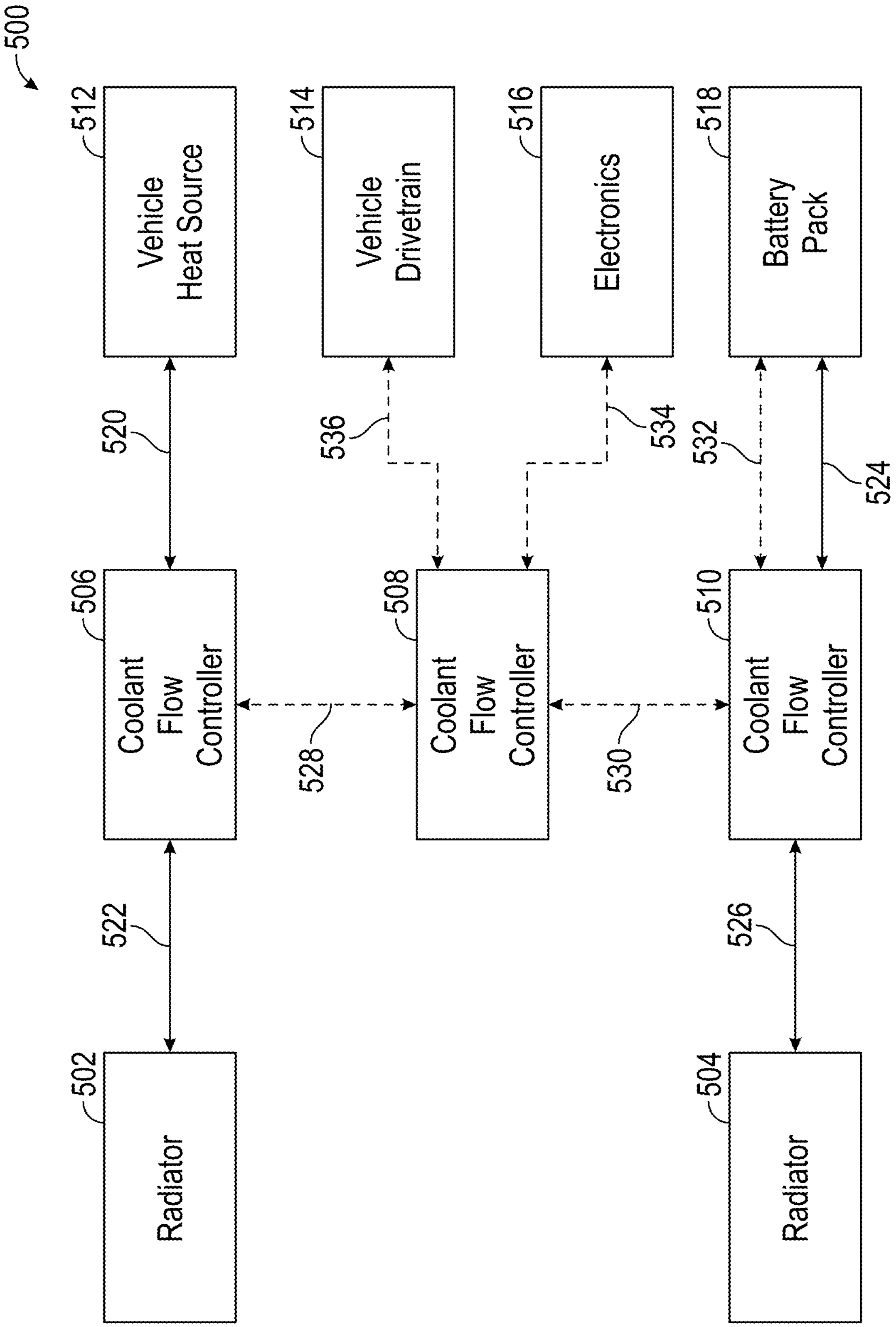
FIG. 5 illustrates an overview of an example system for vehicle thermal storage to reduce the thermal signature of a vehicle.

FIG. 5 illustrates an overview of an example system 500 for vehicle thermal storage to reduce the thermal signature of a vehicle. For example, aspects of system 500 may be applied to any of a variety of vehicles, such as vehicle 10 or vehicle 300 discussed above with respect to FIGS. 1-3.

As illustrated, system 500 includes radiators 502 and 504, coolant flow controllers 506, 508, and 510, vehicle heat source 512, vehicle drivetrain 514, electronics 516, and battery pack 518. With reference to FIG. 3, radiators 502 and 504, and coolant flow controllers 506, 508, and 510 may form part of a cooling system, such as cooling system 314, which may be controlled by a cooling controller (e.g., cooling controller 324). Electronics 516 may include any of a variety of vehicle components having a high mass and/or thermal capacity, such as DC/DC converters, AC chargers, and other elements of the power system of a vehicle.

Solid arrows 520, 522, 524, and 526 are provided to illustrate system 500 in normal operation, where heat generated by vehicle heat source 512 and battery pack 518 is dissipated using radiators 502 and 504, respectively. In such an example, coolant flow controllers 506 and 510 may operate to circulate coolant between radiator 502 and vehicle heat source 512, and radiator 504 and battery pack 518, respectively. In examples, system 500 uses two-phase cooling.

By contrast, dashed arrows 528, 530, 532, 534, and 536 are provided to illustrate alternative modes of operation, in which coolant may instead be directed to components of system 500 other than radiators 502 and 504, thereby reducing the thermal signature of the vehicle. For example, coolant flow controller 506 and coolant flow controller 510 may be configured (e.g., by cooling controller 324) to direct coolant between vehicle heat source 512 and battery pack 518 (e.g., along arrows 520, 528, 530, and 532; in addition to or as an alternative to directing coolant to radiators 502 and 504), thereby dissipating heat generated by vehicle heat source 512 in battery pack 518.

In another example, coolant flow controller 508 may direct coolant to electronics 516 and vehicle drive train 514 as illustrated by arrows 534 and 536, respectively, thereby dissipating heat from vehicle heat source 512 into electronics 516 and vehicle drivetrain 514. It will thus be appreciated that coolant flow controllers 506, 508, and 510 may be used to dissipate heat using any of a variety of components depending on the operating mode of system 500. For example, system 500 may have an initial operating mode in which heat is removed from the system using radiators 502 and 504. Subsequently, coolant flow controllers 506 and 508 may be configured to instead store heat internal to the system, for example using battery pack 518. If it is determined that the temperature of battery pack 518 has reached a predetermined threshold, system 500 may be configured to store heat in one or more additional or alternative components, such as electronics 516 and vehicle drivetrain 514. Thus, each of vehicle components 512, 514, 516, and 518 may include temperature sensors with which such determinations may be made. Examples of these and other aspects are discussed below with respect to FIG. 6.

It will be appreciated that alternative or additional criteria may be used, for example whether system 500 is providing adequate cooling to vehicle heat source 512 and/or relating to performance characteristics of the vehicle. For instance, it may be determined that battery pack 518 is at a temperature such that vehicle performance is reduced. As a result of such a determination, coolant may be redirected so as to improve vehicle performance or reduce further degradation.

Vehicle heat source 512 may be any of a variety of vehicle components, including, but not limited to, an internal combustion engine, an electric motor, and/or a motor controller. Similarly, it will be appreciated that vehicle drivetrain 514, electronics 516, and battery pack 518 are provided as example components in which heat may be stored. In other examples, any number of alternative or additional components may be used. Further, a component is not limited to being a heat source or a heatsink. For instance, battery pack 518 is described as being both a heat source (e.g., in instances where coolant follows arrows 524 and 526) and a heatsink (e.g., in instances where coolant follows arrows 530 and 532).

In examples, aspects of system 500 may be applied to a vehicle cooling system, where coolant flow controllers 506, 508, and 510 are added to direct coolant flow according to aspects described herein. Thus, system 500 need not be a separate system but may instead provide additional operating modes for a preexisting vehicle cooling system. As an example, a coolant flow controller may include one or more solenoid valves and/or pumps. The described aspects may yield a reduced thermal signature even in the absence of specialized hardware, such as infrared shielding or thermal diffusion technology.

Figure 6:
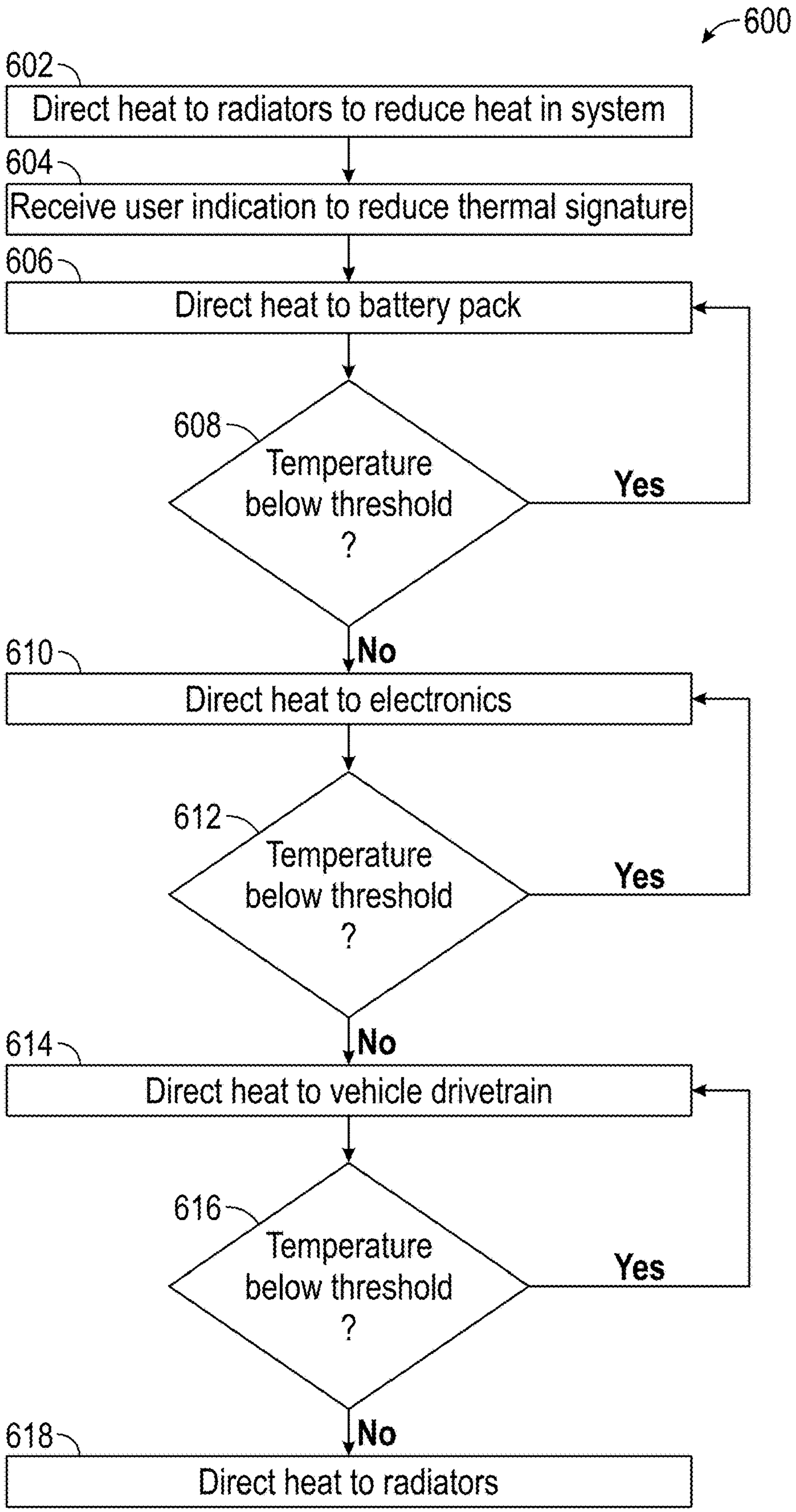
FIG. 6 illustrates an overview of an example method for controlling vehicle cooling to reduce the thermal signature of a vehicle.

FIG. 6 illustrates an overview of an example method 600 for controlling vehicle cooling to reduce the thermal signature of a vehicle. In examples, aspects of method 600 are performed by a cooling controller 324 of a vehicle (e.g., vehicle 10 or vehicle 300) to control a cooling system, such as cooling system 314 or cooling system 500 discussed above with respect to FIG. 3 or FIG. 5, respectively.

Method 600 begins at operation 602, where heat is directed to radiators, thereby reducing the heat present in the system. For example, operation 602 may include configuring one or more coolant flow controllers to direct coolant one or more radiators (e.g., radiators 502 and 504), thereby dissipating heat in the system accordingly. In examples, operation 602 is performed automatically or may be associated with a normal operating state of a vehicle, among other examples. As another example, operation 602 may include dissipating heat at an increased rate as compared to a normal mode of operation, such that the cooling system (and other vehicle components) exhibit an increased heat capacity as compared to normal vehicle operation.

At operation 604, a user indication may be received to reduce the thermal signature of the vehicle. For example, the user indication may be received via an operator interface (e.g., operator interface 304) or via a remote computing device, among other examples.

Flow progresses to operation 606, where heat of the cooling system is directed to a battery pack of the system (e.g., battery pack 518), thereby storing the heat in the battery pack and causing the temperature of the battery pack to increase. For example, one or more coolant flow controllers (e.g., coolant flow controllers 506, 508, and 510) may be configured to direct coolant flow to the battery pack (e.g., rather than to a set of radiators).

In examples, operation 606 further includes configuring the vehicle to operate using an electric motor rather than an engine and/or to configure the vehicle to more heavily rely on engine braking so as to reduce the thermal output of the vehicle's brakes. As another example, regenerative braking or other electric braking techniques may be performed using the electric motor. It will be appreciated that other vehicle aspects may be configured in response to the received user indication.

At determination 608, it is determined whether the temperature of the battery pack is below a predetermined threshold. In examples, determination 608 includes evaluating temperature data from multiple temperature sensors, such that an average or maximum may be determined based on the temperature data. If it is determined that the temperature is below the predetermined threshold, flow branches "YES" and returns to operation 606, such that heat continues to be directed to the battery pack.

However, if is instead determined that the temperature is no longer below the predetermined threshold, flow branches "NO" to operation 610, where heat of the cooling system is directed to electronics (e.g., electronics 516). The heat may be directed to the electronics in addition to or as an alternative to the battery pack. For example, one or more coolant flow controllers (e.g., coolant flow controllers 506, 508, and 510) may be configured to direct coolant flow to the electronics.

At determination 612, it is determined whether the temperature of the electronics is below a predetermined threshold. In examples, determination 612 includes evaluating temperature data from multiple temperature sensors, such that an average or maximum may be determined based on the temperature data. If it is determined that the temperature is below the predetermined threshold, flow branches "YES" and returns to operation 610, such that heat continues to be directed to the electronics.

However, if is instead determined that the temperature is no longer below the predetermined threshold, flow branches "NO" to operation 614, where heat of the cooling system is directed to the drivetrain of the vehicle (e.g., vehicle drivetrain 514). The heat may be directed to the vehicle drive train in addition to or as an alternative to the battery pack and/or electronics.

At determination 616, it is determined whether the temperature of the vehicle drivetrain is below a predetermined threshold. In examples, determination 616 includes evaluating temperature data from multiple temperature sensors, such that an average or maximum may be determined based on the temperature data. If it is determined that the temperature is below the predetermined threshold, flow branches "YES" and returns to operation 614, such that heat continues to be directed to the vehicle drivetrain.

However, if is instead determined that the temperature is no longer below the predetermined threshold, flow branches "NO" to operation 618, where heat is directed to one or more radiators of the coolant system. In examples, an indication may be provided to an operator that heat storage is no longer possible. For example, one or more coolant flow controllers (e.g., coolant flow controllers 506, 508, and 510) may be configured to direct coolant flow to the radiators. In examples, the cooling system is configured to cool vehicle components that were used to store heat (e.g., at operations 606, 610, and 614). In other examples, such vehicle components may not be actively cooled and may instead be permitted to gradually cool, while radiators are used to actively cool one or more components that are still generating heat (e.g., vehicle heat source 512 and battery pack 518). In some instances, rather than resuming use of the radiators, vehicle operation may be suspended until components in which heat is stored have cooled below a predetermined threshold, thereby enabling continued operation with a reduced thermal signature. As another example, an indication may be displayed as to an estimated percentage of remaining heat capacity, such that a vehicle operator may be proactive in managing available heat capacity, for example, by cooling at least a part of the vehicle in water or altering the operator's driving style, among other examples. Method 600 ends at operation 618.

It will be appreciated that method 600 is provided as an example in which a hierarchy of vehicle components may be used to store heat sequentially, first using a vehicle battery pack, followed by vehicle electronics, and ultimately using a vehicle drivetrain. Additional or alternative components may be used according to any of a variety of orderings. As noted above, heat may be directed to an increasing number of vehicle components (e.g., first the battery pack, followed by the battery pack and electronics, and ending with the battery pack, electronics, and drivetrain) or in sequence (e.g., first only the battery pack, then only the electronics, and ultimately only the drivetrain), or any combination thereof. The predetermined temperature thresholds applied above may be a maximum operating temperature or a maximum storage temperature of the associated vehicle component.

Figure 7A:
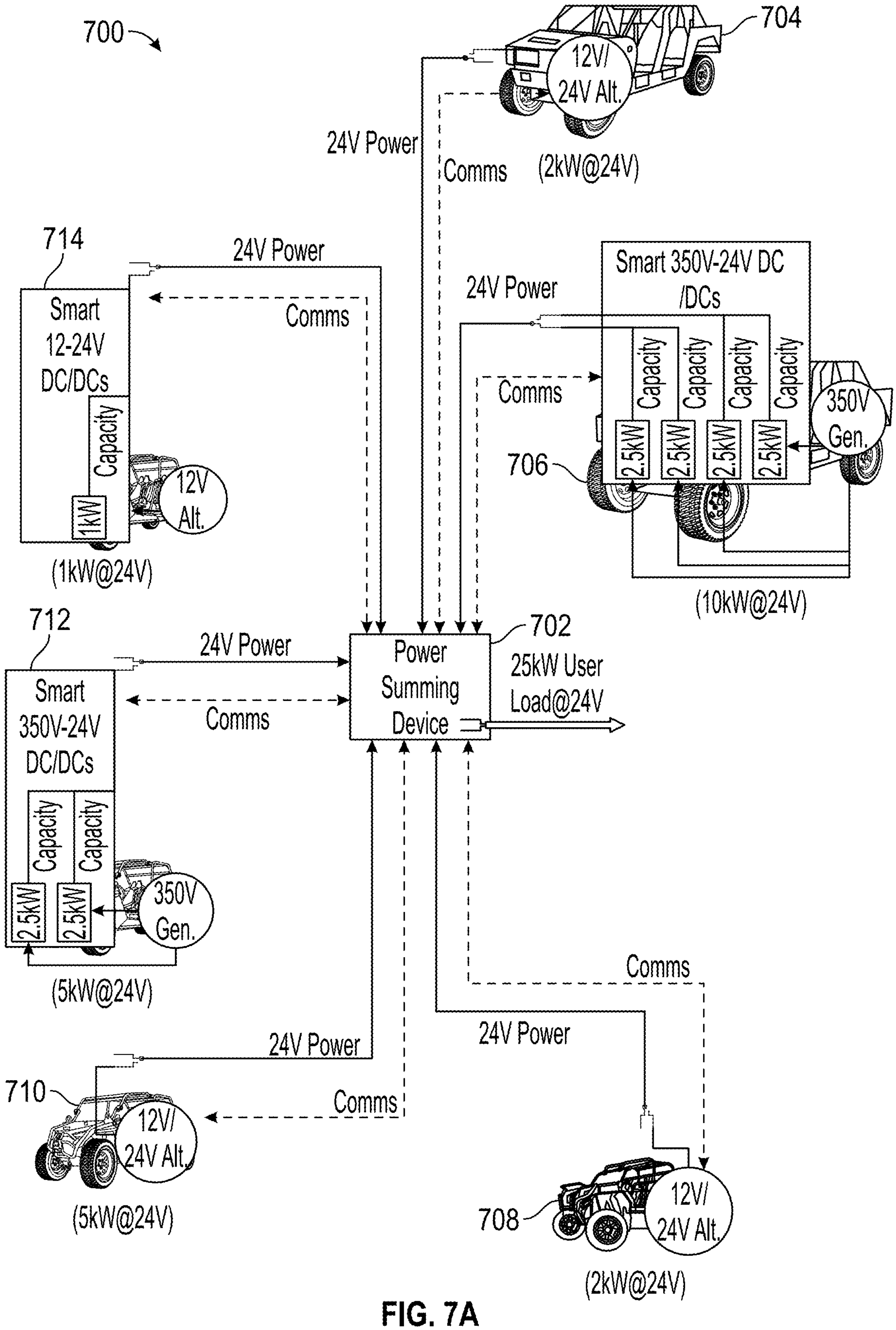
FIG. 7A illustrates an overview of an example system in which off-board power of multiple vehicles is summed by a power summing device according to aspects described herein.

FIG. 7A illustrates an overview of an example system 700 in which off-board power of multiple vehicles is summed by a power summing device according to aspects described herein. In examples, off-board power provided by a single vehicle may not be sufficient to power a set of accessories. However, off-board power from multiple vehicles 704, 706, 708, 710, 712, and 714 may be aggregated or summed by power summing device 702, thereby providing a greater amount of power than would otherwise be available. As a result, it may be possible to use a greater number of accessories and/or accessories that consume more power. As another example, the need for alternate power sources (e.g., generators) may be reduced.

As illustrated, power summing device 702 receives power from vehicles 704, 706, 708, 710, 712, and 714. Additionally, power summing device 702 communicates with each vehicle. For example, power summing device 702 may configure an off-board power output of each vehicle (e.g., as may be configured by communicating with a power controller of the vehicle, such as power controller 326 in FIG. 3). Power summing device 702 may configure each vehicle to provide a specified output voltage (24V in the present example) and may aggregate the provided power accordingly (e.g., providing an aggregated total of 25 kW in the illustrated example).

Information communicated between power summing device 702 and a vehicle includes technical power data, such as load watts, load current, and/or source available power. Communication may be achieved using any of a variety of communication technologies, including wired and/or wireless communication. In examples, power summing device 702 communicates with each vehicle using a CAN bus, where, for example, a fault tolerant and long bus length 250 kbps CAN speed at a high throughput may be used to achieve quick and timely operation even over longer physical distances. In such an example, the physical connection between a vehicle and power summing device 702 may include both data and power connections. A NATO port/plug is described in present examples, but it will be appreciated that any of a variety of connectors may be used.

As a result of communication between power summing device 702 and vehicles 704, 706, 708, 710, 712, and 714, power summing device 702 may regulate load sharing between the connected vehicles. As illustrated, vehicles 704, 708, and 710 each include a 12V/24V alternator, such that the power output may be configured accordingly by power summing device 702. Similarly, vehicles 707, 712, and 714 include smart DC/DC converters, which may be configured by power summing device 702. In examples where a vehicle does not include an onboard electric propulsion system, a higher powered alternator may be included to provide power to power summing device 702. It will be appreciated that any of a variety of power management controllers may be used in other examples, such as a controller that provides both inverter and off-board power functionality (e.g., as discussed below with respect to motor controller 806 and power routing contactors 808 in FIGS. 8A and 8B).

Figure 7B:
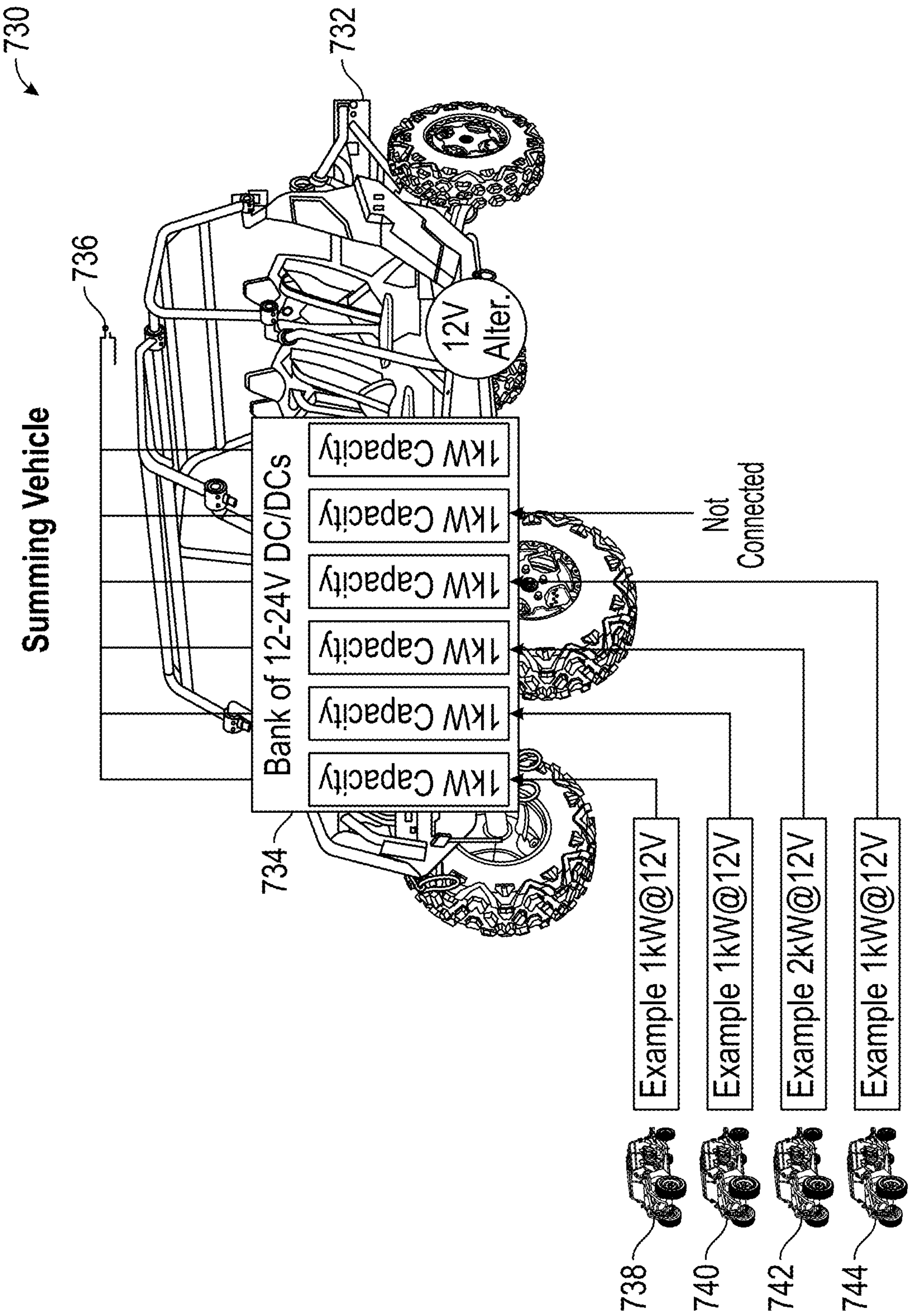
FIG. 7B illustrates an overview of another example system in which off-board power of multiple vehicles is summed by a power summing vehicle according to aspects described herein.

FIG. 7B illustrates an overview of another example system 730 in which off-board power of multiple vehicles is summed by a power summing vehicle according to aspects described herein. As compared to FIG. 7A, FIG. 7B illustrates an example in which power summing vehicle 732 is used (rather than power summing device 702) to aggregate power from vehicles 738, 740, 742, and 744. Vehicle 732 includes DC/DC converter bank 734 includes a set of 1 kW DC/DC converters, which receive power from vehicles 738, 740, 742, and 744. A set of power-rated cables may be used to connect vehicles 738, 740, 742, and 744 with vehicle 732 and DC/DC converter bank 734 may aggregate the provided power accordingly. As illustrated, the aggregated power is available via connector 736. DC/DC converter bank 734 includes six DC/DC converters, one of which is used by vehicle 732 and four of which are used by vehicles 738, 740, 742, and 744.

Communication between summing vehicle 732 and vehicles 738, 740, 742, and 744 may be used (similar to aspects described above with respect to FIG. 7A) to manage the summed power output, for example to configure each vehicle to supply a given voltage (e.g., 12V, 24V, or 100V). In the present example, vehicle 742 is capable of providing 2 kW of power, but DC/DC converter bank 734 includes DC/DC converters having a capacity of 1 kW. As a result, power output from vehicle 742 may be limited to 1 kW. However, it will be appreciated that any of a variety of DC/DC converters may be used (e.g., 1 kW, 2 kW, or 5 kW) having a variety of associated voltages in alternative configurations, such that the illustrated limit may not be present in other systems.

It will be appreciated that the power summing aspects described herein need not be limited to DC power, and AC power may be provided in addition to or as an alternative to DC power in other examples. For example, vehicle communication may be used to synchronize the AC power that is provided by the vehicles that are coupled to power summing device 702 or power summing vehicle 732. As another example, a set of vehicles may export power without the use of a communication connection (e.g., to power summing device 702 or power summing vehicle 732), though managing the power supplied to a power summing device or power summing vehicle based on technical power data is likely to provide improved compatibility and stability. Further, the aspects described herein need not be limited to aggregating power from vehicles and may additionally or alternatively be used to aggregate power from any of a variety of other sources according to aspects described herein. Additional examples of modular DC/DC converters and associated aspects may be disclosed in U.S. Pat. No. 10,118,477, the complete disclosure of which is expressly incorporated by reference herein.

Figure 7D:
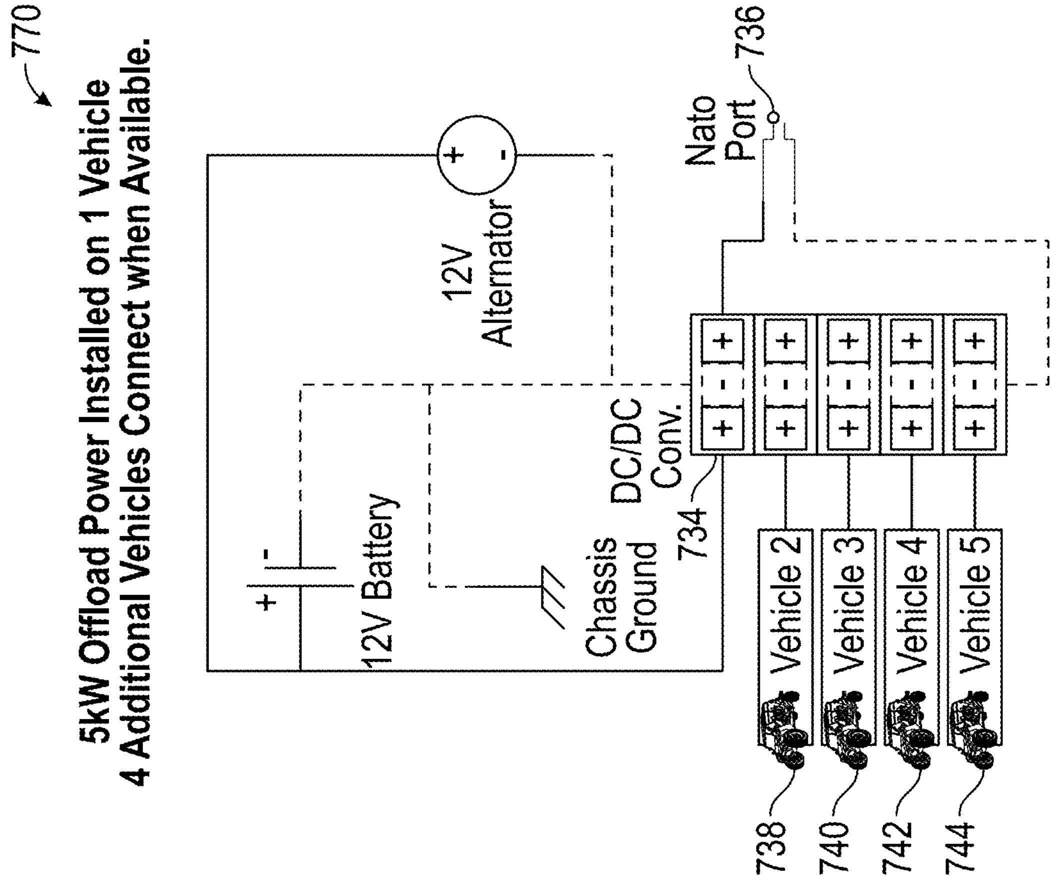
FIG. 7D illustrates an overview of an example schematic of a power summing vehicle according to aspects described herein.
Figure 7C:
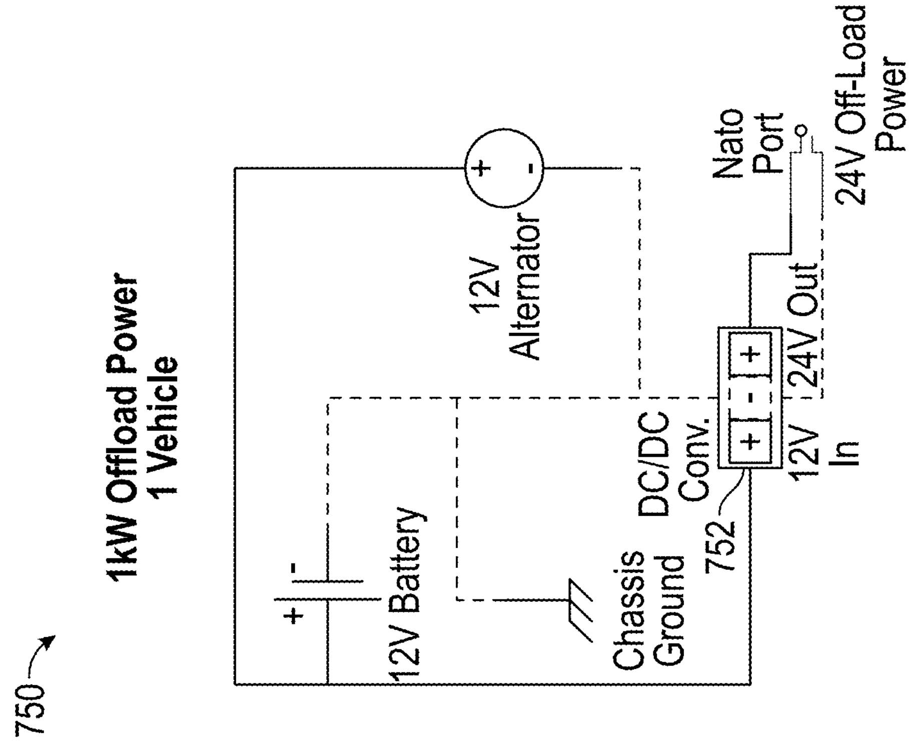
FIG. 7C illustrates an overview of an example schematic of a system used to provide off-board power according to aspects described herein.

FIG. 7C illustrates an overview of an example schematic of a system 750 used to provide off-board power according to aspects described herein. Aspects of system 750 may form part of the power system of a vehicle, such as power system 316 discussed above with respect to FIG. 3. As illustrated, power from 12V battery and/or 12V alternator is received by DC/DC converter 752 and used to output 24V power accordingly. DC/DC converter 752 may be configured by a power summing device or power summing vehicle according to aspects described herein.

FIG. 7D illustrates an overview of an example schematic 770 of a power summing vehicle according to aspects described herein. As illustrated, power of the power summing vehicle is obtained from 12V battery and/or 12V alternator and is aggregated with power from vehicles 738, 740, 742, and 744 by DC/DC converter bank 734. The output of DC/DC converter bank 734 is provided via NATO port 736. Such aspects are similar to those discussed above with respect to FIG. 7B and are therefore not necessarily re-described in detail.

Figure 8A:
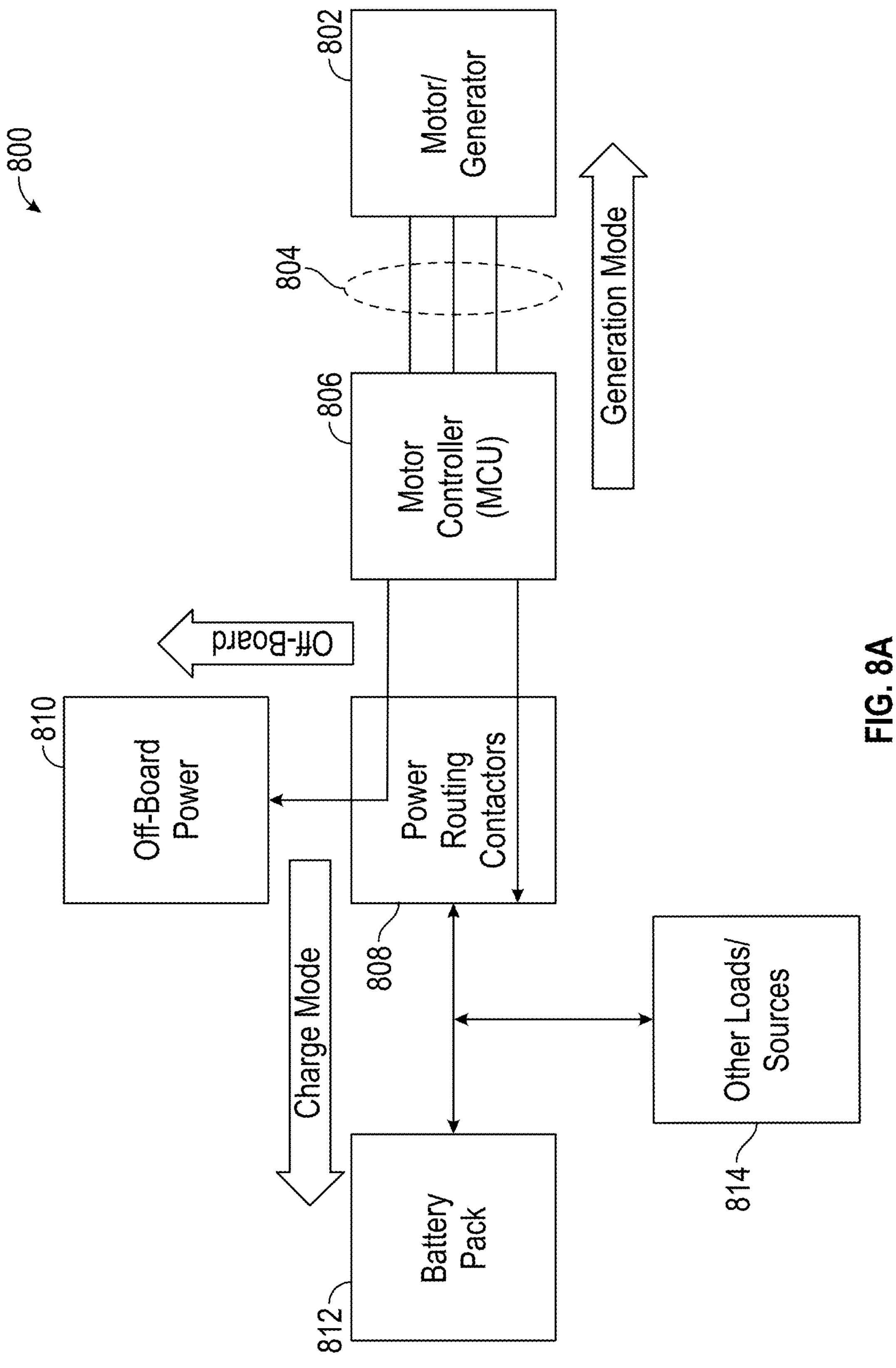
FIG. 8A illustrates an overview of an example system in which off-board power is provided by a vehicle according to aspects described herein.

FIG. 8A illustrates an overview of an example system 800 in which off-board power is provided by a vehicle (e.g., vehicle 10 or vehicle 300) according to aspects described herein. For example, off-board power may be provided to an accessory, such as accessory 350 discussed above with respect to FIG. 3. As illustrated, system 800 includes motor/generator 802 (e.g., motor/generator 120), which supplies three-phase AC power 804 to motor controller 806 (e.g., motor controller 130, 132, and/or 322). Accordingly, motor controller 806 converts the three-phase AC power to DC power, which is provided to battery pack 812 and/or other loads/sources 814 via power routing contactors 808.

In examples where off-board power 810 is to be used, power routing contactors 808 may be configured to re-route power to an off-board accessory (e.g., accessory 350). Accordingly, motor controller 806 may convert the three-phase AC power 804 from motor/generator 802 to power that is suitable to provide as off-board power 810 rather than coupling high voltage DC output from motor controller 806 to battery pack 812 or other controllers.

Thus, motor controller 806 may have a charging mode in which it produces a voltage suitable to charge battery pack 812 and/or power other loads/sources 814, a generation mode in which it produces three-phase AC power from battery pack 812 and/or other loads/sources 814 to provide power to motor/generator 802, and an off-board mode in which it provides regulated output power as off-board power 810. It will be appreciated that similar techniques may be used in instances where AC power 804 is two-phase AC power rather than three-phase power as described above. In examples, motor controller 806 may be configured according to a load associated with off-board power 810, for example to control switching on/off duty cycles to achieve a target output voltage level. In some instances, the voltage of the off-board mode may be lower than the voltage of the charging mode. In examples, power routing contactors 808 cause leads associated with off-board power 810 to be electrically coupled to the DC leads of motor controller 806. In the instant example, DC power may be converted from motor/generator 802 while the vehicle is idling or moving (e.g., as may be possible when battery pack 812 powers an electric drivetrain, not pictured).

As a result of reconfiguring motor controller 806 according to the off-board mode described above and utilizing power routing contactors 808 to redirect the DC output power from motor controller 806 accordingly, a power system of a vehicle need not include additional hardware to supply off-board power, thereby reducing the cost and weight that typically may be associated with such functionality. For example, a reduced number of field effect transistors (FETs), associated controllers, and/or associated cooling hardware (e.g., heatsinks and liquid couplings) may thus be used to switch AC power 804 for use as off-board power 810 according to aspects described herein. Motor controller 806 may be automatically reconfigured based on determining an accessory has been connected to the vehicle or as a result of a vehicle idling for a predetermined amount of time. As another example, motor controller 806 may be reconfigured in response to user input received from a vehicle operator, among other examples.

Figure 8B:
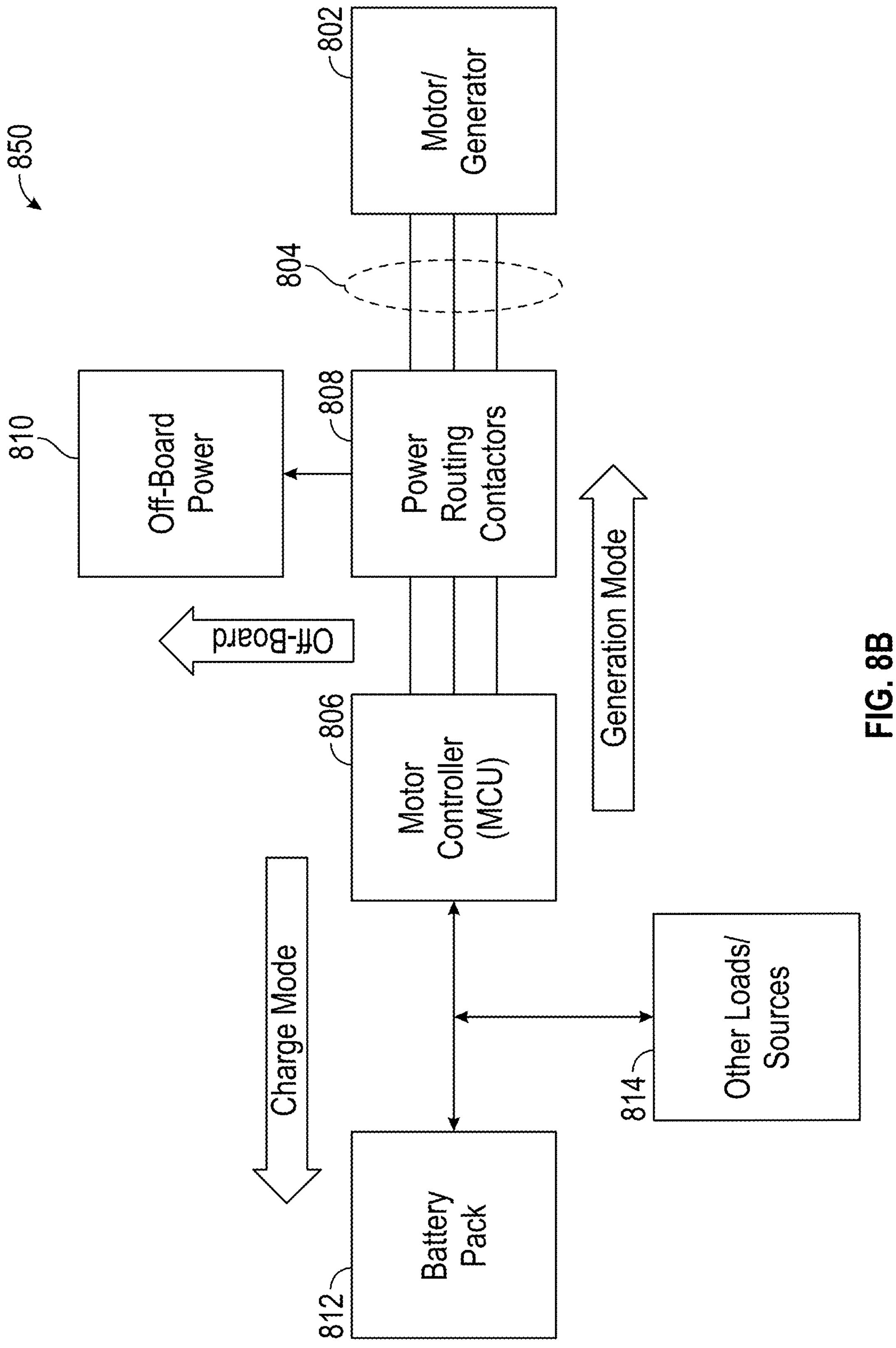
FIG. 8B illustrates an overview of another example system in which off-board power is provided by a vehicle according to aspects described herein.

FIG. 8B illustrates an overview of another example system 850 in which off-board power is provided by a vehicle (e.g., vehicle 10 or vehicle 300) according to aspects described herein. Aspects of FIG. 8B are similar to those discussed above with respect to FIG. 8A and are therefore not necessarily re-described below. As compared to system 800 in FIG. 8A, power routing contactors 808 are instead electrically coupled to the AC output of motor controller 806, thereby enabling the vehicle to output AC power as off-board power 810. For example, power routing contactors 808 may be coupled to a phase of the AC output of motor controller 806. Motor controller 806 may be configured to regulate power from battery back 812 and/or other loads/sources 814 to generate, for example, 120V AC power at 60 Hz.

It will be appreciated that systems 800 and 850 discussed above with respect to FIGS. 8A and 8B are provided as examples and are not intended to be mutually exclusive. Further, similar techniques may be applied to any of a variety of vehicles, including, but not limited to, hybrid vehicles and electric vehicles.

Figure 9:
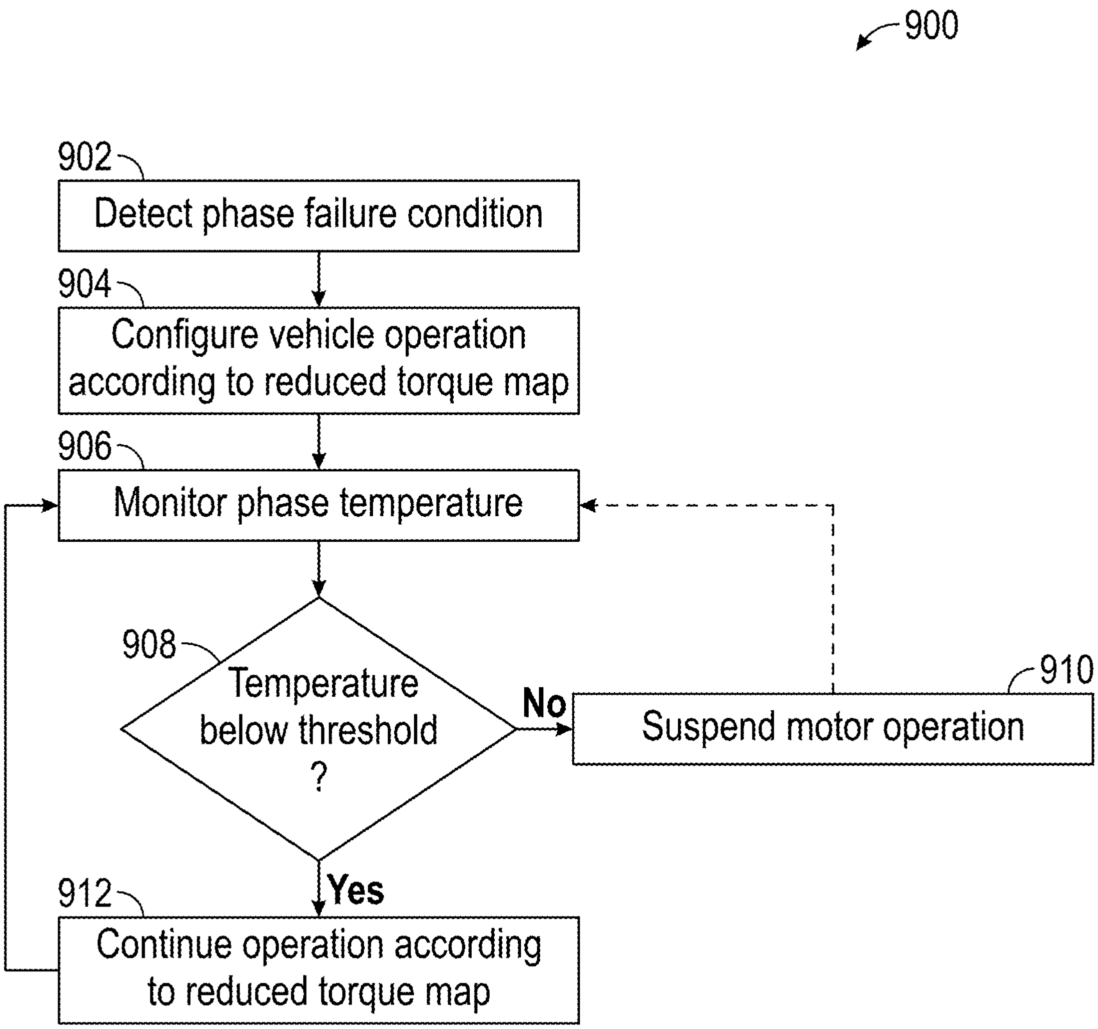
FIG. 9 illustrates an overview of an example method for motor control based on a detected phase failure condition.

FIG. 9 illustrates an overview of an example method 900 for motor control based on a detected phase failure condition. In examples, aspects of method 900 are performed by a motor controller, such as motor controller 130, 132, or 322 discussed above with respect to FIGS. 1-3.

Method 900 begins at operation 902, where a phase failure condition is detected. A phase failure condition may be detected according to any of a variety of techniques. As noted above, an electric motor may operate using three-phase AC power, such that a phase failure may be identified as a result of decreased current associated with the failed phase, as a result of increased current associated with one or more remaining phases, and/or as a result of a fluctuation in motor speed (e.g., revolutions per minute (RPMs) of the motor). As another example, a sudden increase in vibrations associated with the electric motor may be determined to be indicative of a phase failure condition. In examples, operation 902 includes providing an indication of the phase failure condition to an operator of the vehicle.

Flow progresses to operation 904, where vehicle operation is configured according to a reduced torque map. For example, the electric motor may have a first torque map associated with a normal mode of operation, while a second torque map may be associated with a reduced mode of operation that maybe used in response to an identified phase failure condition. In examples, operation 904 includes configuring multiple electric motors according to the reduced torque map, as may be the case when the vehicle has multiple traction motors. In examples, operation 904 occurs in response to a manual indication received from an operator of the vehicle, for example to override an error state of the vehicle in which operation has been disabled as a result of the identified phase failure condition.

At operation 906, remaining phase temperatures are monitored. For example, the electric motor may include one or more temperature sensors usable to determine a temperature associated with a phase of the electric motor. In examples, operation 906 includes determining a temperature associated with each phase of the electric motor. In another example, operation 906 may include determining a maximum phase temperature or an average phase temperature, among other examples.

Flow progresses to determination 908, where it is determined whether the phase temperature is below a predetermined threshold. For example, the determination may include comparing the phase temperature to a safe operating temperature associated with the electric motor. In other examples, the predetermined threshold may be a threshold associated with emergency motor operation, which may be higher than the safe operating temperature and may result in decreased motor longevity.

If, at determination 908, it is determined that the temperature is below the predetermined threshold, flow branches "NO" to operation 910, where motor operation is suspended. For example, vehicle operation may be suspended until the phase temperature decreases below the predetermined threshold. A dashed arrow is illustrated from operation 910 to operation 906 to indicate that, in some examples, alternative actions may be performed at operation 910 other than, or in addition to, flow branching to 906.

In other examples, operation of the motor may be suspended, while another motor of the vehicle may continue to be used or may be used in place of the motor that experienced the phase failure condition. As another example, yet a further reduced torque map may be used until the phase temperature has decreased. In examples, operation 910 includes providing an indication that operation of the motor has been suspended. Thus, it will be appreciated that any of a variety of actions may be performed as a result of determining a phase of the electric motor is too hot. As a further example, method 900 terminates at operation 910.

If, however, it is determined that the temperature is below the predetermined threshold, flow branches "YES" to operation 912, where operation of the electric motor continues using the reduced torque map. Thus, flow loops between operations 906-912, thereby enabling operation of the electric motor even after a phase failure condition has occurred.

While method 900 is described in an example where a phase temperature is monitored, it will be appreciated that additional or alternative data may be monitored and used to control operation of the electric motor accordingly. As an example, a temperature of an associated motor controller may be monitored, as the increased current may place additional demand on other components of the vehicle. In some instances, it may be determined how many or what percentage of phases are available for continued operation, such that the reduced torque map applied at operation 904 may be determined based on the remaining phases. As another example, operation may be suspended as a result of determining there are an insufficient number of phases available for continued operation.

Figure 10A:
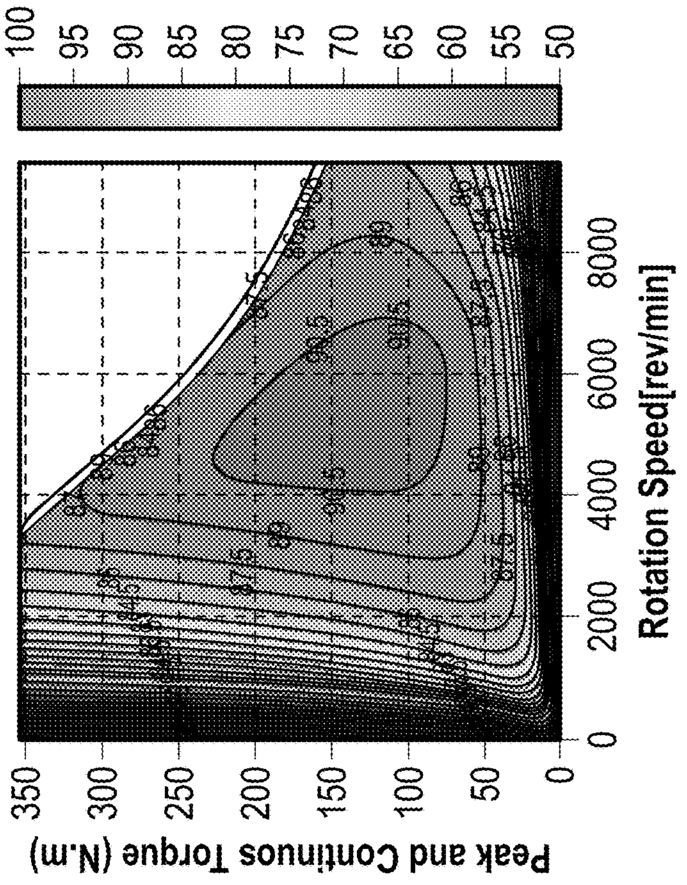
FIGS. 10A-B illustrate example torque maps as may be used during normal operation and during a detected phase failure condition, respectively.
Figure 10B:
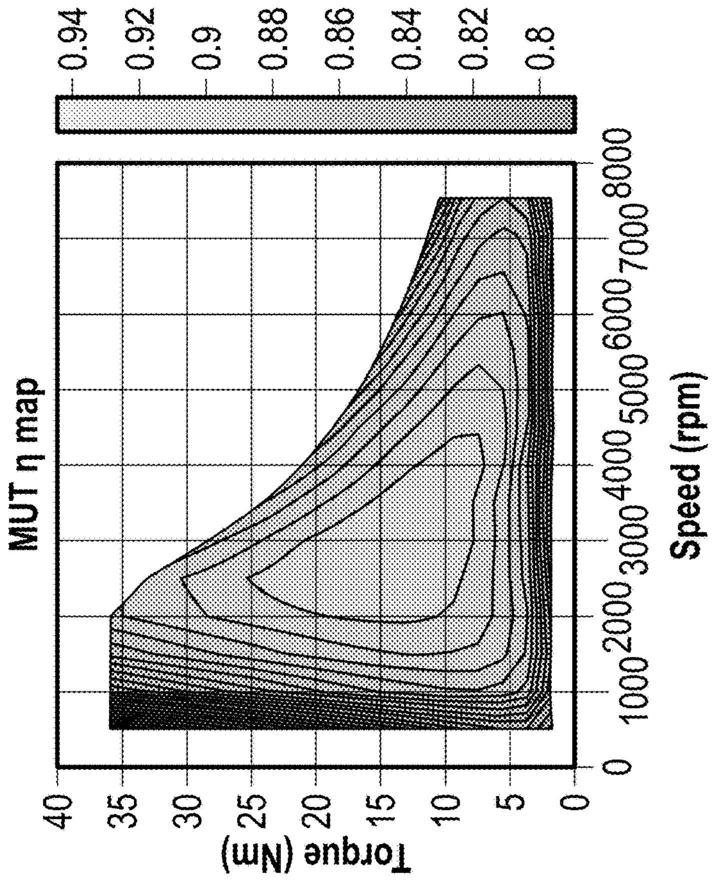

FIGS. 10A-B illustrate example torque maps as may be used during normal operation and during a detected phase failure condition, respectively. For example, FIG. 10A illustrates an example torque map that may be used during normal operation of an electric motor, while FIG. 10B illustrates an example of a reduced torque map that may be used as a result of a detected phase failure condition. As illustrated, the reduced torque map results in decreased torque output for comparable motor RPMs, thereby reducing the likelihood of motor damage and increasing the duration for which the motor may be operated after the occurrence of the phase failure condition.

Figure 11A:
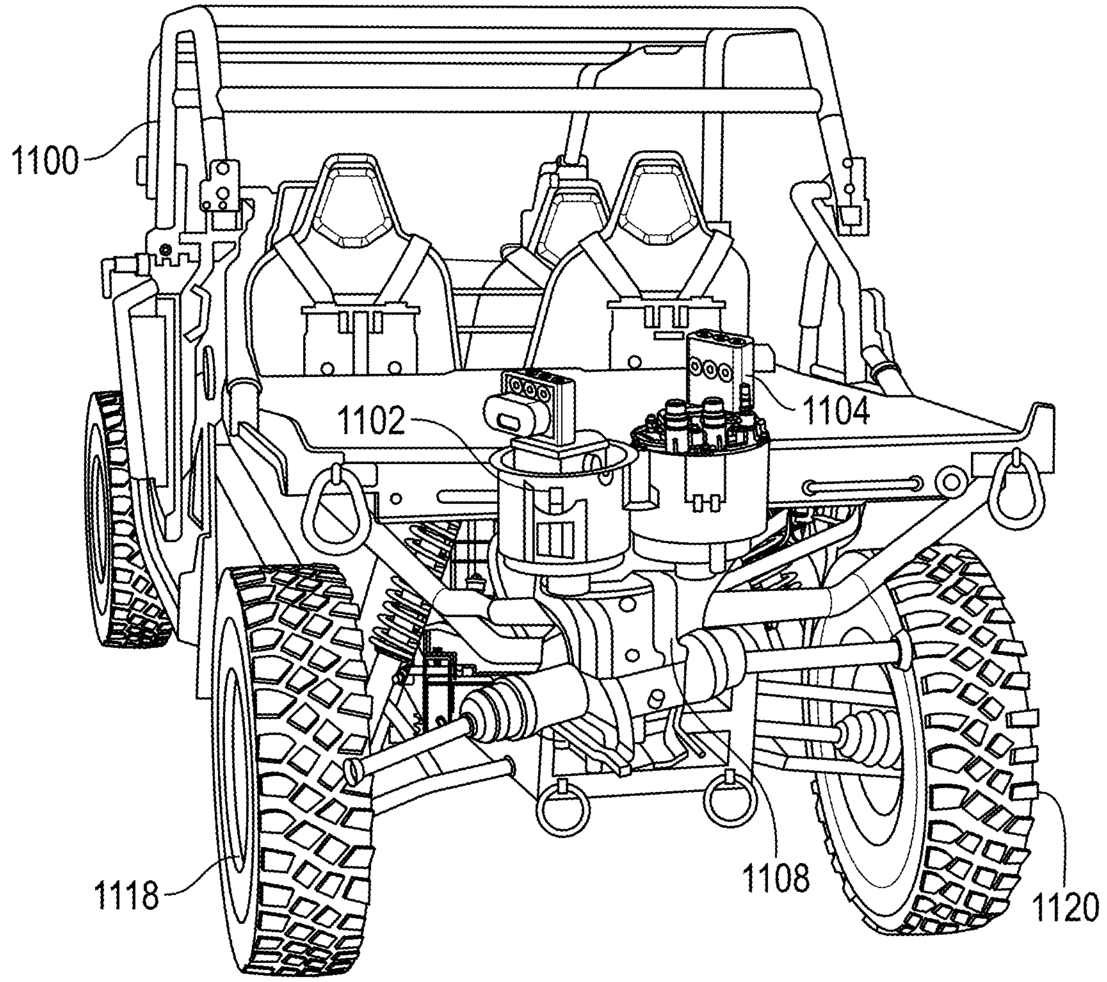
FIGS. 11A-B illustrate an overview of an example system for providing power take off (PTO) functionality using a vehicle motor.
Figure 11B:
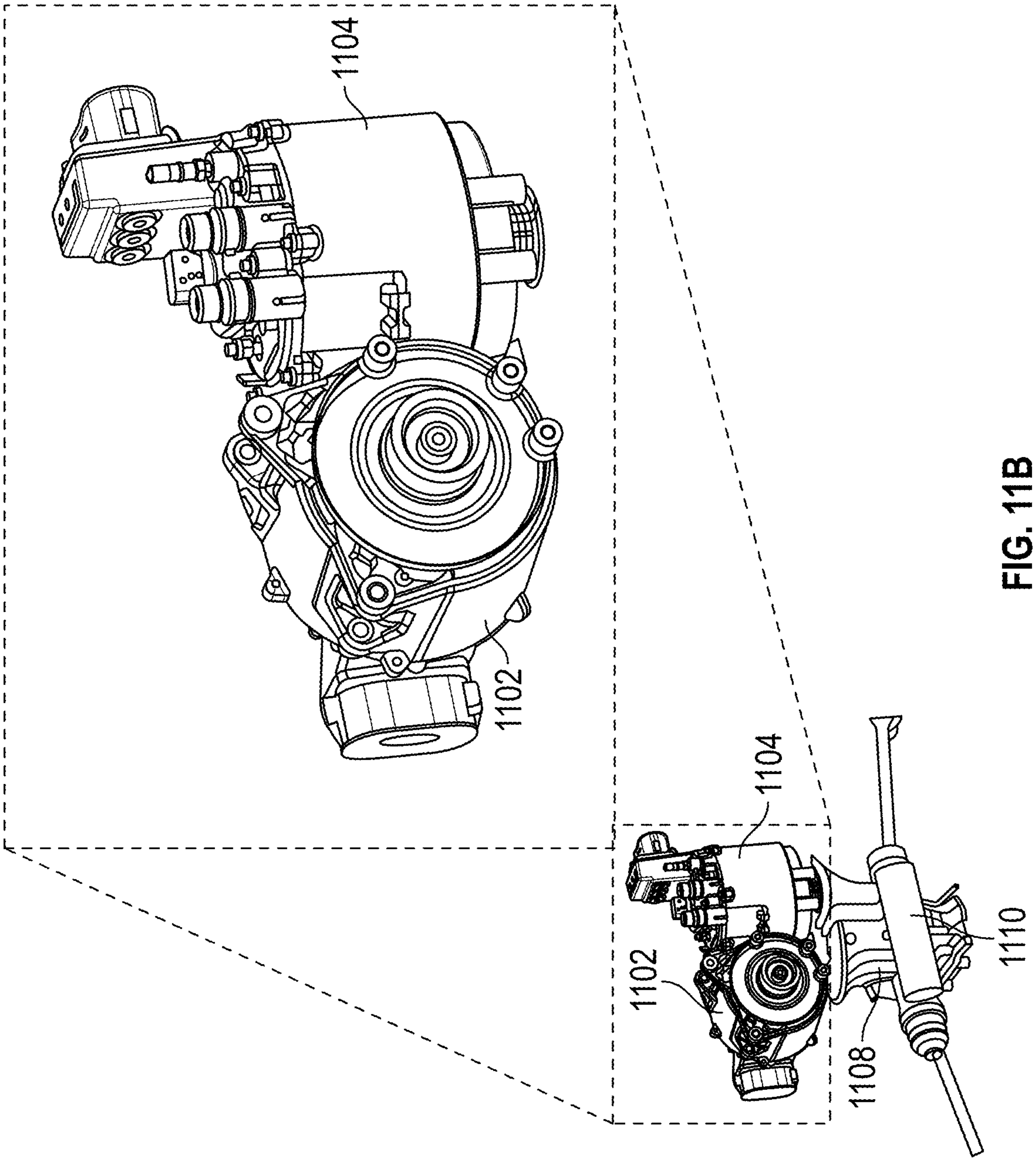

FIGS. 11A-B illustrate an overview of an example system for providing power take off (PTO) functionality using a vehicle motor. In examples, a vehicle may include a separate PTO motor for providing mechanical energy to one or more accessories. However, this may introduce additional weight, complexity, and expense, among other detriments.

By contrast, vehicle 1100 is illustrated as an example in which PTO functionality is provided using a traction motor of the vehicle. Aspects of vehicle 1100 may be similar to those discussed herein with respect to vehicles 10 and 300 and are therefore not necessarily re-described below in detail. As illustrated, multiple traction motors 1102 and 1104 are coupled to split gearbox 1108 and ground engaging members 1118 and 1120, respectively. Thus, in the configuration depicted in FIG. 11A, traction motors 1102 and 1104 are used to drive ground engaging members 1118 and 1120, for example in response to operator control input received via an operator interface (e.g., operator interface 304).

With reference to FIG. 11B, traction motor 1102 is removably coupled to split gearbox 1108, such that traction motor 1102 has been removed and used in an alternate configuration. As illustrated, traction motor 1102 has been recoupled to split gearbox 1108 in a configuration that exposes its output shaft, such that mechanical energy provided by traction motor 1102 may be used by one or more accessories. For instance, a vehicle operator may unbolt traction motor 1102 and remount traction motor 1102 in an alternate configuration, for example to perform destination tasks like digging trenches, earth moving, or snow blowing.

FIG. 11B is provided as an example alternate configuration. As illustrated, traction motor 1102 is unbolted from split gearbox 1108 and reoriented approximately 90 degrees such that its output shaft points rearward. In other examples, traction motor 1102 may be coupled to any of a variety of other locations on vehicle 1100. As another example, traction motor 1102 may be used in a configuration in which it is not mechanically coupled to vehicle 1100.

Traction motor 1102 may have an associated motor controller (not pictured), aspects of which may be similar to motor controller 322 discussed above with respect to FIG. 3. In examples, it may automatically be determined that traction motor 1102 is being used in an alternate configuration or user input may be received that indicates that traction motor 1102 has been reconfigured. As a result, the motor controller may enable operator control of traction motor 1102, for example via an operator interface and/or a remote computing device, among other examples.

Thus, traction motor 1102 may be electrically coupled to vehicle 1100 in its alternate configuration, thereby enabling control of traction motor 1102 by the motor controller of vehicle 1100 accordingly. In examples, traction motor 1102 remains electrically coupled to vehicle 1100 while it is mechanically reconfigured. In another example, an accessory motor harness extension may be used to provide a greater range in which traction motor 1102 may be used external to vehicle 1100. For example, traction motor 1102 may be mounted inside of an off-vehicle accessory. In such an example, the accessory motor harness extension may include a connection to provide operator control signals to vehicle 1100 (e.g., as may be received via an operator interface of the off-vehicle accessory).

As illustrated in FIG. 11B, optional locking mechanism 1110 may be used to mechanically couple traction motor 1104 to ground engaging member 1118, such that ground engaging member 1118 may be driven even in instances where traction motor 1102 is in the alternate configuration discussed above. Thus, an operator may continue to operate vehicle 1100 in combination with an accessory that utilizes mechanical energy provided by traction motor 1102. Optional locking mechanism 1110 may be automatically or manually configured to mechanically couple ground engaging member 1118 and traction motor 1104.

Figure 11C:
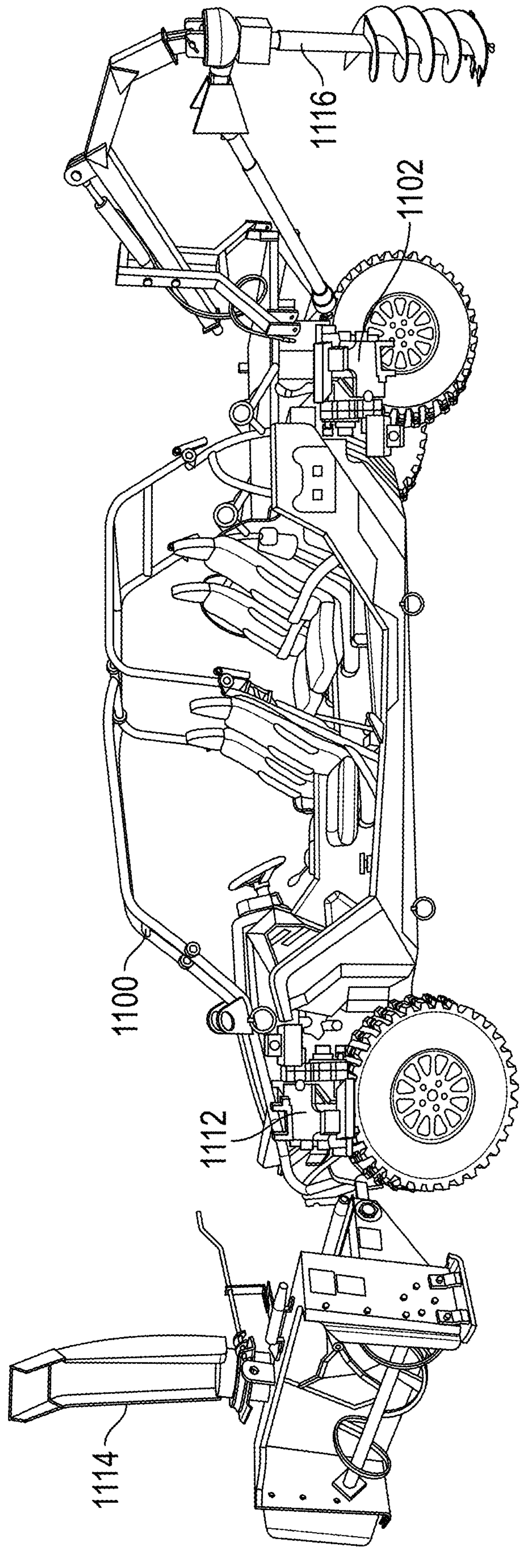
FIG. 11C illustrates an example vehicle in which traction motors have been reconfigured to provide mechanical energy to multiple accessories.

FIG. 11C illustrates an example vehicle 1100 in which traction motors 1102 and 1112 have been reconfigured to provide mechanical energy to multiple accessories 1114 and 1116. As illustrated, front traction motor 1112 and rear traction motor 1102 have been reconfigured to power accessory 1114 and accessory 1116, respectively. As discussed above with respect to FIG. 11B, a locking mechanism may be used to lock the rear ground engaging members of vehicle 1100, while the front ground engaging members may be unpowered in this configuration.

It will be appreciated that the examples discussed above with respect to FIGS. 11A-C are illustrative and any of a variety of other configurations may be used. For example, a motor/generator of a vehicle may be reconfigured using similar techniques as a traction motor. As another example, a motor need not be removed and reconfigured to provide PTO functionality. For instance, a motor's rotor shaft may be oriented to extend beyond the vehicle's front or rear, such that it may be coupled to an accessory. The motor may then be decoupled from an associated driveline (e.g., through a removable pin), thereby placing the motor in an alternate configuration for PTO functionality.

Figure 12:
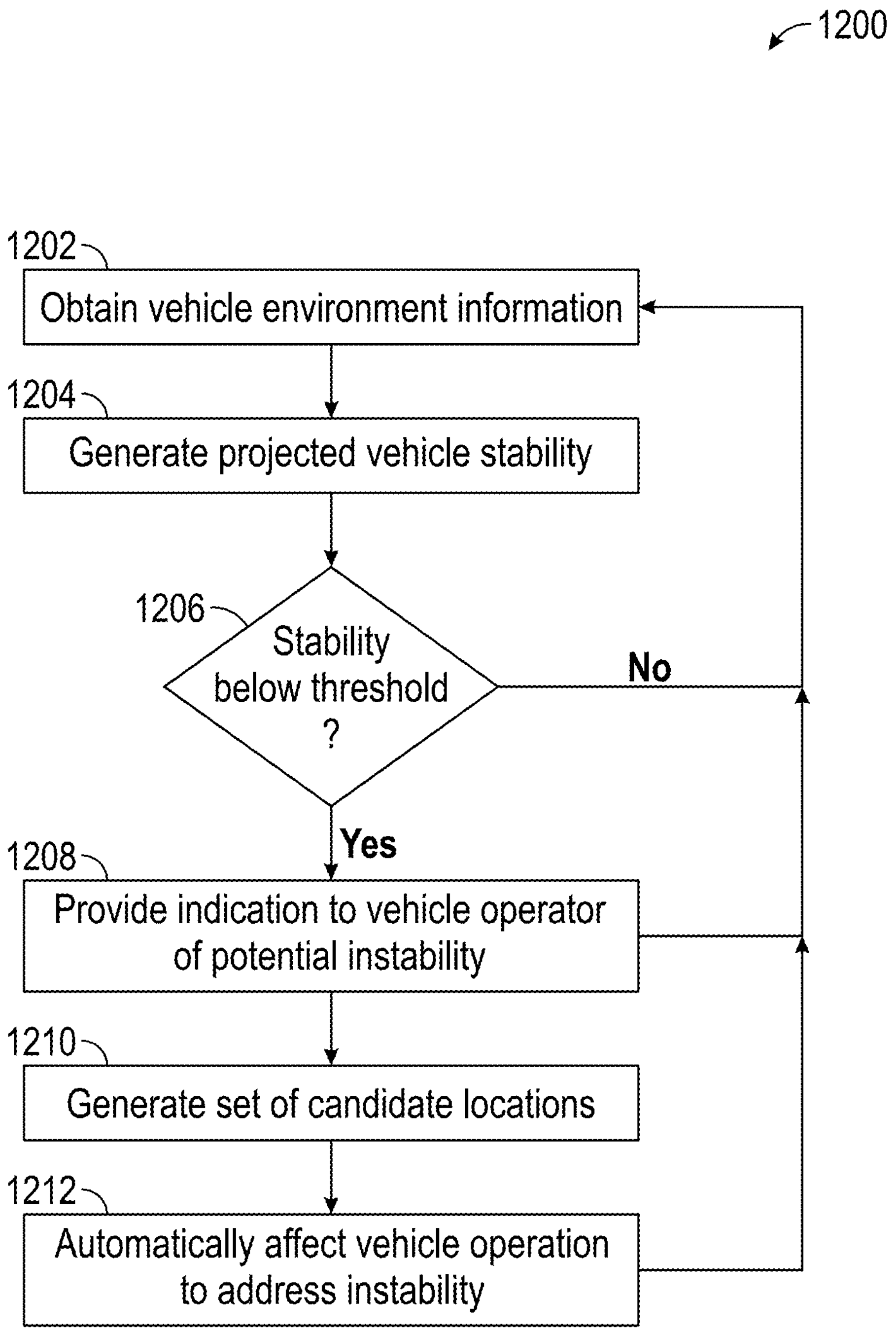
FIG. 12 illustrates an overview of an example method for identifying and addressing a potential vehicle instability based on vehicle environment information according to aspects described herein.

FIG. 12 illustrates an overview of an example method 1200 for identifying and addressing a potential vehicle instability based on vehicle environment information according to aspects described herein. In examples, aspects of method 1200 are performed by a vehicle controller, such as vehicle controller 302 discussed above with respect to vehicle 300 of FIG. 3.

Method 1200 begins at operation 1202, where vehicle environment information is obtained. For example, vehicle environment information may be obtained from one or more sensors, including, but not limited to, a vehicle speed sensor, an engine RPM sensor, an IMU, a GPS sensor, a proximity sensor, an ultrasonic sensor, an image sensor, a LIDAR sensor, and/or a RADAR sensor. In other examples, at least a part of the vehicle environment information may be obtained from a remote device, such as another vehicle or a remote computing device.

At operation 1204, a projected vehicle stability metric is generated. In examples, operation 1204 includes processing the vehicle environment information to generate terrain information, such as, for example, geometry associated with the environment and/or to extract features associated with the terrain around the vehicle. For example, data from LIDAR and RADAR sensors may be used to generate terrain geometry. As another example, computer vision techniques may be used to process images from one or more cameras of the vehicle to generate such terrain information. Features may be extracted by processing the obtained vehicle information using a machine learning model, which may have been trained using training data including operator input and associated vehicle environment information in a variety of scenarios. In examples, the training data includes instances where a vehicle experienced vehicle instability.

In addition to using the vehicle environment information, the vehicle stability metric may be generated based on vehicle state information for the vehicle, including, but not limited to, IMU data, suspension position information, and/or vehicle weight distribution information, among other information. Accordingly, the vehicle state may be modeled according to the determined terrain to generate the vehicle's projected stability in terms of a probability that the vehicle tips or rolls, among other examples. While example processing techniques and associated data are described, it will be appreciated that any of a variety of other processing techniques and/or additional or alternative data may be used in other examples.

Flow progresses to determination 1206, where it is determined whether the projected vehicle stability metric is below a predetermined threshold. In examples, the predetermined threshold may be user-configurable or may vary according to vehicle state information, among other examples. Accordingly, if it is determined that the vehicle stability metric is not below the predetermined threshold, flow branches "NO" and returns to operation 1202, such that the vehicle state may be continually or periodically monitored, among other examples.

If, however, it is determined that the vehicle stability metric is below the predetermined threshold, flow instead branches "YES" to operation 1208, where an indication of potential vehicle instability is presented to a vehicle operator. For example, the indication may be provided via an operator interface (e.g., operator interface 304) or via a remote computing device, among other examples. An arrow is illustrated from operation 1208 to operation 1202 to indicate that, in some examples, a vehicle operator may manually address the potential for vehicle instability. In such examples, flow returns to operation 1202 such that it may eventually be determined at determination 1206 that an updated vehicle stability metric is no longer below the predetermined threshold.

However, if the vehicle stability metric remains below the predetermined threshold for an amount of time or decreases below a second predetermined threshold, among other examples, flow may eventually arrive at operation 1210, where a set of candidate locations may be generated. In other examples, a vehicle operator may provide an indication that corrective action should be performed by the vehicle. The set of candidate locations may be generated based on the generated terrain and the vehicle state information. In examples, operation 1210 includes generating the set of candidate locations based on vehicle capabilities (e.g., turning radius and torque sources for various tires) and its ability to reach various locations. Thus, the set of candidate locations may be ranked based on feasibility and/or an estimated time in which the vehicle will reach a give location in some examples. As an example, a radius in which candidate locations is generated may be within inches of the vehicle and may be associated with slight changes in vehicles position. In some instances, a candidate location may have associated changes in angular acceleration of one or more ground engaging members to prevent a potentially pending tip/roll. In such instances, vehicles with multi-motor torque vectoring and/or four-wheel steering may have an advantage, as such a vehicle may be able to more quickly regain, achieve, or increase stability.

At operation 1212, vehicle operation is automatically affected according to the set of candidate locations to address the vehicle instability. For example, a highest ranked candidate location may be selected and one or more systems (e.g., systems 308, 310, and/or 312 in FIG. 3) of the vehicle may be controlled to direct the vehicle toward the candidate location accordingly. As an example, a counter-rotational force may be generated by one or more ground engaging members of the vehicle through torque vectoring. In another example, a steering system may be controlled to affect a steering angle of the vehicle. An arrow is illustrated to operation 1202 to indicate that aspects of method 1200 may be continually performed, for example to continue affecting vehicle operation until it is determined that the vehicle stability metric is no longer below the predetermined threshold.

In examples, an indication may be provided to a vehicle operator that the vehicle is under automatic control to address a potential instability. In some instances, operator input may be received during such automatic operation, which may cause the vehicle to suspend or stop automatically addressing the instability accordingly. Such aspects may be especially useful when a vehicle operator is controlling the vehicle remotely, as it may not be as apparent when a vehicle is nearing instability by virtue of the reduction in sensory input that is available to the vehicle operator.

FIGS. 13-18 illustrate example techniques for turning or rotating a vehicle while reducing an associated turning radius or associated turning area that is used to achieve the rotation. Aspects of FIGS. 13-18 may be performed using any of a variety of vehicles, such as vehicle 10 or vehicle 300 discussed above with respect to FIGS. 1-3. In examples, at least a part of the described aspects may be performed by a vehicle controller, such as vehicle controller 302.

Figure 13:
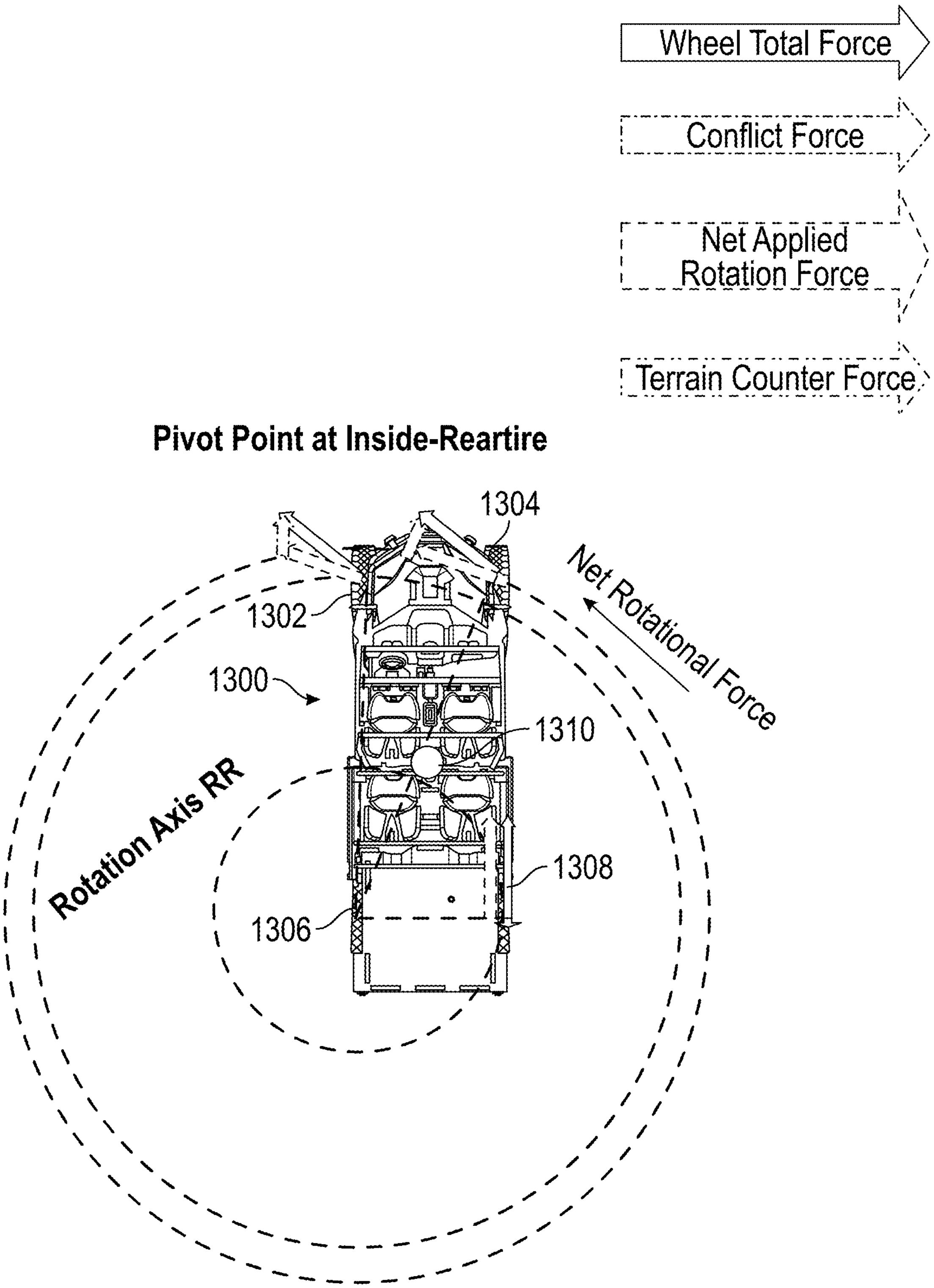
FIG. 13 illustrates a schematic view of a vehicle turning substantially around a ground engaging member.

FIG. 13 illustrates a schematic view of a vehicle turning substantially around a ground engaging member. Rather than rotating ground engaging members on one side of a vehicle (e.g., ground engaging members 1302 and 1306) in an opposite direction as compared to ground engaging members on the other side of the vehicle (e.g., ground engaging members 1304 and 1308), vehicle 1300 pivots substantially around ground engaging member 1306.

In order to pivot around ground engaging member 1306, vehicle 1300 may monitor the speed of ground engaging member 1306 and drive ground engaging member 1306 to maintain a zero speed. Ground engaging members 1302, 1304, and 1308 may be rotated forward, while ground engaging members 1302 and 1304 are turned to the left. In order to maintain zero speed, a brake may be applied to ground engaging member 1306 or ground engaging member 1306 may be rotated backward to counteract the force provided by ground engaging members 1302, 1304, and 1308. As a result, rather than rotating about center 1310 of the vehicle, the pivot point is shifted toward ground engaging member 1306. This may result in more of the force applied by ground engaging members 1302, 1304, 1306, and 1308 going into rotational effort and relatively little force in conflict. The resulting rotational radius may be approximately the distance between ground engaging member 1306 and 1304 (as illustrated by the diagonal dashed line). In examples, ground engaging member 1306 may move even with counter-rotational force, such that the rotational radius is slightly larger.

FIG. 13 illustrates an example in which vehicle 1300 rotates counter-clockwise, pivoting around ground engaging member 1306 as a result of the steps discussed above. It will be appreciated that similar techniques may be applied to pivot clockwise and/or pivot around any one of the other ground engaging members. For example, to complete a clockwise pivot around ground engaging member 1308, ground engaging members 1302 and 1304 may be turned right and ground engaging members 1302, 1304, and 1306 may be driven forward, while a control loop is used to maintain zero speed of ground engaging member 1308.

Figure 14:
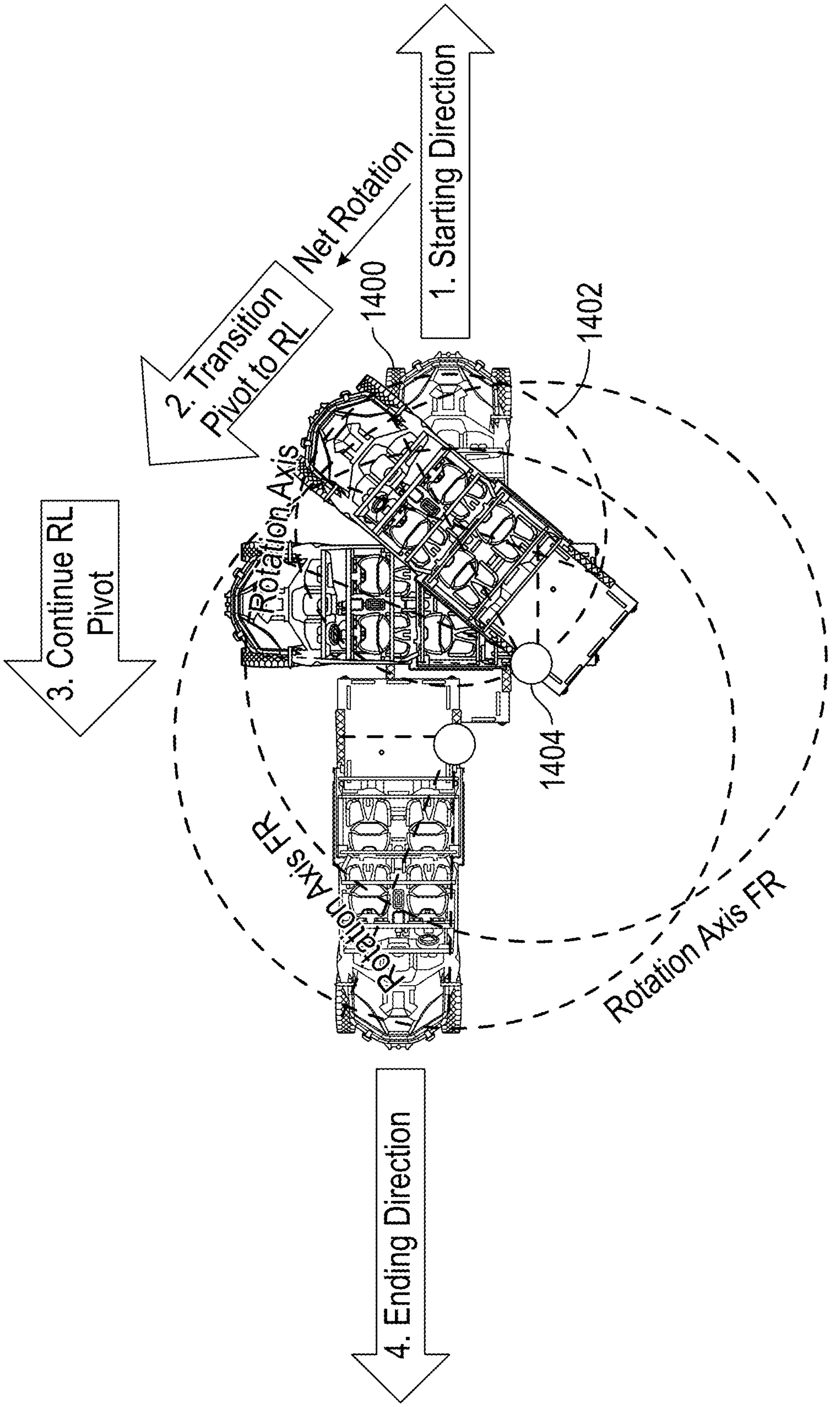
FIG. 14 illustrates a schematic view of a vehicle applying multiple turning techniques based on the rotational momentum of the vehicle.

FIG. 14 illustrates a schematic view of a vehicle 1400 applying multiple turning techniques based on the rotational momentum of the vehicle. Vehicle 1400 may first attempt a zero-point turn (e.g., by driving ground engaging members on opposite sides of the vehicle in different directions) while the rotational momentum of the vehicle is monitored (e.g., using an IMU). As illustrated, dashed circle 1402 depicts a first rotation radius of the zero-point turn.

If it is determined that the momentum of vehicle 1400 is below a predetermined threshold, vehicle 1400 may transition to pivot around a ground engaging member, similar to the techniques described above with respect to FIG. 13. As illustrated, vehicle 1400 transitions to pivot around ground engaging member 1404. If it is determined that rotational momentum of the vehicle increases above a predetermined threshold, vehicle 1400 may resume performing a zero-point turn, thereby further decreasing the radius in which the vehicle rotates.

As a result of such aspects, it may be possible to complete a vehicle rotation in a reduced amount of time as compared to performing only a zero-point turn. Further, vehicle 1400 may complete its rotation with a reduced radius and/or area as compared to solely pivoting around ground engaging member 1404.

In examples, an indication may be presented to a vehicle operator as a result of determining to transition between performing a zero-point turn and pivoting around a given ground engaging member. In some instances, the thresholds discussed above may be user configurable or may be determined as a result of terrain surrounding the vehicle (example aspects of which are discussed above with respect to FIG. 12). In instances where an operator interface is usable to view the surroundings of a vehicle (e.g., from a 360-degree awareness camera system to provide a top-down view of the vehicle), an instantaneous turning radius (e.g., using an outermost point of the vehicle) or other estimated path of the vehicle may be displayed in conjunction with the vehicle's surroundings.

As another example, a steering angle provided by a vehicle operator may be used to control how sensitive a vehicle is to a reduction in momentum and therefore how likely the vehicle is to transition to pivoting rather than performing a zero-point turn. For example, a small steering angle may be determined to indicate a larger area is available for turning, such that the vehicle is biased to transitioning to pivoting around a ground engaging member. By contrast, a large steering angle may indicate that a smaller area is available, such that the vehicle is biased to continuing performing a zero-point turn. In some instances, a steering angle about a predetermined threshold may prevent a vehicle from transitioning to pivoting around a ground engaging member.

Figure 15:
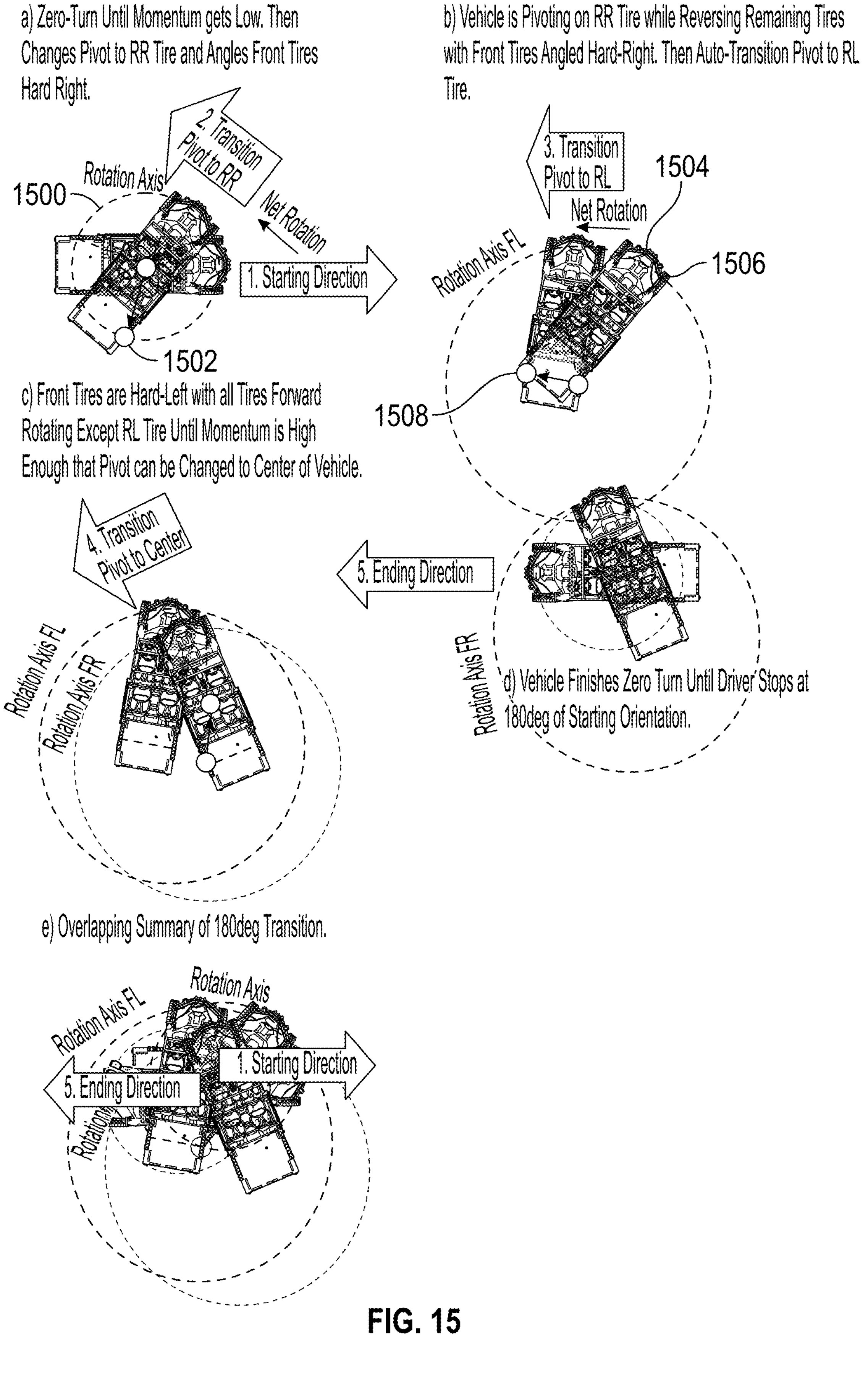
FIG. 15 illustrates schematic views of a vehicle performing an automatic turn.

FIG. 15 illustrates schematic views of a vehicle 1500 performing an automatic turn. As an example, a vehicle operator may provide user input to vehicle 1500, in response to which vehicle 1500 performs the illustrated automatic turn. As an example, the vehicle operator may specify an overall radius or area in which the vehicle should attempt to turn (e.g., using a slider or by adjusting the size of a circle displayed by an operator interface). In the instant example, vehicle 1500 may automatically steer the vehicle to the left or to the right in combination with an associated forward to reverse wheel speed direction. As a result, vehicle 1500 may automatically perform a multi-point turn to rotate the vehicle accordingly. Such aspects may reduce the overall area associated with rotating vehicle 1500, though it may take longer to perform as compared to the aspects described above with respect to FIGS. 13 and 14.

Turning to the illustrated example, vehicle 1500 performs a zero-point turn in a) until it is determined that the momentum of the vehicle is below a predetermined threshold. Vehicle 1500 then transitions to pivot around ground engaging member 1502 in b), where ground engaging members 1504, 1506, and 1508 are driven in reverse and ground engaging members 1504 and 1506 are angled to the right. Thus, as compared to the rotation discussed above with respect to FIG. 13, vehicle 1500 is rotated in the reverse direction rather than in the forward direction.

Vehicle 1500 then transitions to pivoting around ground engaging member 1508 in c), where ground engaging members 1504 and 1506 are instead angled to the left and ground engaging members 1504, 1506, and 1502 are driven in the forward direction. Ground engaging member 1508 may be controlled to have a zero speed according to aspects described herein. If it is determined that the rotational momentum of vehicle 1500 is above a predetermined threshold, vehicle 1500 may return to performing a zero-point term, which is illustrated in d). Alternatively, vehicle 1500 may alternate between pivoting in the reverse direction (e.g., as in b)) and pivoting in the forward direction (e.g., as in c)). It will be appreciated that, in other examples, vehicle 1500 may rotate in the opposite direction and/or may be driven first in the forward direction and then in the backward direction when pivoting around a ground engaging member.

During automated control of vehicle 1500, automated control may be suspended or terminated if operator input is detected. For example, if it is determined that an operator's hand is on a steering wheel of vehicle 1500 (e.g., as a result of increased resistance when steering the vehicle), vehicle 1500 may stop executing the described automated turn. Similarly, user input may be received to control the automated turn, such as via a touch screen, a joystick, or left/right arrow keys.

Aspects described with respect to FIG. 15 may take advantage of the fact that a direct drive, multi-motor architecture may allow ground engaging members to rapidly change direction (e.g., from a forward spin to a reverse spin) in milliseconds. Similarly, electronic power steering may allow a controller to adjust a steering angle (e.g., hard left or hard right), for example to increase rotational force quickly given a pivot point at one of the rear tires. Similar techniques may be applied using an internal combustion engine in conjunction with an antilock brake system (ABS), though performing potentially numerous gear changes (e.g., from forward to reverse and vice versa) may introduce additional delay to the described method.

Figure 16:
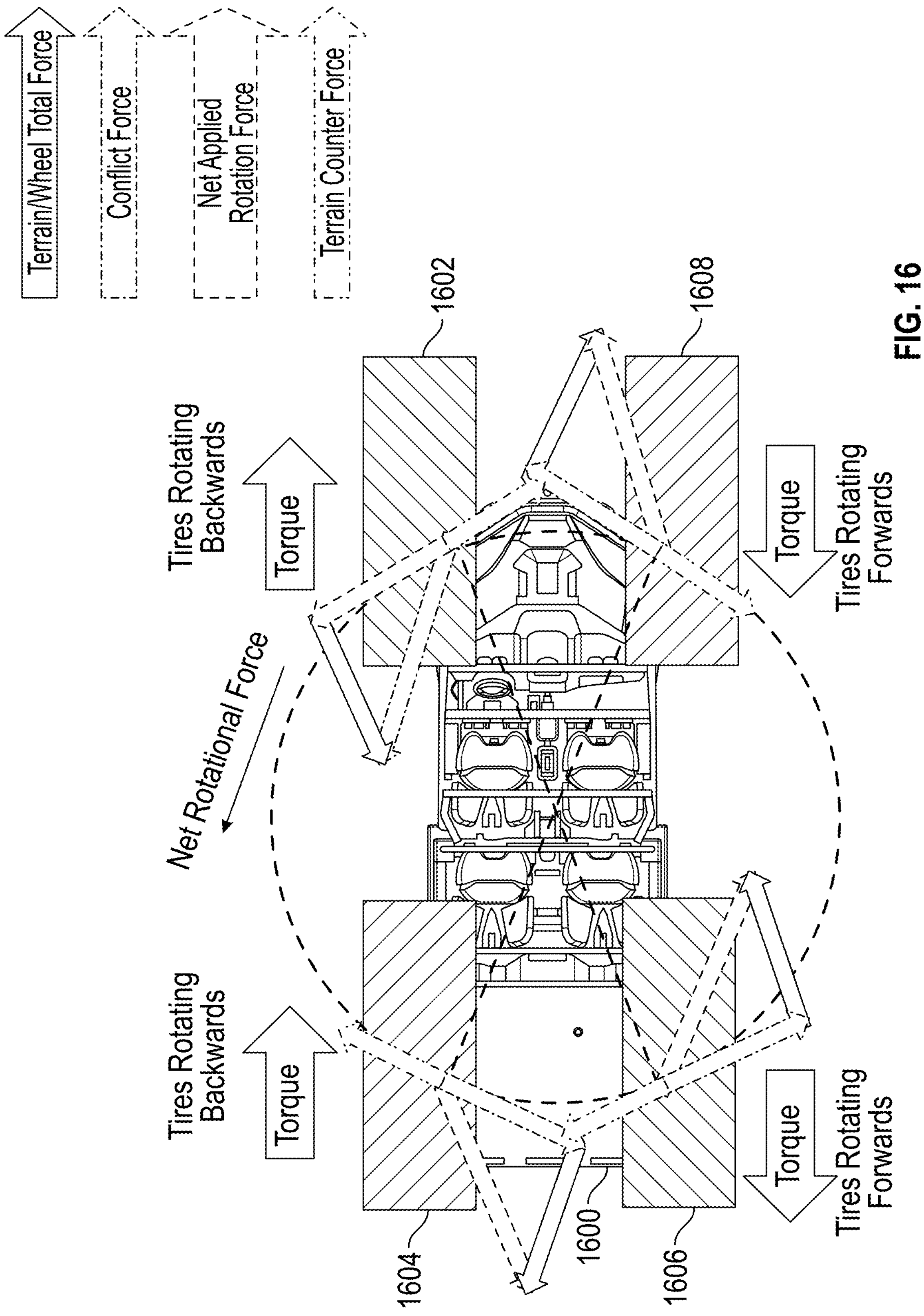
FIG. 16 illustrates a schematic view of a vehicle having ground engaging members with tread designed to induce traction in a single direction.

FIG. 16 illustrates a schematic view of a vehicle 1600 having ground engaging members with tread designed to induce traction in a single direction. As illustrated, vehicle 1600 includes ground engaging members 1602, 1604, 1606, and 1608. As illustrated by the dashed lines, the tread of ground engaging members 1604 and 1608 is oriented in the same direction, as is the tread of ground engaging members 1602 and 1606. In normal driving, symmetrical travel of the ground engaging members gives longitudinal traction and cancels the lateral traction vector of each ground engaging member.

By contrast, when performing a zero-point turn, lateral traction vectors induced by the tread is instead combined to yield a rotational force, thereby causing vehicle 1600 to rotate in a counter-clockwise direction. A zero-point turn may be more effective in instances where the terrain exhibits at least a certain level of slip, which may be induced by applying an oscillating torque signal to the net wheel rotation torque, thereby loosening terrain under the ground engaging members. As a result of utilizing such a tread, net force along a rotational axis may be increased, while force in conflict may be decreased.

Figure 17A:
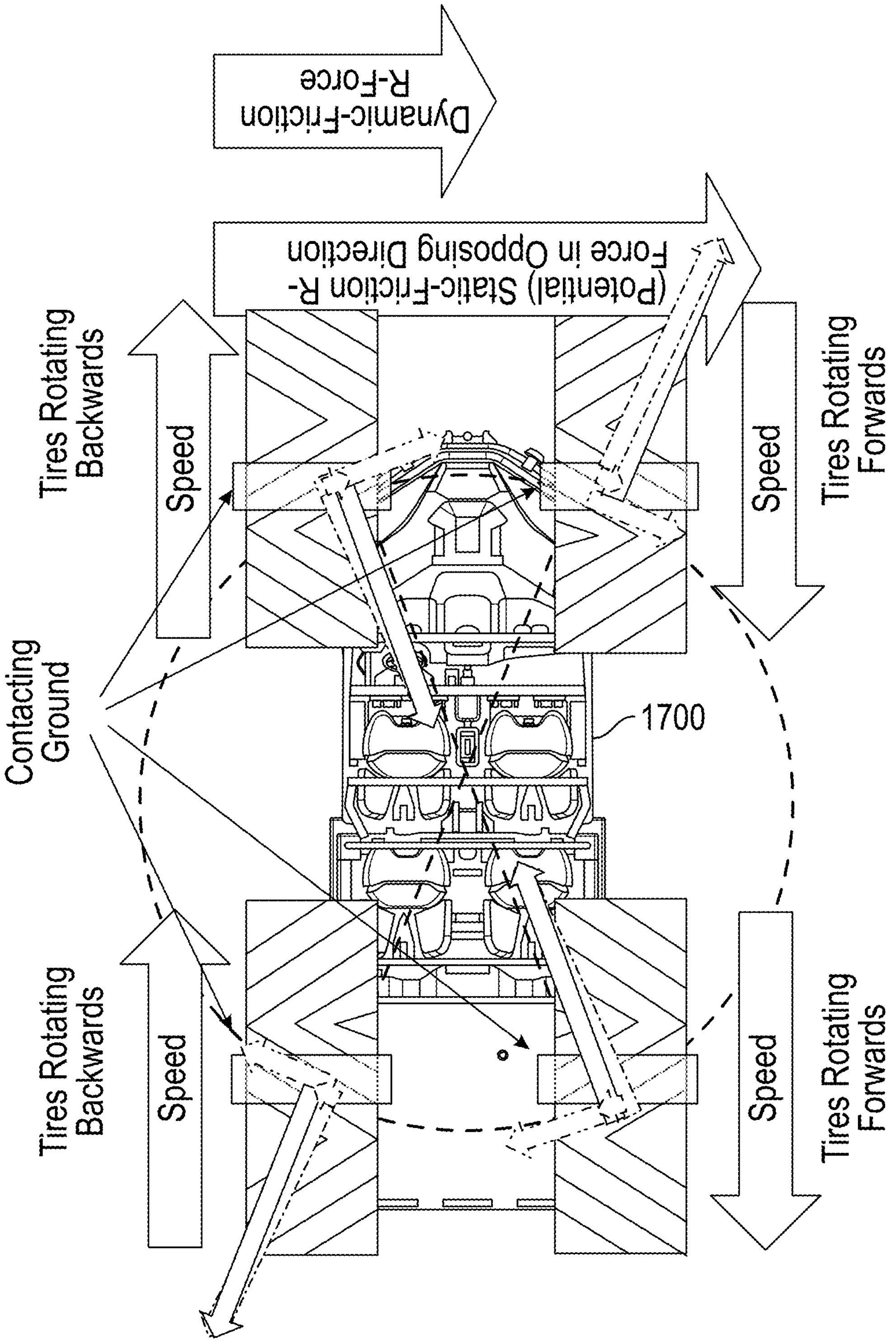
FIGS. 17A-C illustrate schematic views of a vehicle having tires with tread designed to induce traction in multiple directions.
Figure 17B:
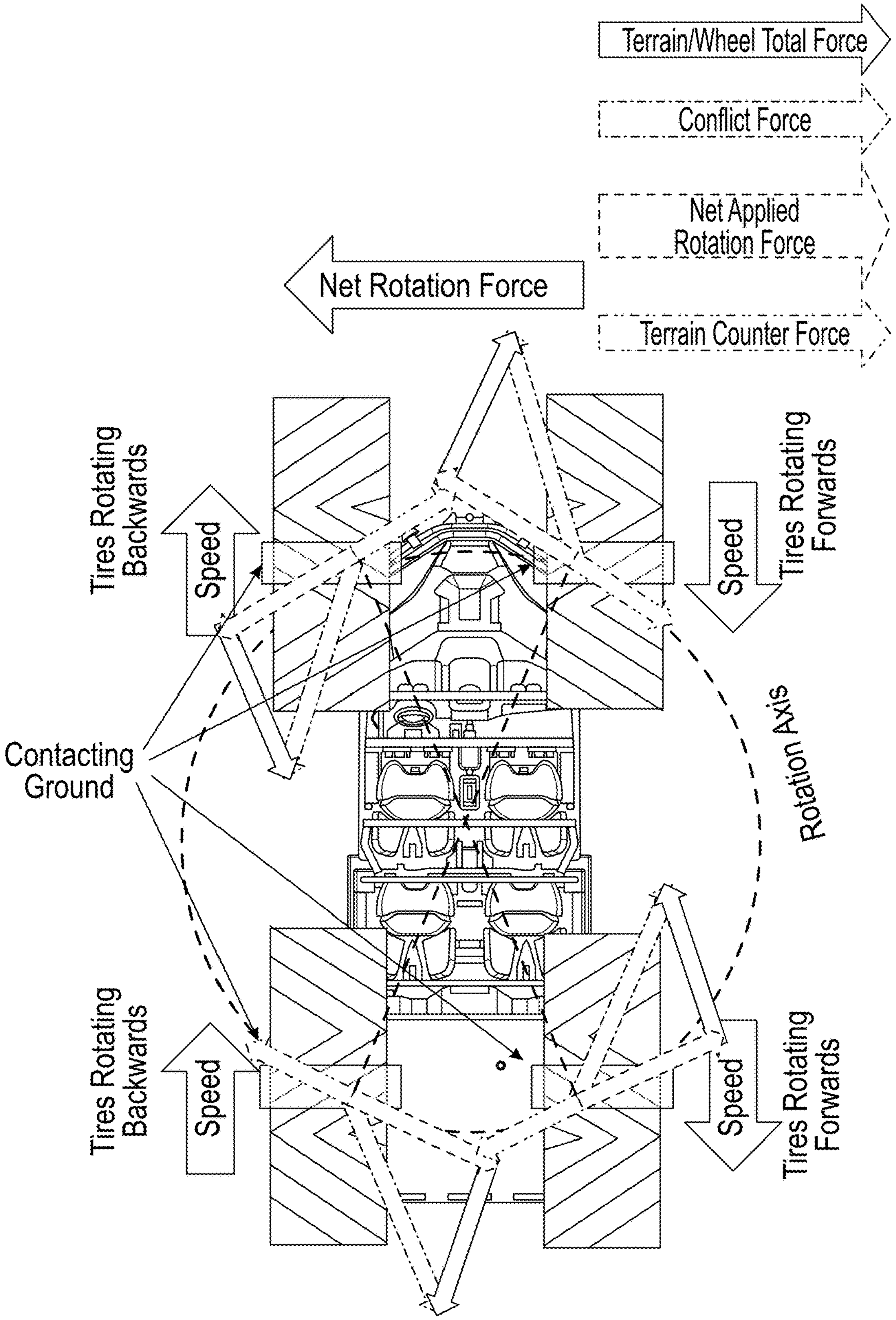
Figure 17C:
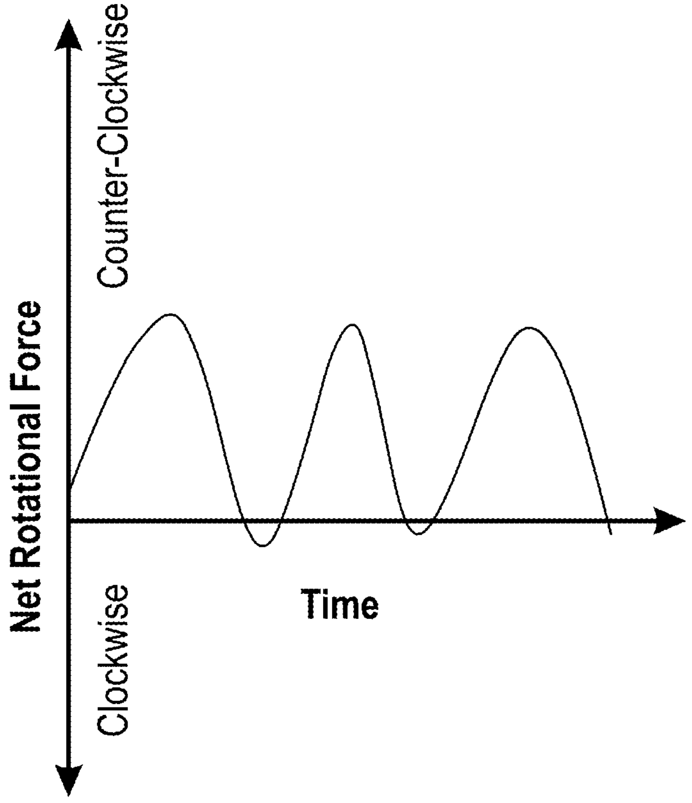

FIGS. 17A-C illustrate schematic views of a vehicle 1700 having tires with tread designed to induce traction in multiple directions. Aspects of FIGS. 17A-C are similar to FIG. 16, however each ground engaging member instead has an alternating tread pattern. As a result, different regions of the ground engaging members may result in increased or reduced lateral friction in the intended rotational direction.

A vehicle controller (e.g., vehicle controller 302) may drive front and rear ground engaging members with a goal of maintaining left/right pairs of tires either in phase or out of phase (along with relative RPM differences) with respect to the lateral low/high-friction sections of the tire tread.

With reference to FIG. 17A, ground engaging members of vehicle 1700 are being driven in opposite directions to achieve a zero-point turn according to aspects described herein. Given left ground engaging members are rotating backwards and right ground engaging members are rotating forward, it would be expected that vehicle 1700 would rotate counter-clockwise. However, the tread pattern instead results in substantially zero net rotational force or a slightly clockwise force as a result of the portion of each ground engaging member that is contacting the ground. If the rotational speed of the ground engaging members is increased, the influence of the clockwise rotation force may be reduced as a result of an increased level of dynamic friction. Thus, the force may be reduced as a result of rapidly spinning each ground engaging member past the associated contact region.

By contrast, FIG. 17B illustrates an example in which the ground engaging members have rotated further (e.g., until the treads now align with a counter-clockwise direction) to give maximum counter-clockwise rotation force. As a result, the rotational speed of the ground engaging members may be reduced so as to have a more static-friction applied to the terrain model, thereby increasing the degree to which vehicle 1700 rotates counter-clockwise. Accordingly, the aspects described with respect to FIGS. 17A and 17B may be used in combination, such that, in the present example, a counter-clockwise rotational force may be achieved as illustrated in FIG. 17B by rotating the ground engaging members at a first speed. Further, a countervailing rotational force may then be reduced by rotating the ground engaging members at a second speed that is comparatively greater than the first speed, as illustrated in FIG. 17A.

The vehicle controller may vary the rotational speed of the ground engaging members to vary the effect provided by the tread. An example of such aspects is illustrated in FIG. 17C, where a net counter-clockwise rotational force vector is depicted. Thus, the vehicle controller may determine and/or track the relative position of the tread pattern with the ground for each ground engaging member, for example using motor encoders and/or a predetermined lug pattern, such that the same periodic alignment is achieved regardless of how a ground engaging member is coupled to the vehicle. In an example, multiple sets of ground engaging members may be operated out of phase with one another (e.g., 180 degrees out of phase between front and rear pairs of ground engaging members), such that when one set is providing a net force in the target rotational direction, the other set is opposing it at a substantially reduced magnitude. As illustrated in FIG. 17C, a substantially greater counter-clockwise net rotational force is achieved as compared to the clockwise net rotational force, as a result of varying the rotation of the ground engaging members as described above.

Figure 18:
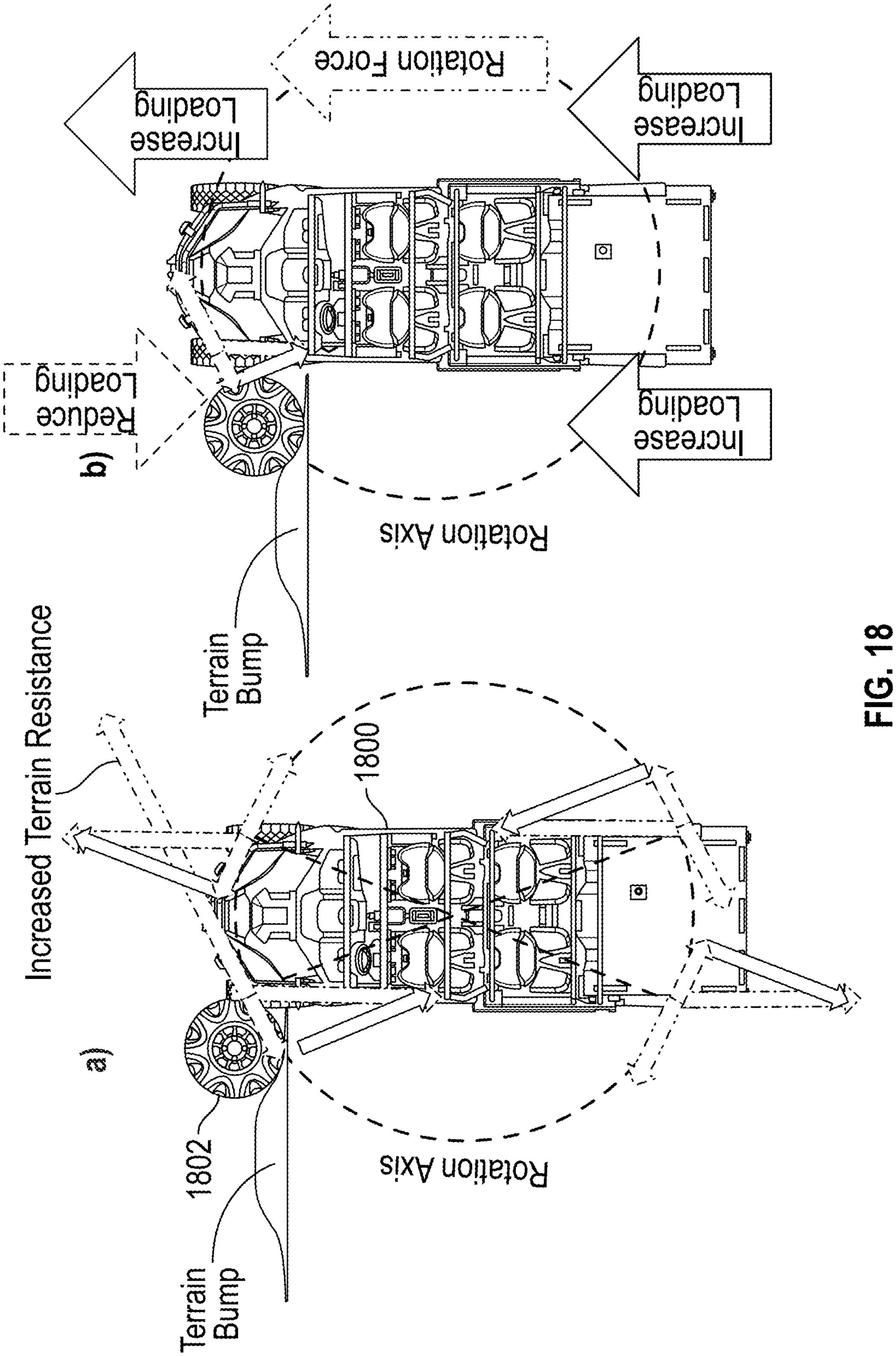
FIG. 18 illustrates a schematic view in which a vehicle's suspension is used to control the load on different ground engaging members.

FIG. 18 illustrates a schematic view in which a vehicle's suspension is used to control the load on different ground engaging members. In an example, a ride height or active suspension system may be used to change the load placed on a given ground engaging member, thereby increasing the rotational force in an intended direction. For example, a load may be increased on a diagonal pair of ground engaging members to increase the rotational force provided, while reducing the load on a set of ground engaging members supplying a counter force. Such techniques may be used when an obstacle is limiting movement of a ground engaging member, such as a bump or an area of decreased (or, in other examples, increased) traction.

As illustrated in a), ground engaging member 1802 of vehicle 1800 is experiencing terrain resistance from a bump. Accordingly, in b), loading of ground engaging member 1802 is reduced, thereby increasing the ability of vehicle 1800 to rotate. Once it is determined that terrain resistance has decreased, the load of vehicle 1800 may once again be more evenly distributed among the ground engaging members. Thus, it will be appreciated that any number of ground engaging members may be more lightly or heavily loaded.

In addition to, or as an alternative to, aspects discussed above with respect to FIGS. 13, 14, 15, 16, and/or 17, aspects of FIGS. 19A-E depict example controls and associated control strategies that may increase steering radius accuracy and/or reduce the surface area associated with turning a vehicle. In examples, absent additional sensors, a vehicle may be unaware of drift (and, as a result, the presence of a potential obstacle) when performing an automatic turn maneuver.

Accordingly, a 1-button, 2-button, 4-button, and/or joystick interface may be used (e.g., as illustrated in FIGS. 19A-D), among other examples, to control operation of a vehicle (e.g., in addition to or as an alternative to other input devices of an operator interface, such as operator interface 304 in FIG. 3). For instance, a vehicle operator uses an example interface illustrated by FIG. 19A, 19B, 19C, or 19D to provide input to a vehicle controller (e.g., vehicle controller 302), thereby affecting operation of the vehicle accordingly. The vehicle operator may thus effectively provide terrain feedback and/or may thus provide input to indicate that the vehicle should change between control strategies, examples of which are illustrated in FIG. 19E.

Figure 19A:
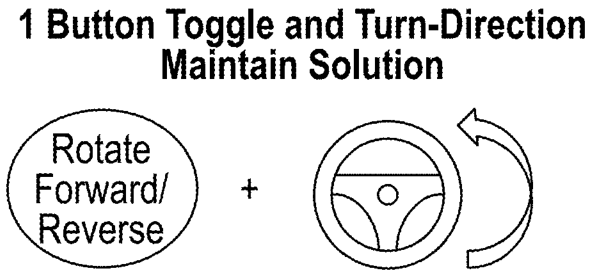
FIGS. 19A-D illustrate schematic views of example operator input schemes that are used to control a vehicle according to aspects described herein.
Figure 19B:
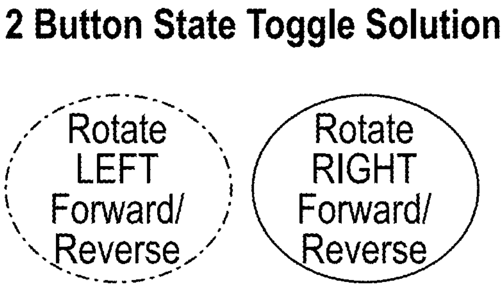
Figure 19C:
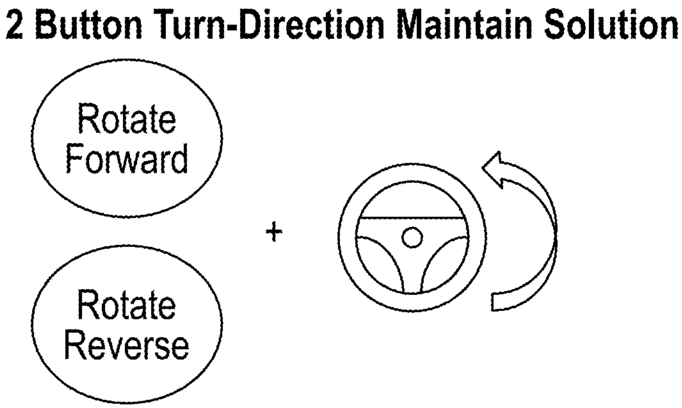
Figure 19D:
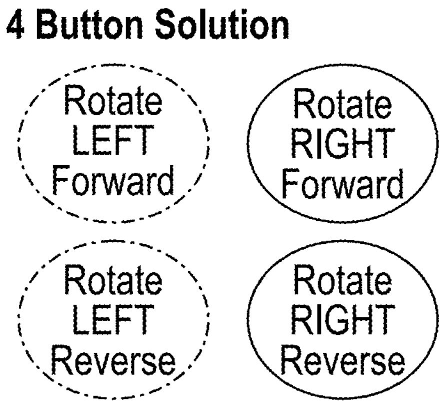

For example, if the vehicle operator intends to cause the vehicle to rotate left, the operator may actuate a left-forward or a left-reverse button in an example (e.g., FIG. 19B or 19D) or may actuate a rotate forward and/or a rotate reverse button in conjunction with a joystick, steering wheel, or other input method to indicate a turn direction (e.g., FIGS. 19A or 19C). As another example, a 1-button solution may be used, where a steering wheel angle determines an initial turning direction and actuation of the button results in a change in wheel torque direction. In such an example, a zero-point turn may be ended as a result of identifying a period of time for which throttle input is not received. The vehicle operator may stop actuating such input control(s) once a desired change to the orientation of the vehicle has been achieved or as a result of identifying an obstacle that may obstruct additional movement by the vehicle (e.g., such that the direction of the vehicle is to be reversed or otherwise changed).

Figure 19E:
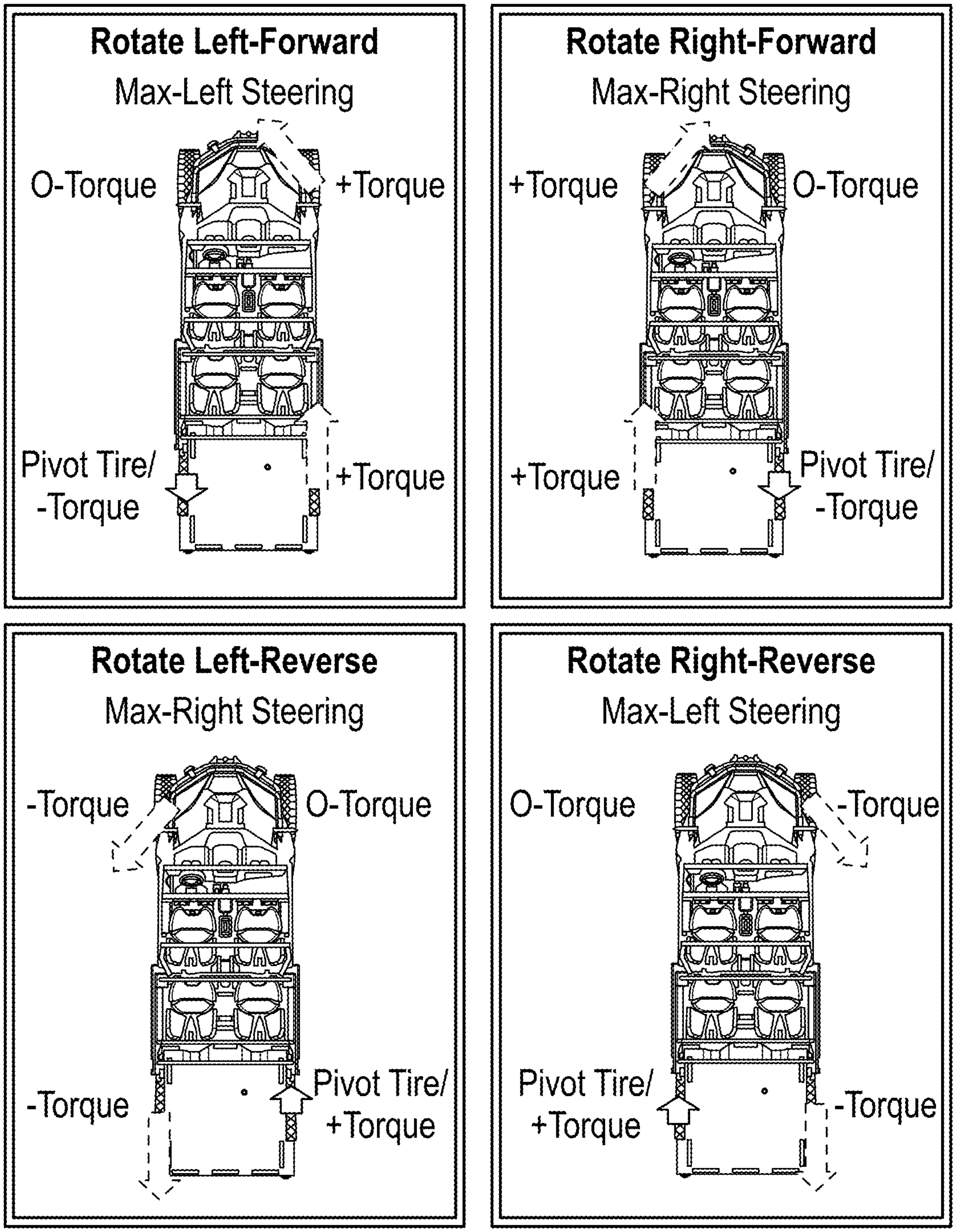
FIG. 19E illustrates example schematic views of vehicle operations associated with the example operator input schemes of FIGS. 19A-D.

In examples, commanding an example control strategy illustrated in FIG. 19E causes a steering wheel of the vehicle to rotate by-wire to a maximum left position or a maximum right position, while a wheel torque direction of the vehicle is switched contemporaneously with the changed steering angle. As an example, a change to the wheel torque direction is accomplished using one or more electric motors of the vehicle (e.g., of a drive system, such as drive system 312), such that a change between a forward/reverse gear need not be performed. Additionally, or alternatively, cutter-brake style enhanced steering may be employed. In examples, an auto-scrubbing technique (e.g., conflict torque and/or oscillating motor torque) may be employed when achieving a maximum left/right steering position, as may be the case when the vehicle is proximate to high lateral resistance terrain and/or has under-powered steering assist.

Thus, a substantially zero-point turn can be achieved under a wide variety of terrain conditions, for example using human understanding of the vehicle's surrounding environment. In some examples, a throttle of the vehicle may still control the net turning torque applied to wheels. As another example, a joystick may additionally, or alternatively, control the net turning torque.

While example input schemes are described, it will be appreciated that any of a variety of other schemes may be used in other examples. For example, a 3-button solution may be used, where the third button is used to change an associated rotational direction. Further, visual, vibration, and/or audio feedback may be provided to indicate a current state associated with the zero-point turn. Additionally, or alternatively, feedback may be provided via an operator interface (e.g., operator interface 304).

Figure 20A:
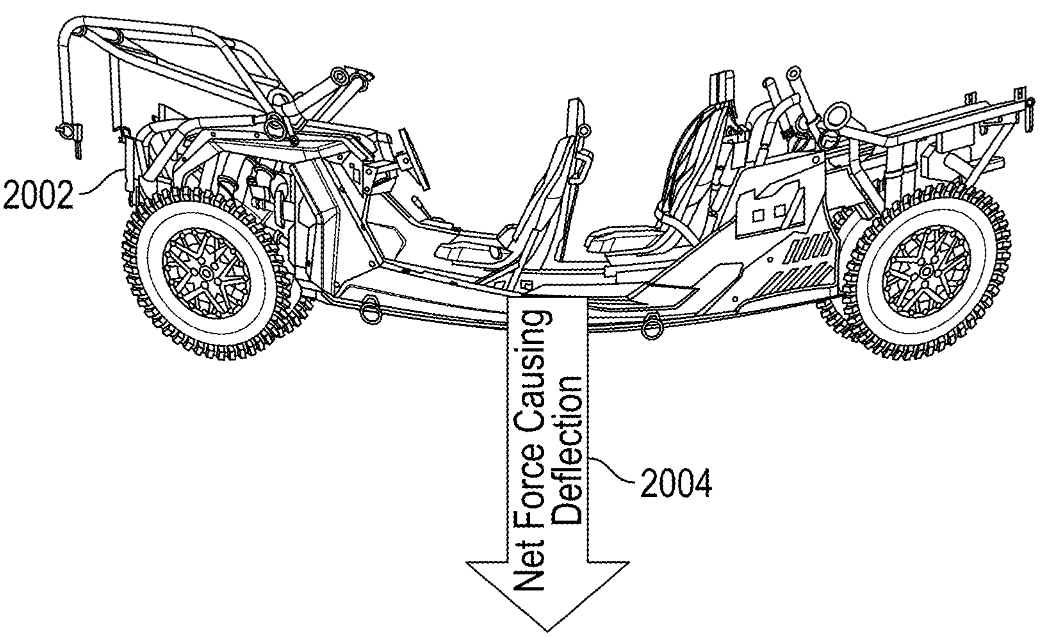
FIGS. 20A-B illustrate schematic views of an example vehicle for which conflicting torque is used to counteract chassis stress/strain according to aspects described herein.

Turning now to FIG. 20A, vehicle 2002 may have one or more collapsible and/or removable portions (e.g., between a front portion and a rear portion of the vehicle and/or between a right portion and a left portion of the vehicle). These and/or other such features may cause a chassis of the vehicle to sag or otherwise become deformed, as illustrated by arrow 2004, which may result from gravity acting on the chassis of the vehicle and/or from a passenger/cargo load, among other examples.

Figure 20B:
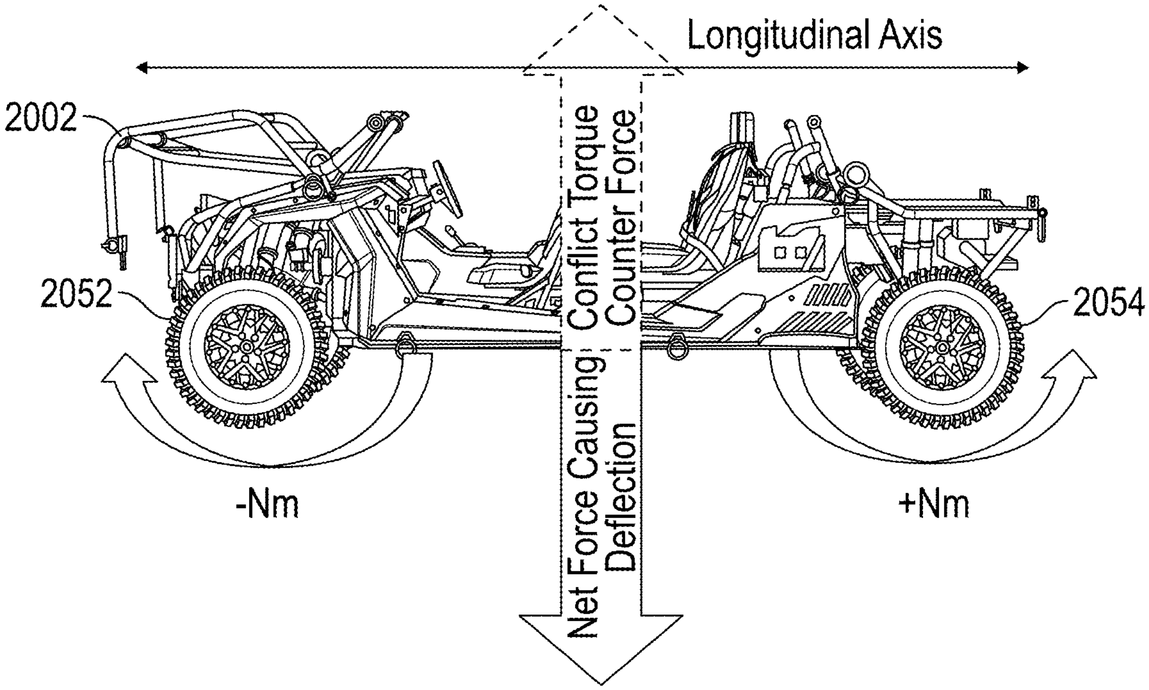

Accordingly, as illustrated in FIG. 20B, opposing ground engaging members 2052 and 2054 of vehicle 2002 (e.g., with respect to a longitudinal axis) are operated to introduce conflicting torque, thereby counteracting sag and/or stress on the chassis of vehicle 2002. For example, front ground engaging members 2052 are operated in a reverse wheel torque direction, while rear ground engaging members 2054 are operated in a forward wheel torque direction. Additionally, or alternatively, ground engaging members that are laterally opposed are operated introduce conflicting torque between a right portion and a left portion of vehicle 2002 according to aspects described herein.

The disclosed aspects may be applied in instances where the vehicle is stationary and/or when the vehicle is moving. In stationary examples, a braking/traction system (e.g., braking/traction system 308) may be engaged so as to reduce or otherwise eliminate the burden on one or more motors/engines of the vehicle accordingly (e.g., in a sleep or powered-off state). In dynamic examples, a torque conflict metric between ground engaging members may be used, which may be adapted to account for a change in terrain over which the vehicle is traveling (e.g., as may be determined based on IMU data and/or LIDAR data, among other examples).

Returning to FIG. 20B, an orientation is determined for the front portion and the rear portion of vehicle 2002 (e.g., based on corresponding IMU data for each portion), such that the torque conflict metric is adjusted to reduce chassis member stress. In some examples, one or more additional or alternative sensors may be used to obtain an understanding of stress/strain in the chassis of the vehicle, such that the torque conflict metric may be generated or otherwise adjusted accordingly. It will therefore be appreciated that any of a variety of data may be used when determining a torque conflict metric according to aspects described herein.

It will be appreciated that the disclosed aspects may be implemented by any of a variety of vehicles, including vehicles having one or more electric motors and/or internal combustion engines, among other examples. For instance, a selective braking system may be used to induce a torque conflict between multiple ground engaging members as an alternative to or in addition to a torque conflict that is induced via multiple electric motors.

Thus, the disclosed aspects may counteract chassis deformation as a result of collapsible and/or removable vehicle members, thereby facilitating vehicle reassembly/reconfiguration, reducing vehicle fatigue, increasing vehicle performance, and/or resulting in weight reduction of chassis design, among other benefits.

Figure 21:
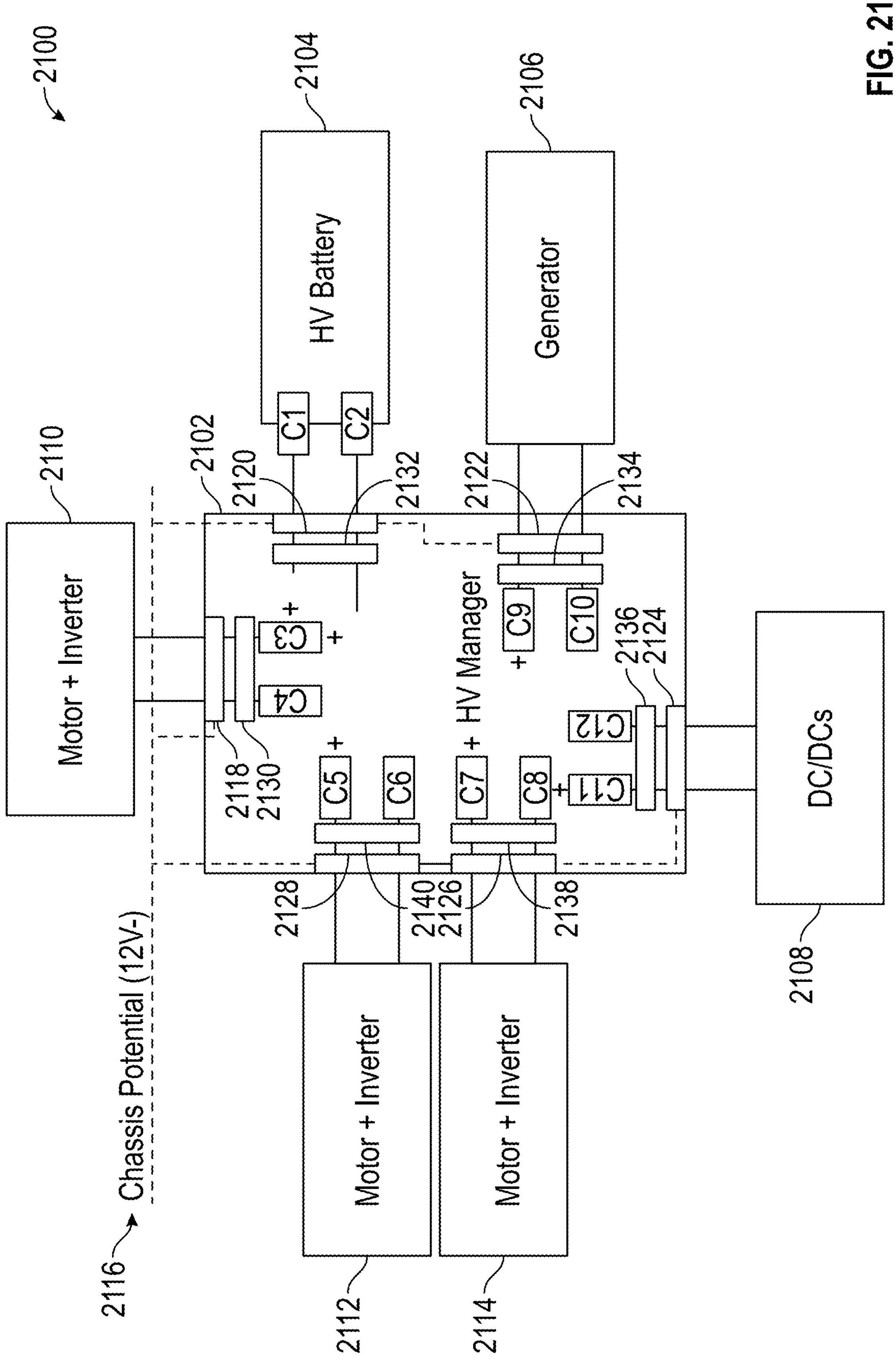
FIG. 21 illustrates a schematic view of examples aspects of a power system of a vehicle with which fault tolerance may be implemented according to aspects of the present disclosure.

FIG. 21 illustrates a schematic view of examples aspects of a power system 2100 of a vehicle with which fault tolerance may be implemented according to aspects of the present disclosure. In examples, aspects of power system 2100 are similar to those discussed above with respect to power system 316 and power controller 326 and are therefore not necessarily redescribed. For example, aspects of high voltage (HV) manager 2102 may be implemented by power controller 326 that was discussed above with respect to vehicle controller 302 in FIG. 3.

As illustrated, HV manager 2102 distributes high voltage power from one or more high voltage power sources (e.g., high voltage battery 2104 and generator 2106) to DC/DC 2108 and motor/inverters 2110, 2112, and 2114, among other examples. To ensure operator and/or passenger safety, high voltage power sources are disconnected when a faulted state is detected (e.g., between the chassis of the vehicle and power system 2100 or other connection between the high voltage bus and a low voltage bus), thereby ensuring the vehicle operator and/or passenger(s) are not inadvertently exposed to high voltage power. However, absent the disclosed aspects, such a faulted state and the resulting disconnection of high voltage power sources may render the vehicle inoperable.

Accordingly, power system 2100 includes contactors C1, C2, C3, C4, C5, C6, C7, C8, C9, C10, C11, and C12, each of which may electrically and/or mechanically decouple an electrical input from an electrical output. For example, the electrical input of C1 is HV battery 2104, while the electrical output of C1 is coupled to HV manager 2102. Thus, in examples where a faulted state is identified, a subpart of power system 2100 may thus be selectively decoupled (e.g., as a result of decoupling a positive connection and/or a negative or ground connection) from the high voltage power bus, thereby mitigating the risk of electric shock while enabling non-faulted subsystems to continue operation using the high voltage power bus.

In examples, HV manager 2102 determines a subsystem is in a faulted state, for example as a result of impedance monitoring. HV manager 2102 may periodically monitor power system 2100 and/or may evaluate one or more associated impedances in response to an event (e.g., a power-on or power-off event or the detection of a shock to the vehicle, as may be detected using an IMU and/or by a vehicle controller). As an example, HV manager 2102 checks impedance between the chassis of the vehicle (e.g., illustrated as chassis potential 2116) and a high voltage circuit (e.g., corresponding to HV battery 2104, generator 2106, DC/DC 2108, motor/inverter 2110, motor/inverter 2112, and/or motor/inverter 2114). An alternating current (AC) source 2118, 2120, 2122, 2124, 2126, 2128 may be used that has a high frequency (e.g., 100 kHz or 10 mHz), thereby forming respective isolation detection circuits. In examples, a corresponding choke 2130, 2132, 2134, 2136, 2138, 2140, respectively, is included that has greater impedance than the target circuit, such that an associated fault can be detected, thereby permitting one or more disconnection points or contactors to be decoupled accordingly. The inclusion of chokes 2130, 2132, 2134, 2136, 238, and 2140 may not appreciably affect high-voltage operation of the target circuit. While system 2100 is illustrated as an example in which HV manager 2102 performs such aspects, it will be appreciated that similar techniques may be used in instances where fault detection and/or decoupling are performed in a decentralized manner. Thus, as compared to vehicle-level fault monitoring, aspects of the present disclosure enable various subparts of a power system to be monitored, for example by selectively opening/closing one or more contactors corresponding to a given subpart and/or through inclusion of the chokes as noted above.

For example, a target circuit comprising motor/inverter 2114, AC source 2126, choke 2138, positive contactor C7, and negative/ground contactor C8 may have an associated HV manager (not pictured), aspects of which may be similar to those described herein with respect to HV manager 2102. Accordingly, the HV manager for the target circuit may evaluate an impedance associated with AC source 2126 in relation to chassis potential 2116 to determine whether a fault has occurred for the target circuit. Accordingly, if it is determined that a fault has occurred, the HV manager actuates positive contactor C7 and/or negative/ground contactor C8.

It will be appreciated that system 2100 is provided as an example and, in other examples, any of a variety of additional or alternative components may be used. For example, another example may include fewer or additional contactors, thereby segmenting power system 2100 according to any of a variety of other paradigms. Further, it will be appreciated that any of a variety of other detection techniques may be used, for example sequencing through varying combinations of associated subsystems (e.g., enabling/disabling each subsystem) to determine which subsystem has experienced a fault.

Figure 22:
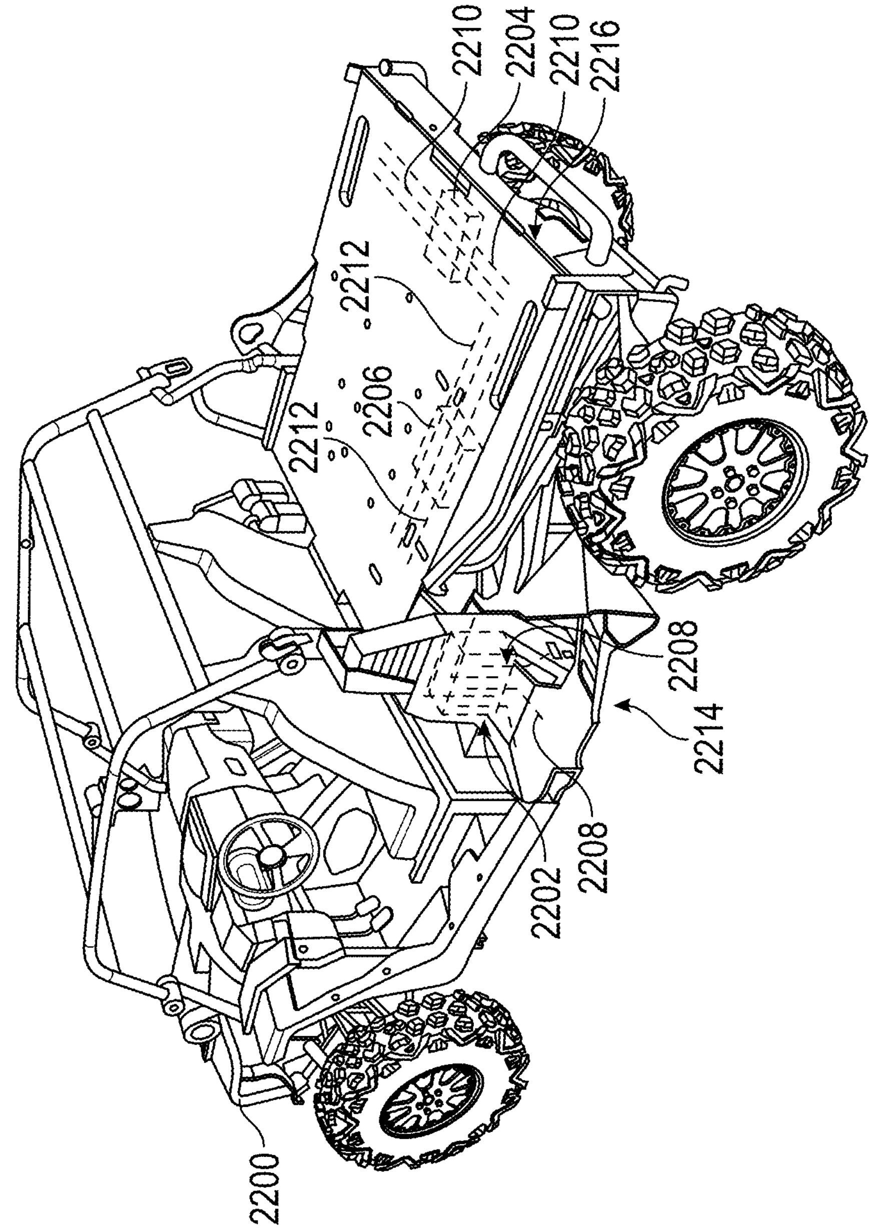
FIG. 22 illustrates an example vehicle in which an example cooling system is used to dissipate heat from high-voltage components of the vehicle according to aspects described herein.

FIG. 22 illustrates an example vehicle 2200 in which an example cooling system is used to dissipate heat from high-voltage components 2202, 2204, 2206 of vehicle 2200 according to aspects described herein. Aspects of vehicle 2200 may be similar to those discussed herein with respect to vehicles 10 and 300 and are therefore not necessarily re-described below in detail. Examples of high-voltage components 2202, 2204, and 2206 include, but are not limited to, motor controllers or DC/DC converters, among other examples.

As illustrated, high-voltage components 2202, 2204, and 2206 are each coupled to a set of heat transfer devices 2208, 2210, and 2212, respectively. Heat transfer devices 2208, 2210, and 2212 may each include a conductive rod and/or a heat pipe, thereby facilitating heat distribution from high-voltage components 2202, 2204, and 2206, respectively, to a chassis member of vehicle 2200 (e.g., chassis members 2214 and/or 2216 in the illustrated example). In some examples, a vehicle component may integrate or otherwise include a heat transfer device, which may thus be coupled to a vehicle chassis member according to aspects described herein.

In examples, a chassis member to which a heat transfer device is coupled may be selected based on proximity to the component to be cooled, ease of serviceability, and/or the degree to which the chassis member will dissipate heat. Example chassis members include, but are not limited to, aluminum panels (e.g., chassis member 2214), a vehicle bed (e.g., chassis member 2216), and/or a forward-facing chassis member or other chassis member that would be subjected to airflow when vehicle 2200 is in motion, among other examples. For example, a vehicle chassis member may be selected based on an associated thermal conductivity and/or heat capacity, among other characteristics. It will therefore be understood that any of a variety of additional or alternative such vehicle chassis members may be used in other examples.

Components of a hybrid or an electric vehicle may thus be distributed or otherwise located proximally to vehicle chassis members in examples (e.g., rather than aggregated or centrally located, as may be the case for internal combustion engine components). In examples, the illustrated cooling system may be used an alternative to a liquid cooling system, thereby reducing complexity, weight, and/or associated cost, among other benefits.

Figure 23A:
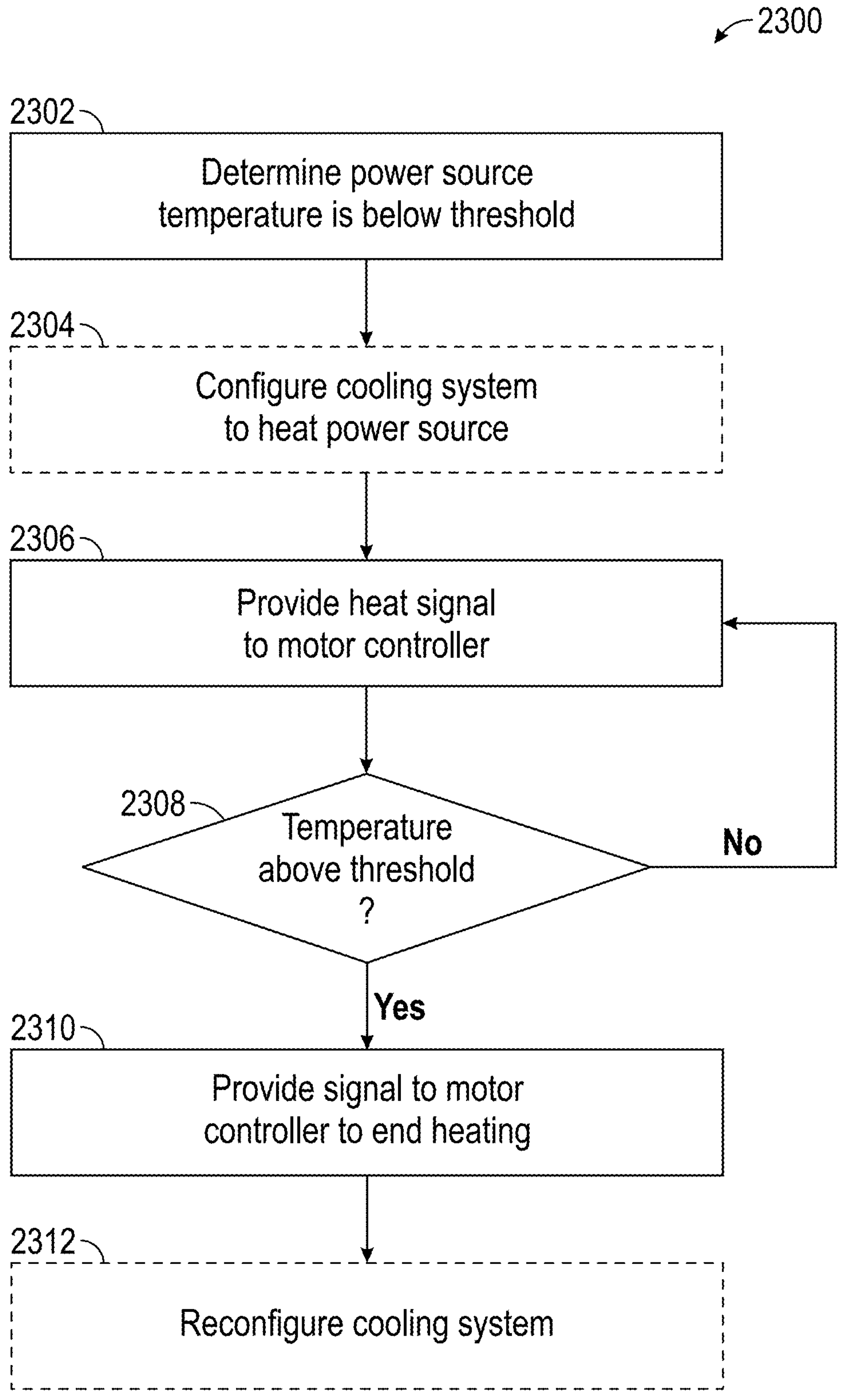
FIGS. 23A-B illustrate overviews of example methods for heating a power source of a vehicle according to aspects described herein.
Figure 23B:
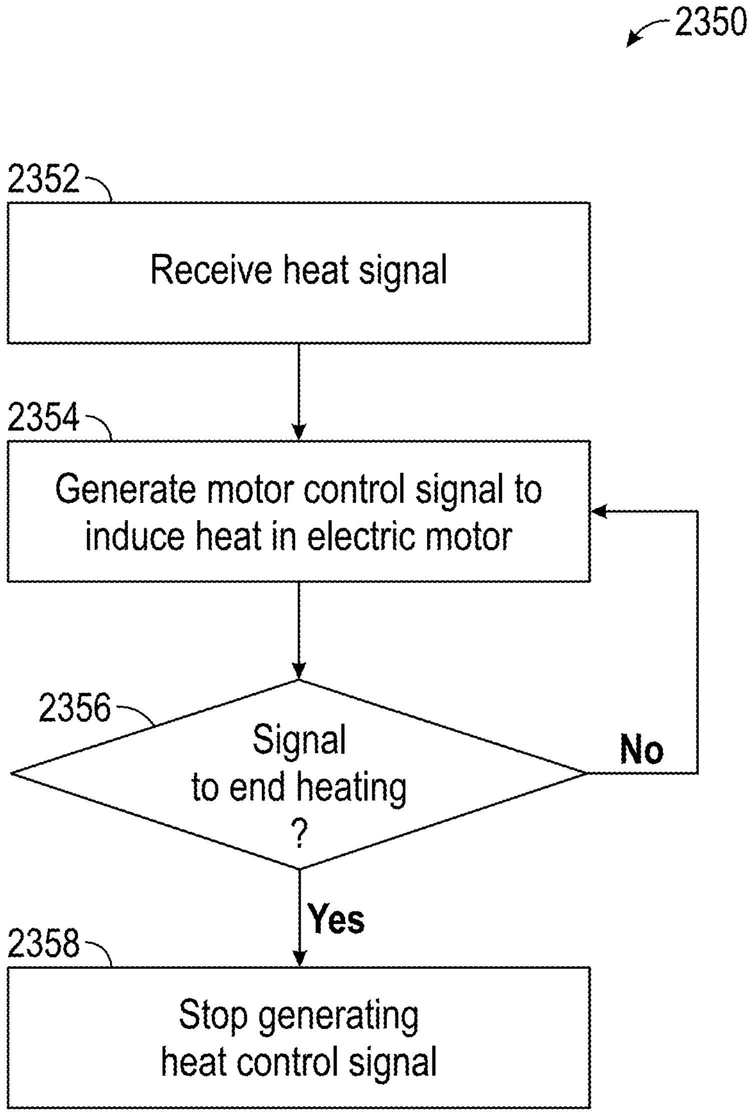

Turning now to FIGS. 23A-B, overviews of example methods for heating a power source of a vehicle according to aspects described herein are illustrated. In examples, a power source of a vehicle (e.g., battery pack 518 in FIG. 5, as may be a part of power system 316 in FIG. 3) performs differently depending on its temperature. For example, the power source may exhibit decreased capacity and/or discharge current when cold. As an alternative to, or in addition to, a heating system for the power source, an electric motor may be operated (e.g., by a motor controller, such as motor controller 322) to generate heat that is used to heat the battery pack accordingly (e.g., via a temperature control system, such as system 500 in FIG. 5). Aspects of method 2300 may be performed by a vehicle controller (e.g., vehicle controller 302 in FIG. 3), while aspects of method 2350 may be performed by a motor controller (e.g., motor controller 322), among other examples. The disclosed aspects may thus reduce or eliminate additional heating components, thereby simplifying system design and reducing weight/cost, among other benefits.

As illustrated, method 2300 begins at operation 2302, where it is determined that a power source temperature is below a threshold. For example, the power source may include or otherwise be associated with a temperature sensor. Additionally, or alternatively, operation 2302 comprises evaluating one or more electrical characteristics of the power source, such as a voltage or current, and/or resulting performance of an associated electric motor, among other examples. The threshold may be selected according to the power source, as may be the case when different battery chemistries exhibit different characteristics according to temperature.

Accordingly, at operation 2304, a cooling system is configured to heat the power source. As an example, one or more coolant flow controllers (e.g., flow controller 506, 508, and/or 510 in FIG. 5) are configured to direct coolant from an electric motor to the power source accordingly. Operation 2304 is illustrated using a dashed box as, in other examples, operation 2304 may be omitted. It will therefore be appreciated that any of a variety of additional or alternative operations may be performed in other examples.

For instance, a braking/traction system (e.g., braking/traction system 308 in FIG. 3) is configured to restrict vehicle movement that will result from the signal that is generated at operation 2306. In examples, the braking force that is supplied by the braking/traction system is dynamically determined, for example in response to the heat signal in combination with an operator input and/or other movement associated with the vehicle. Thus, the heat signal at operation 2306 may cause the electric motor to generate additional output, which is counteracted by the introduction of (additional) braking force, thereby maintaining substantially consistent vehicle movement. Additionally, or alternatively, rheostatic braking may be used to generate additional heat.

At operation 2306, a heat signal is provided to a motor controller (e.g., motor controller 322 in FIG. 3). In examples, such a heat signal is used at operation 2306 rather than generating a motor control signal, as the frequency of the motor control signal may exceed that which can be communicated via a CAN bus or other communication means. As a result, the motor controller may generate a motor control signal accordingly, aspects of which are described in greater detail below with respect to method 2350 of FIG. 23B. In other examples, operation 2306 includes generating the motor control signal. In examples, the motor is powered by a battery pack (e.g., for which heat is being generated) and/or by a generator (e.g., as may be powered by an internal combustion engine).

Accordingly, at determination 2308, it is determined whether the temperature of the power source is above a threshold. The threshold may be a substantially similar threshold or a different threshold than the threshold that was used in operation 2302. Accordingly, if it is determined that the temperature is not above the threshold, method 2300 branches "NO" and returns to operation 2306, where the heat signal is provided to the motor controller. In other examples, the heat signal need not be provided again, as may be the case when the motor controller is configured to maintain an operating mode (e.g., a heating operating mode or a mode of normal operation) until a different operating mode is specified accordingly.

By contrast, if it is determined that the temperature is above the threshold, flow instead branches "YES" to operation 2310, where a signal is provided to the motor controller to end heating. Additional aspects are discussed below with respect to method 2350 of FIG. 23B. In examples, method 2300 progresses to operation 2312, where the cooling system is reconfigured, for example to direct heat to one or more other components and/or to cool the power source, among other examples. Operation 2312 is illustrated using a dashed box to indicate that, in other examples, operation 2312 may be omitted.

Turning now to FIG. 23B, method 2350 begins at operation 2352, where a heat signal is received. For example, the heat signal is received from a vehicle controller performing aspects of operation 2306 discussed above with respect to method 2300 of FIG. 23A. In examples, the heat signal is received via a CAN bus of the vehicle.

Accordingly, at operation 2354, a motor control signal is generated that induces heat in one or more electric motors. For example, operation 2354 comprises generating a motor control signal having a high frequency, thereby providing an oscillating torque command that exceeds a response curve for a corresponding drivetrain (e.g., due to drivetrain inertia). As a result, there is effectively little to no net torque output, such that the electrical energy supplied to the motor generates heat (e.g., in the motor, inverter, and/or other components) accordingly. The heat motor control signal generated at operation 2354 may be in addition to a drive motor control signal (e.g., as may be the case when the vehicle is underway) or may be the sole control signal provided to the motor (e.g., as may be the case when the vehicle is idle or stationary).

As noted above with respect to method 2300, a braking/traction system of the vehicle may be used to counteract additional torque generated by the motor in some examples. Thus, operation 2354 additionally, or alternatively, may include providing a heat control signal that induces additional torque output by the motor, which is counteracted by the braking/traction system according to aspects described herein. As a further example, in instances where a vehicle includes multiple motors, operation 2354 comprises generating a set of conflicting torque commands, thereby causing the motors to generate stall motor heat (e.g., as a result of a first motor outputting torque that substantially counteracts torque output of a second motor). In such an example, each conflicting torque command may be determined based at least in part on a detected surface traction, such that the torque commands introduce little to no movement of the vehicle and associated ground engaging member(s).

As another example, a set of tuning parameters of a motor controller may additionally, or alternatively, be modified in response to the heat signal that was received at operation 2352. For example, rotor-magnetizing flux (Id) and/or motor torque output (Iq) may be adjusted to cause operation of the motor to introduce additional heat (rather than torque). It will therefore be appreciated that any of a variety of techniques may be used to cause the motor to generate heat in response to a received heat signal according to aspects described herein.

At determination 2356, it is determined whether a signal has been received to end heating. For example, the signal may be received as a result of performing aspects of operation 2310 discussed above with respect to method 2300 of FIG. 23A. If no such signal is received, flow branches "NO" and returns to operation 2354. Thus, the motor controller generates a heat motor control signal until a stop signal is received accordingly. By contrast, if a stop signal is received, flow instead branches "YES" to operation 2358, where the heat motor control signal is no longer generated. In instances where one or more tuning parameters where modified at operation 2354, the tuning parameter(s) may similarly be changed at operation 2358 to revert to improved motor efficiency (e.g., such that a higher degree of input energy is converted to torque as compared to the set of tuning parameters that were used at operation 2354).

Figure 24:
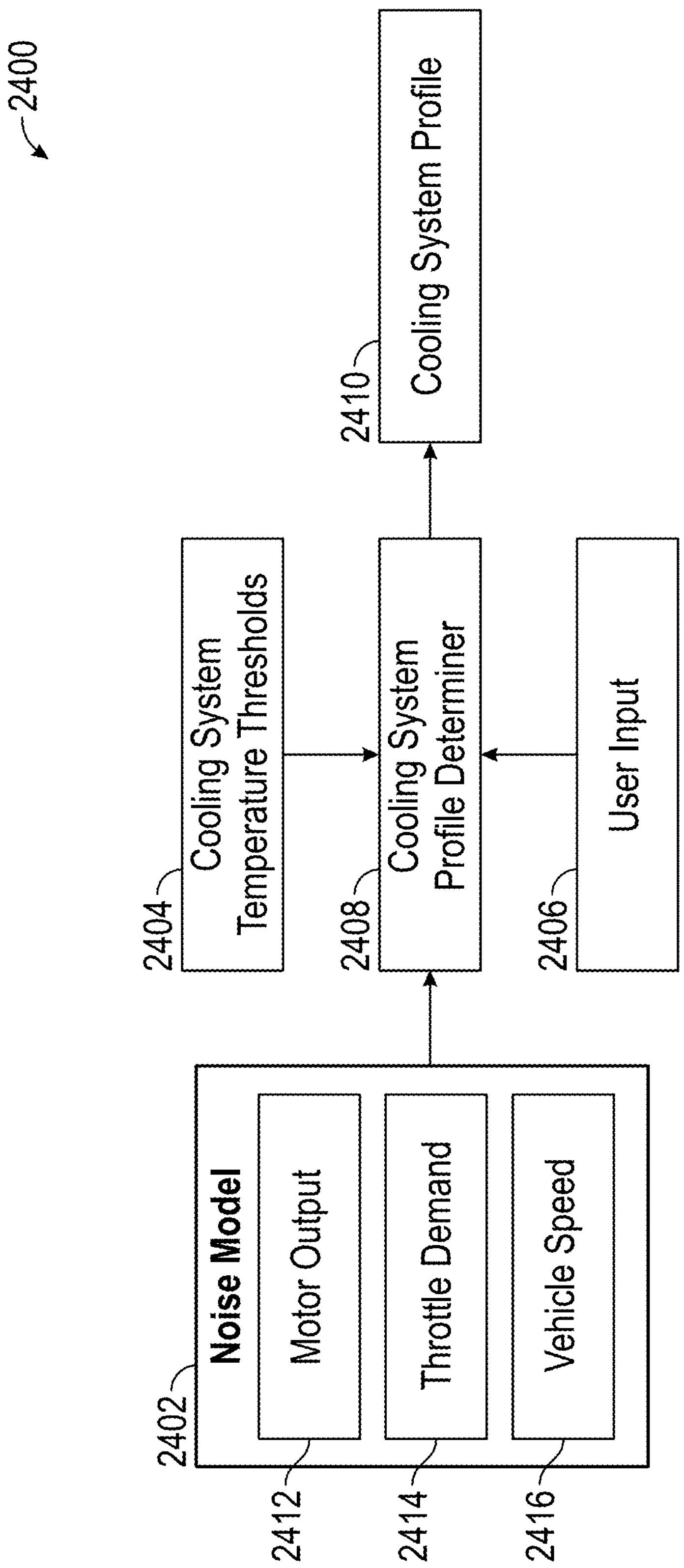
FIG. 24 illustrates an overview of an example system for generating a cooling profile for a cooling system of a vehicle according to aspects described herein.

FIG. 24 illustrates an overview of an example system 2400 for generating a cooling profile for a cooling system (e.g., cooling system 500 in FIG. 5) of a vehicle according to aspects described herein. In examples, a vehicle cooling system cools a vehicle engine and/or drivetrain reactively, given such vehicle components may exhibit improved performance at a higher temperature, such that the vehicle components are reactively cooled once they have reached the higher temperature. Additionally, the cooling system may be active in instances with a higher driving load and, due to temperature lag, the cooling system may remain active after the driving load has decreased, thus resulting in an increased noise profile (even in instances where such a profile would be undesirable). Further, given the comparatively quiet noise profile of electric and hybrid vehicles, cooling system activity may provide a greater contribution to the overall noise profile of the vehicle.

Accordingly, system 2400 determines a cooling profile that increases cooling system activity contemporaneously with other vehicle noise (e.g., as may be generated by the powertrain of the vehicle), such that additive noise resulting from the cooling system alone is reduced.

As illustrated system 2400 includes noise model 2402, cooling system temperature thresholds 2404, and user input 2406, which are processed by cooling system profile determiner 2408 to generate cooling system profile 2410. In examples, a resulting cooling system profile 2410 includes one or more values corresponding to pump/fan speeds, temperature targets, and/or any of a variety of other control information for a cooling system. Thus, a cooling system profile 2410 generated according to aspects of system 2400 may be provided to a cooling controller (e.g., cooling controller 324 in FIG. 3) to adapt operation of an associated cooling system (e.g., cooling system 314 and/or cooling system 500 in FIG. 5) accordingly. In examples, certain cooling system components may operate substantially continuously (e.g., which have little to no impact on a vehicle's noise profile), such as a pump that draws relatively low power, generates relatively low noise, and enables heat to move from a heat source to a heat sink (e.g., as may have been proactively according to aspects described herein).

In examples, noise model 2402 generates an expected noise level based on motor output 2412 (e.g., nominal or peak torque output, throttle demand 2414, and vehicle speed 2416. While example factors 2412, 2414, and 2416 are illustrated, it will be appreciated that any of a variety of alternative or additional factors may be used in other examples. Alternatively, or additionally, an actual noise level or other actual sensor data may be used (e.g., as may be obtained from a microphone and/or IMU associated with one or more components of the vehicle's powertrain). Noise model 2402 may be a statistical model, a machine learning model, and/or may include hardware connections that approximate a similar model.

System 2400 is further illustrated as including cooling system temperature thresholds 2404, which may include one or more temperature limits of the vehicle, as may be associated with one or more vehicle components. For instance, an electric motor, motor controller, and/or DC/DC converter of the vehicle may have an associated operating temperature, above which unexpected performance and/or damage may occur. Accordingly, cooling system temperature thresholds 2404 may include temperature limits that ensure or otherwise improve vehicle stability and/or longevity, among other examples.

User input 2406 is further included as input to cooling system profile determiner 2408, thereby enabling user customization and/or user control of the cooling system profile that is applied to the cooling system of the vehicle. For example, a user may customize (e.g., add, remove, or modify) various thresholds (e.g., as may override cooling system temperature thresholds 2404) and/or may select one or more sources that are used as input to cooling system profile determiner 2408, among other examples.

In examples, cooling system profile 2410 is selectively enabled, as may be the case when a vehicle operator provides an indication to enable cooling system profile 2410 or cooling system profile 2410 is automatically enabled (e.g., based on a geographic location or time of day). Thus, cooling system profile 2410 may override an existing or default cooling system profile, as may be used in the absence of such a vehicle operator selection and/or automatic determination.

Accordingly, a cooling system operating according to aspects described herein may provide additional cooling (and, thus, precooling in some examples) when the vehicle generates additional noise. While examples are described with respect to EV/hybrid vehicles, it will be appreciated that similar techniques may be used for an internal combustion vehicle. Additionally, similar techniques may be used for other systems of a vehicle, such as an emergency brake booster pump.

Figure 25:
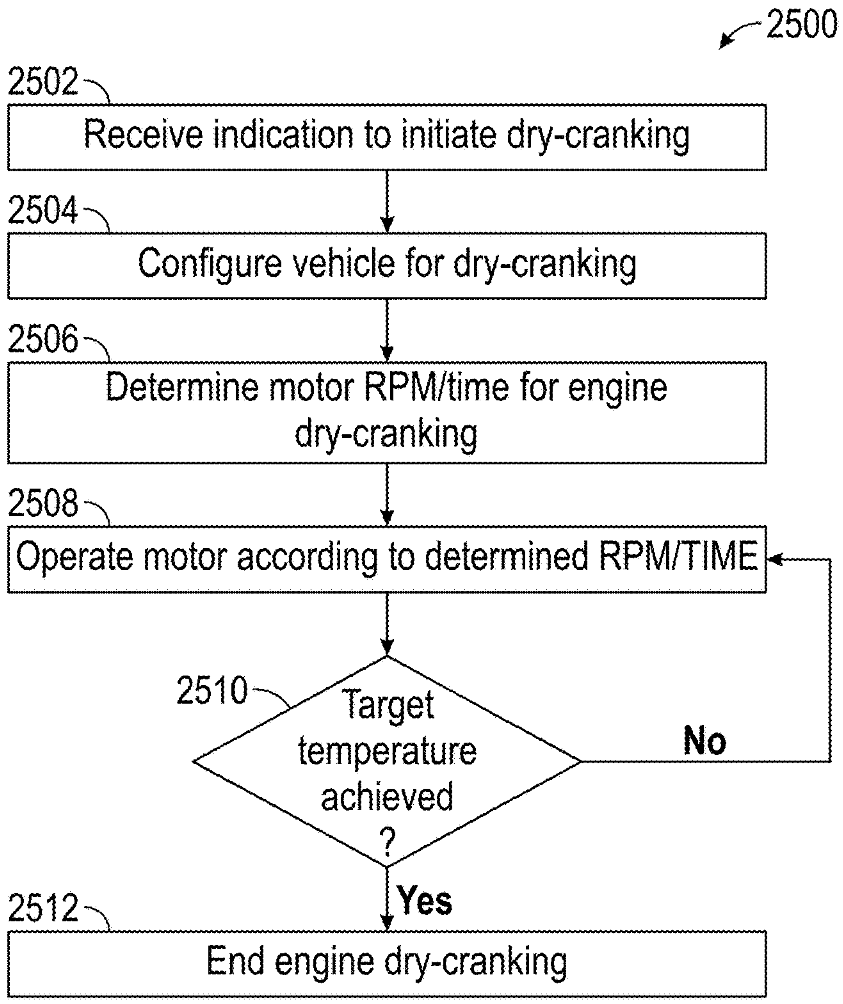
FIG. 25 illustrates an overview of an example method for dry-cranking an engine of a vehicle according to aspects described herein.

FIG. 25 illustrates an overview of an example method 2500 for dry-cranking an engine of a vehicle according to aspects described herein. In examples, an engine of a vehicle retains heat even after use. Accordingly, a motor that is coupled to the engine (e.g., such as a traction motor and/or a generator motor of a hybrid vehicle) is used to cycle the engine without fuel, thereby moving colder/ambient air through the engine, thereby cooling one or more portions of the engine and/or associated components (e.g., the exhaust system and/or a turbo) more quickly than they would otherwise be cooled if the engine remained stationary. The engine may be cycled in a forward and/or a reverse direction. In examples, such aspects may be used prior to or in addition to EV-mode operation of the vehicle (e.g., movement of the vehicle without or with reduced operation of the engine). In instances where a traction motor is used, less heat may be generated than if a starter motor was used. In examples, a cooling system associated with the engine is operated in conjunction with the disclosed dry-cranking techniques, thereby further cooling the engine and/or associated components of the vehicle.

Turning now to method 2500, an indication to initiate dry-cranking is received at operation 2502. In examples, the indication is received as a result of vehicle operator input. As another example, the indication is automatically generated, for example, based on a location of the vehicle, based on determining the vehicle is operating below a predetermined speed, based on determining the vehicle is operating in an EV-mode, and/or based on determining one or more components of the vehicle have a temperature above a predetermined threshold. It will therefore be appreciated that any of a variety of criteria may be evaluated to determine whether to initiate dry-cranking according to aspects described herein.

At operation 2504, the vehicle is configured for dry-cranking. In examples, the operation of one or more fuel injectors associated with the engine is suspended. In another example, an associated oil pump is powered on (or remains powered on), thereby ensuring engine lubrication during dry-cranking. In a further example, a cooling system of the vehicle is powered on (or remains powered on), thereby removing additional heat from the engine and/or associated components during dry-cranking. Any of a variety of additional or alternative operations may be performed to prepare the vehicle for dry-cranking. In instances where a traction motor of the vehicle is used for dry-cranking, the traction motor and the engine may be mechanically coupled (e.g., via the drivetrain of the vehicle) at operation 2504.

Flow progresses to operation 2506, where one or more parameters are determined for engine dry-cranking. As illustrated, an RPM and a cranking time are determined at operation 2506. In examples, an engine-cooling algorithm and/or a multi-dimensional lookup table is used to generate the target RPM and cranking time (among any of a variety of additional or alternative parameters), for example based on temperature data from one or more temperature sensors (e.g., relating to the engine block, coolant, and/or an exhaust system) and/or a noise target (e.g., as may be specified by a user and/or automatically determined). In examples, the target RPM is determined based on a relationship between power losses (e.g., which would result in heat) and an estimated cooling rate of the engine and/or associated components, such that the target RPM is determined to increase cooling rate while reducing power losses. As a result of such a relationship, an operating time is further determined, such that operation of the motor according to the target RPM for the operating time results in a temperature decrease to a target temperature accordingly. Accordingly, at operation 2508, the motor is operated according to the determined RPM and operating time, thereby reducing heat in the engine and/or of one or more associated components.

At determination 2510, it is determined whether a target temperature is achieved. In examples, the target temperature was indicated by the indication that was received at operation 2502. As another example, the target temperature may be determined based on an ambient temperature of the environment in which the vehicle is operating, among other examples. While method 2500 is illustrated as an example in which a target temperature is evaluated, it will be appreciated that similar techniques may be used to perform engine dry-cranking based on a correlation with a cooling rate of one or more associated components/systems, based on direct/indirect sensor data, and/or based on an associated noise profile of the engine dry-cranking, among other examples.

If it is determined that the target temperature has not been achieved, flow branches "NO" and returns to operation 2508, where operation of the motor continues as described above. However, if it is instead determined that the target temperature has been achieved, flow branches "YES" where engine dry-cranking is ended at operation 2512. For example, the oil pump and/or cooling system of the vehicle may be powered down and/or the engine may be decoupled from the drivetrain of the vehicle, among other examples. The vehicle may then be powered off or may continue operation in an EV-operating mode, among other examples. Method 2500 terminates at operation 2512.

Figure 26:
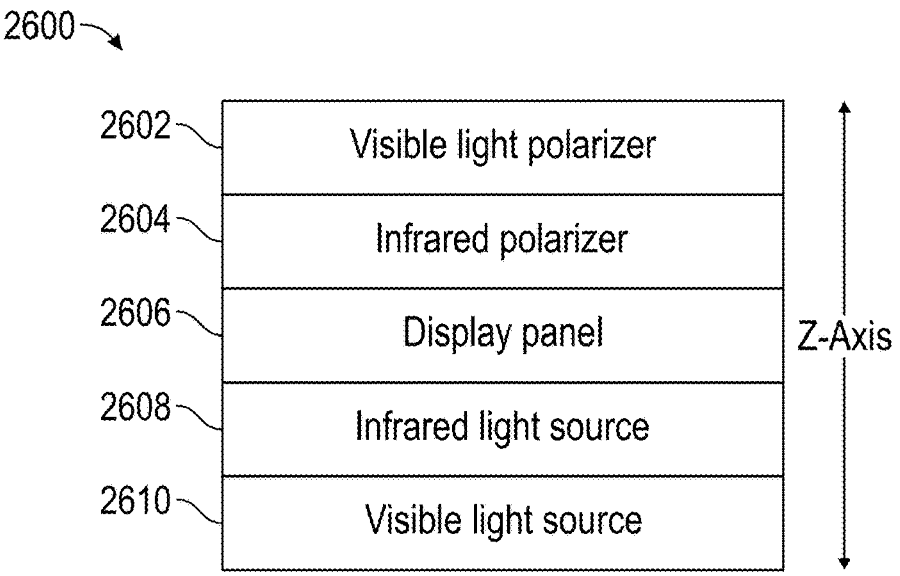
FIG. 26 illustrates a schematic view of an example display assembly having an infrared mode of operation and a visible light mode of operation according to aspects of the present disclosure.

FIG. 26 illustrates a schematic view of an example display assembly 2600 having an infrared mode of operation and a visible light mode of operation according to aspects of the present disclosure. While low-light or infrared illumination may be used to illuminate at operator area of a vehicle (e.g., as may be helpful in low-light, nighttime, or otherwise dark scenarios), using a display of the vehicle under such conditions may introduce additional challenges. For example, if the display is too bright, the vehicle operator may be temporarily blinded (e.g.,) while their eyes readjust to the dark environment and/or light generated by the display may be visible from the exterior of the vehicle.

Accordingly, display assembly 2600 includes both infrared light source 2608 (e.g., including a plurality of infrared light-emitting diodes (LEDs)) and visible light source 2610 (e.g., including a plurality of visible light LEDs), such that display assembly 2600 is usable in both an infrared mode of operation and a visible light mode of operation. In examples, a control signal is received from a vehicle controller (e.g., vehicle controller 302 in FIG. 3) that causes display assembly 2600 to operate in either the infrared mode or the visible light mode of operation. Infrared light source 2608 and visible light source 2610 each have an associated polarizer (infrared polarizer 2604 and visible light polarizer 2602, respectively), such that light from light source 2608 or 2610 that passes through display panel 2606 is polarized by the corresponding polarizer. In examples, polarizers 2602 and 2064 may each be linear polarizers, though it will be appreciated that any of a variety of other polarizers may be used in other examples.

In examples, visible light source 2610 and visible light polarizer 2602 are oriented 90 degrees from each other. Similarly, infrared light source 2608 and infrared polarizer 2604 are oriented 90 degrees from each other in some examples. In some instances, display panel 2606 is a twisted nematic (TN) liquid crystal display (LCD) panel, though it will be appreciated that any of a variety of other technologies may be used (e.g., in-plane switching (IPS) or vertical alignment (VA)). A liquid crystal of display panel 2606 may thus block both visible light and infrared light in the energized state.

Additionally, or alternatively, display assembly 2600 has a low-light mode of operation, where visible light source 2610 is driven at a substantially lower current than the visible light mode of operation (e.g., as may be achieved via a set of current-limiting resistors and/or one or more associated software settings), such that light output of display assembly 2600 is detectable through or otherwise amplified using a night-vision device worn or otherwise used by the vehicle operator and/or passengers. In such an example, visible light source 2610 includes a set of blue or red LEDs that are operated at the substantially lower current accordingly.

Figure 27:
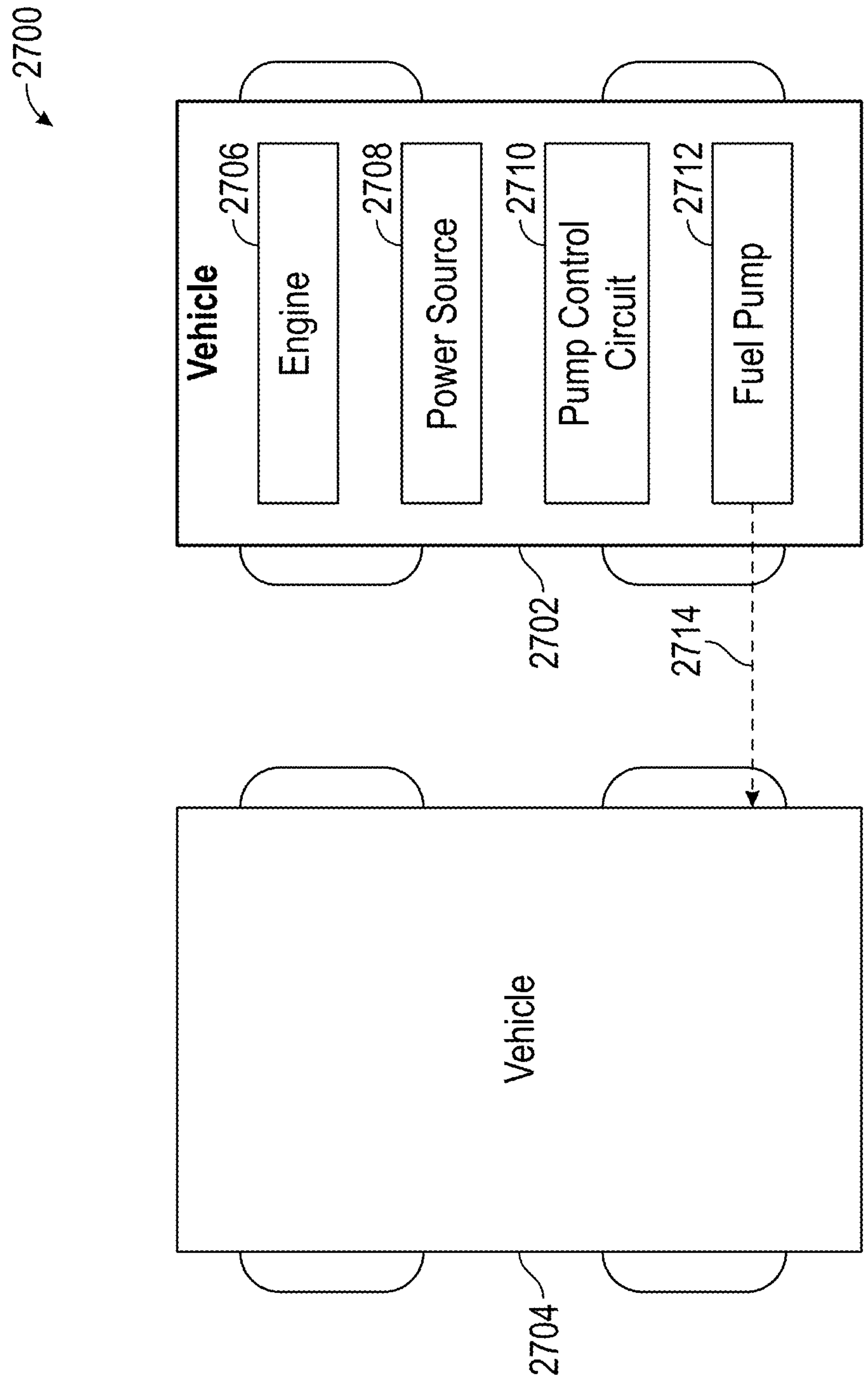
FIG. 27 illustrates a schematic view of a fuel transfer system for a vehicle according to aspects of the present disclosure.

FIG. 27 illustrates a schematic view 2700 of a fuel transfer system for a vehicle according to aspects of the present disclosure. In examples, the ability to transfer fuel from a first vehicle to a second vehicle may be beneficial. As another example, it may be beneficial to be able to offload fuel from a vehicle (e.g., for storage in a storage container).

As illustrated, vehicle 2702 includes engine 2706, power source 2708, pump control circuit 2710, and fuel pump 2712. Under normal operation of vehicle 2702, fuel pump 2712 is coupled to engine 2706, such that pump control circuit 2710 controls fuel pump 2712 (e.g., according to a pulse-width modulated signal) to provide fuel to engine 2706 accordingly (e.g., according to a throttle demand).

In instances where fuel is to be offloaded from vehicle 2702 (e.g., to vehicle 2704 or to a container, not pictured), a fuel line between fuel pump 2712 and engine 2706 is instead used to supply fuel to vehicle 2704 as illustrated by dashed arrow 2714. For example, the chassis of vehicle 2702 includes an access panel (e.g., near an end of the fuel line, where it connects to engine 2706). The fuel line may be removably coupled to the engine (e.g., with a quick-release clamp or quick-disconnect fitting). Accordingly, the individual disconnects the fuel line from engine 2706 and pulls the fuel line through the access panel, thereby giving enough length to position the end of the fuel line into the fuel fill port of vehicle 2704 or into a container on the ground, among other examples. It will be appreciated that any of a variety of other configurations may be used, for example where the fuel line is accessible beneath the vehicle or where the fuel line is removably couple to fuel pump 2712, such that an alternate fuel line may instead be coupled to fuel pump 2712 by the individual.

In examples, a relay/fuse box of vehicle 2702 includes a set of pins, receptacles, or other electrical contacts, where at least one contact is electrically coupled to pump control circuit 2710. As an example, the set of contacts further includes a ground or power reference contact. In instances where the individual intends to offload fuel from vehicle 2702, the individual bridges the reference contact and the contact that is electrically coupled to pump control circuit 2710, thereby causing pump control circuit 2710 to operate fuel pump 2712 accordingly. For example, pump control circuit 2710 operates fuel pump 2712 at a high or maximum speed, thereby offloading fuel from vehicle 2702 accordingly. The individual may bridge the contacts using a fuse or a jumper, among other examples.

In some examples, a notification is presented at an operator area of the vehicle when the fuel pump is activated via the relay/fuse box. Additionally, or alternatively, multiple or redundant sets of contacts may be used, or such manual operation of fuel pump 2712 may be user configurable via the operator interface of the vehicle, among other examples.

The following clauses are provided as example aspects of the disclosed subject matter:

1. A method for controlling one or more systems of a vehicle based on a determined vehicle instability, the method comprising: obtaining, from a set of sensors of the vehicle, vehicle environment information; generating, by one or more processors of the vehicle, based on the environment information, terrain information; generating, by the one or more processors, based on a state of the vehicle and the terrain information, a projected vehicle stability metric; and in response to determining that the vehicle stability metric exceeds a predetermined threshold: generating, by the one or more processors, based on the terrain information, a set of candidate locations; and controlling at least one of a steering system of the vehicle or a braking system of the vehicle system based on a candidate location of the set of candidate locations.

2. The method of clause 1, further comprising, in response to determining that the vehicle stability metric exceeds the predetermined threshold, generating an indication of the determined vehicle instability.

3. The method of clause 2, wherein the method further comprises providing the indication to a remote computing device associated with a vehicle operator.

4. The method of clause 2, wherein the method further comprises providing the indication to an operator interface of the vehicle.

5. The method of any one of clauses 1-4, wherein generating the set of candidate locations further comprises ranking, by the one or more processors, each candidate location of the set of candidate locations based on an estimated time for the vehicle to reach a respective candidate location.

6. The method of any one of clauses 1-5, wherein generating the projected vehicle stability metric comprises modeling, by the one or more processors, a vehicle state based on at least the generated terrain information and vehicle state information of the vehicle.

7. The method of any one of clauses 1-6, wherein the vehicle environment information is obtained from at least one of: an inertial measurement unit; an image sensor; a proximity sensor; an ultrasonic sensor; a light detection and ranging sensor; and a radio detection and ranging sensor.

8. A vehicle, comprising: a plurality of ground engaging members; a frame supported by the plurality of ground engaging members; a cooling system supported by the frame and configured to cool a heat source of the vehicle, the cooling system including a radiator coupled to a coolant flow controller; and a cooling controller to control the cooling system, the cooling controller configured to: configure the coolant flow controller to direct heat from the vehicle heat source to the radiator in a first operating mode; and configure the coolant flow controller to direct heat from the vehicle heat source to a battery of the vehicle in a second operating mode.

9. The vehicle of clause 8, wherein configuring the coolant flow controller to direct heat from the vehicle heat source to the battery comprises closing a valve of the coolant flow controller associated with the radiator to direct coolant to the battery of the vehicle.

10. The vehicle of any one of clauses 8-9, wherein the cooling controller is further configured to: operate the cooling system in the first operating mode; and in response to user input to reduce a thermal footprint of the vehicle, operate the cooling system in the second operating mode.

11. The vehicle of clause 10, wherein the cooling controller is further configured to cause the cooling system to dissipate heat at an increased rate compared to the first operation mode prior to operating the cooling system in the second operating mode.

12. The vehicle of any one of clauses 8-11, wherein: the coolant flow controller is a first coolant flow controller; the cooling system includes a second coolant flow controller; and the cooling controller is further configured to: configure the second coolant flow controller to direct heat from the vehicle heat source to a drivetrain of the vehicle in a third operating mode.

13. The vehicle of any one of clauses 8-12, wherein the vehicle heat source comprises an electric motor of the vehicle.

14. The vehicle of any one of clauses 8-13, further comprising: an engine supported by the frame; a fuel pump removably coupled to the engine via a fuel line; a fuel pump controller configured to control the fuel pump; and a set of contacts that includes a first contact and a second contact that is electrically coupled to the fuel pump controller, wherein the fuel pump controller is configured to operate the fuel pump in response to an electrical bridge between the first contact and the second contact.

15. The vehicle of any one of clauses 8-14, further comprising a display assembly supported by the frame, wherein the display assembly has a visible light operation mode and an infrared operation mode and comprises: a visible light source and a visible light polarizer corresponding to the visible light operation mode; and an infrared light source and an infrared polarizer corresponding to the infrared operation mode.

16. The vehicle of any one of clauses 8-15, further comprising: a power system electrically coupled to the battery of the vehicle, the power system comprising: a first subpart having a first set of contactors; a second subpart having a second set of contactors; and a high-voltage manager configured to selectively decouple the first subpart of the power system from the battery using the first set of contactors when a fault is identified for the first subpart, thereby maintaining power to the second subpart of the power system.

17. The vehicle of any one of clauses 8-16, wherein the cooling system further comprises a heat transfer device coupled to a chassis member of the vehicle and the heat source of the vehicle, thereby facilitating heat transfer from the heat source of the vehicle to the chassis member of the vehicle.

18. The vehicle of any one of clauses 8-17, wherein: the frame includes a first part and a second part; and a vehicle controller of the vehicle is configured to operate a first set of the plurality of ground engaging members and a second set of the plurality of ground engaging members to introduce a torque conflict between the first set and the second set based on a stress between the first part of the frame and the second part of the frame.

19. The vehicle of any one of clauses 8-18, further comprising: an operator area supported by the frame, wherein the operator area comprises at least a first input control corresponding to a vehicle torque direction and a second input control corresponding to a vehicle steering direction, and wherein at least one of the first input control or the second input control is a button.

20. The vehicle of clause 19, wherein actuation of at least one of the first input control or the second input control causes a first ground engaging member of the plurality of ground engaging members to operate in a different direction than a second ground engaging member of the plurality of ground engaging members, thereby causing the vehicle to rotate.

21. The vehicle of any one of clauses 8-20, further comprising: a traction motor supported by the frame; and a split gearbox supported by the frame, the split gearbox including: a first configuration in which the traction motor is coupled to at least one ground engaging member of the plurality of ground engaging members; and a second configuration in which an output shaft of the split gearbox is configured to be removably coupled to an accessory device.

22. The vehicle of any one of clauses 8-21, further comprising: a set of power routing contactors supported by the frame; and a controller electrically coupled to the set of power routing contactors, wherein the controller includes a charging mode, a generation mode, and an off-board mode.

23. The vehicle of clause 22, wherein the controller is configured to communicate with a power summing device to configure power output of the vehicle based on communication with the power summing device.

24. A method for controlling a cooling system of a vehicle, the method comprising: configuring the cooling system to dissipate heat at an increased rate as compared to a normal mode of operation of the cooling system; configuring the cooling system to direct heat of an electric motor of the vehicle to a battery pack of the vehicle, thereby reducing a thermal signature of the vehicle associated with a radiator of the cooling system; evaluating a temperature of the battery pack based on a first predetermined threshold; and based on determining the temperature of the battery pack exceeds the first predetermined threshold, configuring the cooling system to direct heat of the electric motor to a set of electronics of the vehicle.

25. The method of clause 24, further comprising: evaluating a temperature of the set of electronics based on a second predetermined threshold; and based on determining the temperature of the set of electronics exceeds the second predetermined threshold, configuring the cooling system to direct heat of the electric motor to a drivetrain of the vehicle.

26. The method of clause 25, wherein configuring the cooling system to direct heat to the drivetrain of the vehicle causes the cooling system to not direct heat to the battery pack of the vehicle.

27. The method of clause 25, further comprising: evaluating a temperature of the drivetrain based on a third predetermined threshold; and based on determining the temperature of the drivetrain exceeds the third predetermined threshold, performing at least one of: providing an indication to a vehicle operator; suspending operation of the vehicle; or configuring the cooling system to direct heat of the electric motor to the radiator of the cooling system.

28. The method of any one of clauses 24-27, further comprising providing an indication to a vehicle operator of an estimated remaining heat capacity.

29. The method of any one of clauses 24-28, wherein the first predetermined threshold is one of a maximum storage temperature associated with the battery pack or a maximum operating temperature associated with the battery pack.

30. The method of any one of clauses 24-29, wherein the cooling system is configured to dissipate heat at an increased rate in response to a received user indication to decrease the thermal signature of the vehicle.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A vehicle, comprising:

a plurality of ground engaging members;

a frame supported by the plurality of ground engaging members;

a cooling system supported by the frame and configured to cool a heat source of the vehicle, the cooling system including a radiator coupled to a coolant flow controller; and cooling controller circuitry to control the cooling system, the cooling controller circuitry configured to:

configure the coolant flow controller to direct heat from the vehicle heat source to the radiator to dissipate the heat at the radiator in a first operating mode; and configure the coolant flow controller to direct heat from the vehicle heat source to a battery of the vehicle to dissipate the heat at the battery in a second operating mode;

wherein the cooling controller circuitry is further configured to cause the cooling system to dissipate the heat at an increased rate compared to the first operating mode, prior to operating the cooling system in the second operating mode.

2. The vehicle of claim 1, wherein configuring the coolant flow controller to direct heat from the vehicle heat source to the battery comprises closing a valve of the coolant flow controller associated with the radiator to direct coolant to the battery of the vehicle.

3. The vehicle of claim 1, wherein the cooling controller circuitry is further configured to:

operate the cooling system in the first operating mode; and in response to user input to reduce a thermal footprint of the vehicle, operate the cooling system in the second operating mode.

4. The vehicle of claim 1, wherein:

the coolant flow controller is a first coolant flow controller;

the cooling system includes a second coolant flow controller; and the cooling controller circuitry is further configured to:

configure the second coolant flow controller to direct heat from the vehicle heat source to a drivetrain of the vehicle in a third operating mode.

5. The vehicle of claim 1, wherein the vehicle heat source comprises an electric motor of the vehicle.

6. The vehicle of claim 1, further comprising:

an engine supported by the frame;

a fuel pump removably coupled to the engine via a fuel line;

a fuel pump controller configured to control the fuel pump; and a set of contacts that includes a first contact and a second contact that is electrically coupled to the fuel pump controller, wherein the fuel pump controller is configured to operate the fuel pump in response to an electrical bridge between the first contact and the second contact.

7. The vehicle of claim 1, further comprising a display assembly supported by the frame, wherein the display assembly has a visible light operation mode and an infrared operation mode and comprises:

a visible light source and a visible light polarizer corresponding to the visible light operation mode; and an infrared light source and an infrared polarizer corresponding to the infrared operation mode.

8. The vehicle of claim 1, further comprising a power system electrically coupled to the battery of the vehicle, the power system comprising:

a first subpart having a first set of contactors;

a second subpart having a second set of contactors; and a high-voltage manager circuitry implemented by power controller circuitry, the high-voltage manager circuitry configured to selectively decouple the first subpart of the power system from the battery using the first set of contactors when a fault is identified for the first subpart, thereby maintaining power to the second subpart of the power system.

9. The vehicle of claim 1, wherein the cooling system further comprises a heat transfer device coupled to a chassis member of the vehicle and the heat source of the vehicle, thereby facilitating heat transfer from the heat source of the vehicle to the chassis member of the vehicle.

10. The vehicle of claim 1, wherein:

the frame includes a first part and a second part; and a vehicle controller circuitry of the vehicle is configured to operate a first set of the plurality of ground engaging members and a second set of the plurality of ground engaging members to introduce a torque conflict between the first set and the second set based on a stress between the first part of the frame and the second part of the frame.

11. The vehicle of claim 1, further comprising:

an operator area supported by the frame, wherein the operator area comprises at least a first input control corresponding to a vehicle torque direction and a second input control corresponding to a vehicle steering direction, and wherein at least one of the first input control or the second input control is a button.

12. The vehicle of claim 11, wherein actuation of at least one of the first input control or the second input control causes a first ground engaging member of the plurality of ground engaging members to operate in a different direction than a second ground engaging member of the plurality of ground engaging members, thereby causing the vehicle to rotate.

13. The vehicle of claim 1, further comprising:

a traction motor supported by the frame; and a split gearbox supported by the frame, the split gearbox including:

a first configuration in which the traction motor is coupled to at least one ground engaging member of the plurality of ground engaging members; and a second configuration in which an output shaft of the split gearbox is configured to be removably coupled to an accessory device.

14. The vehicle of claim 1, further comprising:

a set of power routing contactors supported by the frame; and a controller electrically coupled to the set of power routing contactors, wherein the controller includes a charging mode, a generation mode, and an off-board mode.

15. The vehicle of claim 14, wherein the controller is configured to communicate with a power summing device to configure power output of the vehicle based on communication with the power summing device.

16. A method for controlling a cooling system of a vehicle, the method comprising:

configuring the cooling system to dissipate heat at an increased rate as compared to a normal mode of operation of the cooling system;

configuring the cooling system to direct heat of an electric motor of the vehicle to a battery pack of the vehicle, thereby reducing a thermal signature of the vehicle associated with a radiator of the cooling system;

evaluating a temperature of the battery pack based on a first predetermined threshold; and based on determining the temperature of the battery pack exceeds the first predetermined threshold, configuring the cooling system to direct heat of the electric motor to a set of electronics of the vehicle, wherein the set of electronics includes components of a power system of the vehicle that are located separately from the battery pack.

17. The method of claim 16, further comprising:

evaluating a temperature of the set of electronics based on a second predetermined threshold; and based on determining the temperature of the set of electronics exceeds the second predetermined threshold, configuring the cooling system to direct heat of the electric motor to a drivetrain of the vehicle.

18. The method of claim 17, wherein configuring the cooling system to direct heat to the drivetrain of the vehicle causes the cooling system to not direct heat to the battery pack of the vehicle.

19. The method of claim 17, further comprising:

evaluating a temperature of the drivetrain based on a third predetermined threshold; and based on determining the temperature of the drivetrain exceeds the third predetermined threshold, performing at least one of:

providing an indication to a vehicle operator;

suspending operation of the vehicle; or configuring the cooling system to direct heat of the electric motor to the radiator of the cooling system.

20. The method of claim 16, further comprising providing an indication to a vehicle operator of an estimated remaining heat capacity.

21. The method of claim 16, wherein the first predetermined threshold is one of a maximum storage temperature associated with the battery pack or a maximum operating temperature associated with the battery pack.

22. The method of claim 16, wherein the cooling system is configured to dissipate heat at an increased rate in response to a received user indication to decrease the thermal signature of the vehicle.

23. A vehicle, comprising:

a plurality of ground engaging members;

a frame supported by the plurality of ground engaging members;

a cooling system supported by the frame and configured to cool a heat source of the vehicle, the cooling system including a radiator coupled to a coolant flow controller; and cooling controller circuitry to control the cooling system, the cooling controller circuitry configured to:

configure the coolant flow controller to dissipate heat at an increased rate as compared to a normal mode of operation of the cooling system;

configure the coolant flow controller to direct heat of an electric motor of the vehicle to a battery pack of the vehicle, thereby reducing a thermal signature of the vehicle associated with a radiator of the cooling system;

evaluate a temperature of the battery pack based on a first predetermined threshold; and based on a determination that the temperature of the battery pack exceeds the first predetermined threshold, configure the cooling system to direct heat of the electric motor to a set of electronics of the vehicle, wherein the set of electronics includes components of a power system of the vehicle that are located separately from the battery pack.

24. The vehicle of claim 23, wherein the cooling controller circuitry is further configured to:

evaluate a temperature of the set of electronics based on a second predetermined threshold; and based on determining the temperature of the set of electronics exceeds the second predetermined threshold, configure the cooling system to direct heat of the electric motor to a drivetrain of the vehicle.

25. The vehicle of claim 24, wherein to configure the cooling system to direct heat to the drivetrain of the vehicle causes the cooling system to not direct heat to the battery pack of the vehicle.

26. The vehicle of claim 24, wherein the cooling controller circuitry is further configured to:

evaluate a temperature of the drivetrain based on a third predetermined threshold; and based on determining the temperature of the drivetrain exceeds the third predetermined threshold, perform at least one of:

provide an indication to a vehicle operator;

suspend operation of the vehicle; or configure the cooling system to direct heat of the electric motor to the radiator of the cooling system.

27. The vehicle of claim 23, wherein the cooling controller circuitry is further configured to:

provide an indication to a vehicle operator of an estimated remaining heat capacity.

28. The vehicle of claim 23, wherein the first predetermined threshold is one of a maximum storage temperature associated with the battery pack or a maximum operating temperature associated with the battery pack.

29. The vehicle of claim 23, wherein the cooling system is configured to dissipate heat at an increased rate in response to a received user indication to decrease the thermal signature of the vehicle.

* * * * *